(12) United States Patent
Murray et al.

(10) Patent No.: US 7,936,256 B2
(45) Date of Patent: May 3, 2011

(54) METHOD AND SYSTEM FOR INTERACTING WITH A VEHICLE OVER A MOBILE RADIOTELEPHONE NETWORK

(75) Inventors: Tomás Murray, Atlanta, GA (US); Edward R. Jansson, Canton, GA (US)

(73) Assignee: Numerex Corp., Atlanta, GA (US)

( * ) Notice: Subject to any disclaimer, the term of this patent is extended or adjusted under 35 U.S.C. 154(b) by 622 days.

(21) Appl. No.: 12/002,091

(22) Filed: Dec. 14, 2007

(65) Prior Publication Data

US 2008/0211641 A1 Sep. 4, 2008

Related U.S. Application Data

(62) Division of application No. 11/040,636, filed on Jan. 21, 2005, now Pat. No. 7,323,970.

(60) Provisional application No. 60/537,843, filed on Jan. 21, 2004.

(51) Int. Cl.
B60R 25/10 (2006.01)
(52) U.S. Cl. .................................. 340/426.12
(58) Field of Classification Search ............. 340/426.12, 340/426.1, 426.11, 426.19, 426.2, 539.13; 701/2; 455/99, 422
See application file for complete search history.

(56) References Cited

U.S. PATENT DOCUMENTS

| | | | | |
|---|---|---|---|---|
| 3,581,019 | A | 5/1971 | Ryan | 179/41 |
| 3,886,515 | A | 5/1975 | Cottin et al. | 340/23 |
| 3,973,200 | A | 8/1976 | Akerberg | 325/55 |
| 4,172,969 | A | 10/1979 | Levine et al. | 179/2 EC |
| 4,219,698 | A | 8/1980 | Birilli et al. | 179/5 P |
| 4,263,480 | A | 4/1981 | Levine | 179/2 EC |
| 4,284,849 | A | 8/1981 | Anderson et al. | 179/5 R |
| 4,342,986 | A | 8/1982 | Buskirk et al. | 340/539 |
| 4,361,730 | A | 11/1982 | Barber et al. | 179/5 R |
| 4,371,751 | A | 2/1983 | Hilligoss, Jr. et al. | 179/5 R |
| 4,412,292 | A | 10/1983 | Sedam et al. | |
| 4,454,027 | A | 6/1984 | Fenton | 208/253 |
| 4,486,624 | A | 12/1984 | Puhl et al. | 179/2 EB |
| 4,492,820 | A | 1/1985 | Kennard et al. | 179/5 P |
| 4,644,347 | A | 2/1987 | Lucas et al. | 340/825.04 |
| 4,644,351 | A | 2/1987 | Zabarsky et al. | 340/825.44 |

(Continued)

FOREIGN PATENT DOCUMENTS

EP 0 123 456 A2 10/1984

(Continued)

OTHER PUBLICATIONS

European Telecommunication Standards Institute; *European Digital Cellular Telecommunications System (Phase 2); Technical Realization of the Short Message Service (SMS) Point to Point (PP) (GSM 03.40)*; European Telecommunication Standard; Oct. 1993; Draft pr ETS 300 536; pp. 1-103.

(Continued)

*Primary Examiner* — Phung Nguyen
(74) *Attorney, Agent, or Firm* — King & Spalding LLP

(57) ABSTRACT

A telemetry system coupled to a vehicle can communicate with a remote site using the overhead control channels of a wireless network, such as a cellular mobile radiotelephone network. The telemetry system can monitor or control aspects of the vehicle's operations based on remote user input. The telemetry system can receive a command from a data processing center and, based on the command, perform an action at the vehicle such that a user can remotely interact with the vehicle.

20 Claims, 20 Drawing Sheets

U.S. PATENT DOCUMENTS

| | | | |
|---|---|---|---|
| 4,646,082 A | 2/1987 | Engel et al. | 340/825.54 |
| 4,677,653 A | 6/1987 | Weiner et al. | 379/58 |
| 4,724,425 A | 2/1988 | Gerhart et al. | 340/539 |
| 4,734,928 A | 3/1988 | Weiner et al. | 379/59 |
| 4,750,197 A | 6/1988 | Denekamp et al. | 379/58 |
| 4,766,548 A | 8/1988 | Cedrone et al. | 364/479 |
| 4,783,747 A | 11/1988 | Komori et al. | |
| 4,791,658 A | 12/1988 | Simon et al. | 379/41 |
| 4,807,225 A | 2/1989 | Fitch | 370/71 |
| 4,814,763 A | 3/1989 | Nelson et al. | 340/825.44 |
| 4,823,123 A | 4/1989 | Siwiak | 340/825.44 |
| 4,825,193 A | 4/1989 | Siwiak et al. | 340/311.1 |
| 4,825,457 A | 4/1989 | Lebowitz | 379/40 |
| 4,833,701 A | 5/1989 | Comroe et al. | 379/60 |
| 4,837,800 A | 6/1989 | Freeburg et al. | 379/59 |
| 4,839,917 A | 6/1989 | Oliver | 379/45 |
| 4,866,445 A | 9/1989 | Valero et al. | 341/106 |
| 4,868,560 A | 9/1989 | Oliwa et al. | 340/825.44 |
| 4,868,859 A | 9/1989 | Sheffer | 379/39 |
| 4,875,038 A | 10/1989 | Siwiak et al. | 340/825.44 |
| 4,875,230 A | 10/1989 | Blair | 379/63 |
| 4,882,579 A | 11/1989 | Siwiak | 340/825.44 |
| 4,887,290 A | 12/1989 | Dop et al. | 379/33 |
| 4,887,291 A | 12/1989 | Stillwell | 379/39 |
| 4,890,315 A | 12/1989 | Bendixen et al. | 379/59 |
| 4,891,637 A | 1/1990 | Siwiak et al. | 340/825.44 |
| 4,891,638 A | 1/1990 | Davis | 340/825.44 |
| 4,901,340 A | 2/1990 | Parker et al. | 379/60 |
| 4,905,234 A | 2/1990 | Childress et al. | 370/94.1 |
| 4,914,651 A | 4/1990 | Lusignan | 370/69.1 |
| 4,928,096 A | 5/1990 | Leonardo et al. | 340/825.44 |
| 4,940,963 A | 7/1990 | Gutman et al. | 340/313 |
| 4,972,460 A | 11/1990 | Sasuta | 379/60 |
| 4,979,169 A | 12/1990 | Almond et al. | 370/99 |
| 4,993,059 A | 2/1991 | Smith et al. | 379/39 |
| 5,005,014 A | 4/1991 | Jasinski | 340/825.44 |
| 5,010,584 A | 4/1991 | Seki | 455/83 |
| 5,020,091 A | 5/1991 | Krolopp et al. | 379/58 |
| 5,020,093 A | 5/1991 | Pireh | 379/59 |
| 5,027,383 A | 6/1991 | Sheffer | 379/39 |
| 5,029,098 A | 7/1991 | Levasseaur | |
| 5,031,204 A | 7/1991 | McKernan | 379/63 |
| 5,047,763 A | 9/1991 | Kuznicki et al. | 340/825.44 |
| 5,073,919 A | 12/1991 | Hagensick | 379/29 |
| 5,081,667 A | 1/1992 | Drori et al. | 379/59 |
| 5,087,919 A | 2/1992 | Odagawa et al. | 342/357 |
| 5,090,051 A | 2/1992 | Muppidi et al. | 379/61 |
| 5,117,449 A | 5/1992 | Metroka et al. | 379/58 |
| 5,121,503 A | 6/1992 | Davis | 455/12.1 |
| 5,124,697 A | 6/1992 | Moore | 340/825.44 |
| 5,131,019 A | 7/1992 | Sheffer et al. | 379/39 |
| 5,134,644 A | 7/1992 | Garton et al. | 379/39 |
| 5,142,279 A | 8/1992 | Jasinski et al. | 340/825.44 |
| 5,148,473 A | 9/1992 | Freeland et al. | 379/59 |
| 5,153,582 A | 10/1992 | Davis | 340/825.44 |
| 5,153,902 A | 10/1992 | Buhl et al. | 379/57 |
| 5,153,903 A | 10/1992 | Eastmond et al. | 379/57 |
| 5,159,625 A | 10/1992 | Zicker | 379/59 |
| 5,162,790 A | 11/1992 | Jasinski | 340/825.44 |
| 5,173,933 A | 12/1992 | Jabs et al. | 379/58 |
| 5,175,758 A | 12/1992 | Levanto et al. | 379/57 |
| 5,185,779 A | 2/1993 | Dop et al. | 379/33 |
| 5,196,842 A | 3/1993 | Gomez et al. | 340/825.44 |
| 5,206,855 A | 4/1993 | Schwendeman et al. | 370/50 |
| 5,207,784 A | 5/1993 | Schwartzendruber | |
| 5,208,756 A | 5/1993 | Song | 364/449 |
| 5,210,787 A | 5/1993 | Hayes et al. | 379/60 |
| 5,218,367 A | 6/1993 | Sheffer et al. | 342/457 |
| 5,220,599 A | 6/1993 | Sasano et al. | 379/142 |
| 5,222,123 A | 6/1993 | Brown et al. | 379/57 |
| 5,230,081 A | 7/1993 | Yamada et al. | 455/33.1 |
| 5,239,294 A | 8/1993 | Flanders et al. | 340/825.44 |
| 5,239,678 A | 8/1993 | Grube et al. | 455/34.1 |
| 5,247,567 A | 9/1993 | Hirano | 379/61 |
| 5,254,986 A | 10/1993 | DeLuca | 340/825.44 |
| 5,255,307 A | 10/1993 | Mizikovsky | 379/58 |
| 5,265,150 A | 11/1993 | Helmkamp et al. | 379/58 |
| 5,278,539 A | 1/1994 | Lauterbach et al. | 340/539 |
| 5,278,890 A | 1/1994 | Beeson, Jr. et al. | 379/57 |
| 5,305,217 A | 4/1994 | Nakamura et al. | 364/242.02 |
| 5,307,399 A | 4/1994 | Dai et al. | 379/57 |
| 5,307,509 A | 4/1994 | Michalon et al. | 455/54.1 |
| 5,335,278 A | 8/1994 | Matchett et al. | 380/23 |
| 5,341,410 A | 8/1994 | Aron et al. | 379/59 |
| 5,363,427 A | 11/1994 | Ekstrom et al. | 379/58 |
| 5,365,573 A | 11/1994 | Sakamoto et al. | 379/61 |
| 5,369,681 A | 11/1994 | Boudreau et al. | 379/87 |
| 5,371,781 A | 12/1994 | Ardon | 379/59 |
| 5,371,898 A | 12/1994 | Grube et al. | 455/33.1 |
| 5,382,970 A | 1/1995 | Kiefl | 348/1 |
| 5,386,209 A | 1/1995 | Thomas | 340/539 |
| 5,396,537 A | 3/1995 | Schwendeman | 379/57 |
| 5,396,539 A | 3/1995 | Slekys et al. | 379/59 |
| 5,398,277 A | 3/1995 | Martin, Jr. et al. | 379/39 |
| 5,404,392 A | 4/1995 | Miller et al. | 379/60 |
| 5,432,841 A | 7/1995 | Rimer | 379/59 |
| 5,450,329 A | 9/1995 | Tanner | 364/449 |
| 5,453,730 A | 9/1995 | De-Grinis et al. | |
| 5,454,027 A | 9/1995 | Kennedy et al. | 379/60 |
| 5,493,722 A | 2/1996 | Gunn et al. | 455/54.1 |
| 5,502,761 A | 3/1996 | Duncan et al. | 379/142 |
| 5,511,072 A | 4/1996 | Delprat | 370/68.1 |
| 5,511,110 A | 4/1996 | Drucker | 379/57 |
| 5,517,547 A | 5/1996 | Ladha et al. | 379/40 |
| 5,519,756 A | 5/1996 | Clift | 379/44 |
| 5,526,401 A | 6/1996 | Roach, Jr. et al. | 379/59 |
| 5,528,664 A | 6/1996 | Slekys et al. | 379/58 |
| 5,530,736 A | 6/1996 | Comer et al. | 379/58 |
| 5,533,094 A | 7/1996 | Sanmugam | 379/57 |
| 5,539,810 A | 7/1996 | Kennedy, III et al. | 379/59 |
| 5,544,223 A | 8/1996 | Robbins et al. | 379/58 |
| 5,544,225 A | 8/1996 | Kennedy, III et al. | 379/59 |
| 5,546,444 A | 8/1996 | Roach, Jr. et al. | 379/59 |
| 5,574,975 A | 11/1996 | Hill | 455/51.2 |
| 5,579,372 A | 11/1996 | Åström | 379/58 |
| 5,586,177 A | 12/1996 | Farris et al. | 379/230 |
| 5,594,740 A | 1/1997 | LaDue | 379/59 |
| 5,594,945 A | 1/1997 | Lewis et al. | 455/38.1 |
| 5,596,573 A | 1/1997 | Bertland | 370/474 |
| 5,603,091 A | 2/1997 | Linquist et al. | 455/56.1 |
| 5,610,973 A | 3/1997 | Comer | 379/59 |
| 5,619,209 A | 4/1997 | Horstein et al. | 342/352 |
| 5,625,889 A | 4/1997 | Chikkaswamy et al. | 455/67.1 |
| 5,629,975 A | 5/1997 | Tiedemann, Jr. et al. | 379/60 |
| 5,640,139 A | 6/1997 | Egeberg | 340/426 |
| 5,648,966 A | 7/1997 | Kondo et al. | 370/245 |
| 5,652,564 A * | 7/1997 | Winbush | 340/426.12 |
| 5,652,570 A | 7/1997 | Lepkofker | 340/573 |
| 5,675,371 A | 10/1997 | Barringer | 348/6 |
| 5,678,179 A | 10/1997 | Turcotte et al. | 455/331 |
| 5,680,551 A | 10/1997 | Martino, II | 395/200.15 |
| 5,684,858 A | 11/1997 | Hartmann et al. | 379/40 |
| 5,686,888 A | 11/1997 | Welles, II et al. | 340/539 |
| 5,701,302 A | 12/1997 | Geiger | 370/521 |
| 5,722,067 A | 2/1998 | Fougnies et al. | 455/406 |
| 5,742,668 A | 4/1998 | Pepe et al. | 379/58 |
| 5,742,905 A | 4/1998 | Pepe et al. | 455/461 |
| 5,745,867 A | 4/1998 | Mills | 701/207 |
| 5,748,104 A | 5/1998 | Argyroudis et al. | 340/870.11 |
| 5,751,789 A | 5/1998 | Farris et al. | 379/34 |
| 5,754,954 A | 5/1998 | Cannon et al. | 455/419 |
| 5,758,313 A | 5/1998 | Shah et al. | 701/208 |
| 5,761,621 A | 6/1998 | Sainton | 455/453 |
| 5,767,788 A | 6/1998 | Ness | 340/825.49 |
| 5,768,343 A | 6/1998 | Dame et al. | 379/33 |
| 5,777,605 A | 7/1998 | Yoshinobu et al. | 345/173 |
| 5,781,612 A | 7/1998 | Choi et al. | 379/58 |
| 5,787,149 A | 7/1998 | Yousefi et al. | 379/59 |
| 5,787,357 A | 7/1998 | Salin | 455/466 |
| 5,790,631 A | 8/1998 | Minarczik et al. | 379/2 |
| 5,793,306 A * | 8/1998 | Vershinin et al. | 340/825.69 |
| 5,794,144 A | 8/1998 | Comer et al. | 455/426 |
| 5,797,097 A | 8/1998 | Roach, Jr. et al. | 455/456 |
| 5,805,997 A | 9/1998 | Farris | 455/461 |
| 5,819,184 A | 10/1998 | Cashman | 455/553 |
| 5,822,221 A | 10/1998 | Groenteman | 364/550 |
| 5,822,423 A | 10/1998 | Jehnert et al. | 379/352 |

| | | | |
|---|---|---|---|
| 5,826,195 A | 10/1998 | Westerlage et al. ............ 455/456 |
| 5,835,868 A | 11/1998 | McElroy et al. |
| 5,844,808 A | 12/1998 | Konsmo et al. |
| 5,845,203 A | 12/1998 | LaDue ............................ 455/414 |
| 5,845,211 A | 12/1998 | Roach, Jr. ....................... 455/436 |
| 5,862,201 A | 1/1999 | Sands ................................ 379/26 |
| 5,862,480 A | 1/1999 | Wild et al. ...................... 455/432 |
| 5,862,481 A | 1/1999 | Kulkarni et al. ................ 455/432 |
| 5,873,043 A | 2/1999 | Comer ............................. 455/458 |
| 5,875,863 A | 3/1999 | Jarvis et al. .................... 180/65.4 |
| 5,878,351 A | 3/1999 | Alanara et al. ................. 455/466 |
| 5,884,216 A | 3/1999 | Shah et al. ...................... 701/207 |
| 5,889,474 A | 3/1999 | LaDue ...................... 340/825.49 |
| 5,898,917 A | 4/1999 | Batni et al. ...................... 455/564 |
| 5,901,142 A | 5/1999 | Averbuch et al. .............. 370/329 |
| 5,909,651 A | 6/1999 | Chander et al. ................ 455/466 |
| 5,913,166 A | 6/1999 | Buttitta et al. .................. 455/436 |
| 5,917,449 A | 6/1999 | Sanderford et al. ............ 342/457 |
| 5,917,886 A | 6/1999 | Halkio .............................. 379/37 |
| 5,918,172 A | 6/1999 | Saunders et al. ............... 455/404 |
| 5,920,822 A | 7/1999 | Houde et al. ................... 455/466 |
| 5,923,731 A | 7/1999 | McClure |
| 5,924,026 A | 7/1999 | Krishnan ......................... 455/414 |
| 5,933,784 A | 8/1999 | Gallagher et al. .............. 455/552 |
| 5,946,629 A | 8/1999 | Sawyer et al. .................. 455/466 |
| 5,946,630 A | 8/1999 | Willars et al. .................. 455/466 |
| 5,983,197 A | 11/1999 | Enta |
| 5,999,808 A | 12/1999 | LaDue ............................ 455/412 |
| 6,011,321 A | 1/2000 | Stancu et al. |
| 6,012,013 A | 1/2000 | McBurney ...................... 701/207 |
| 6,012,014 A | 1/2000 | Koyanagi et al. .............. 701/208 |
| 6,014,089 A | 1/2000 | Tracy et al. ............... 340/870.02 |
| 6,018,657 A | 1/2000 | Kennedy, III et al. ......... 455/426 |
| 6,021,394 A | 2/2000 | Takahashi |
| 6,025,774 A | 2/2000 | Forbes ............................ 340/426 |
| 6,026,345 A | 2/2000 | Shah et al. ...................... 701/117 |
| 6,049,273 A | 4/2000 | Hess ................................ 340/539 |
| 6,067,454 A | 5/2000 | Foti ................................. 455/433 |
| 6,070,070 A | 5/2000 | Ladue ............................. 455/419 |
| 6,072,862 A | 6/2000 | Srinivasan ............... 379/100.08 |
| 6,078,811 A | 6/2000 | Lin et al. ......................... 455/433 |
| 6,078,820 A | 6/2000 | Wells et al. ..................... 455/466 |
| 6,081,514 A | 6/2000 | Raith ............................... 370/321 |
| 6,081,546 A | 6/2000 | Williamson et al. ............. 375/33 |
| 6,088,431 A | 7/2000 | LaDue ............................. 379/114 |
| 6,094,578 A | 7/2000 | Purcell et al. ................... 455/426 |
| 6,097,951 A | 8/2000 | Ernam et al. ................... 455/433 |
| 6,108,537 A | 8/2000 | Comer et al. ................... 455/426 |
| 6,108,540 A | 8/2000 | Sonti et al. ..................... 455/433 |
| 6,111,539 A | 8/2000 | Mannings et al. ........ 342/357.09 |
| 6,122,514 A | 9/2000 | Spaur et al. ..................... 455/448 |
| 6,125,275 A | 9/2000 | Comer et al. ................... 455/426 |
| 6,138,034 A | 10/2000 | Willey ............................ 455/522 |
| 6,144,722 A | 11/2000 | Anderson et al. ................ 379/27 |
| 6,144,859 A | 11/2000 | LaDue ............................ 455/511 |
| 6,148,202 A | 11/2000 | Wortham ........................ 455/434 |
| 6,150,955 A | 11/2000 | Tracy et al. ............... 340/870.02 |
| 6,151,507 A | 11/2000 | Laiho et al. .................... 455/466 |
| 6,154,648 A | 11/2000 | Comer ............................ 455/426 |
| 6,154,658 A | 11/2000 | Caci ................................ 455/466 |
| 6,161,020 A | 12/2000 | Kim ................................ 455/466 |
| 6,163,701 A | 12/2000 | Saleh et al. ..................... 455/456 |
| 6,169,895 B1 | 1/2001 | Buhrmann et al. ............. 455/423 |
| 6,175,732 B1 | 1/2001 | McDaniel et al. .............. 455/433 |
| 6,181,981 B1 | 1/2001 | Varga et al. |
| 6,185,198 B1 | 2/2001 | LaDue ............................ 370/329 |
| 6,195,546 B1 | 2/2001 | Leung et al. ................... 455/419 |
| 6,215,404 B1 | 4/2001 | Morales ........................... 340/577 |
| 6,233,450 B1 | 5/2001 | Seppanen ....................... 455/426 |
| 6,236,357 B1 | 5/2001 | Corwith .................... 342/357.08 |
| 6,249,217 B1 | 6/2001 | Forbes ............................ 340/426 |
| 6,259,781 B1 | 7/2001 | Crouch et al. .................... 379/37 |
| 6,263,212 B1 | 7/2001 | Ross et al. ...................... 455/466 |
| 6,282,496 B1 | 8/2001 | Chowdhary ..................... 701/220 |
| 6,285,868 B1 | 9/2001 | LaDue ............................ 455/410 |
| 6,285,953 B1 | 9/2001 | Harrison et al. ................ 701/213 |
| 6,292,669 B1 | 9/2001 | Meuronen et al. ............. 455/466 |
| 6,297,768 B1 | 10/2001 | Allen, Jr. ................... 342/357.1 |
| 6,298,232 B1 | 10/2001 | Marin et al. .................... 455/413 |
| 6,311,056 B1 | 10/2001 | Sandidge ........................ 455/414 |
| 6,311,060 B1 | 10/2001 | Evans et al. .................... 455/426 |
| 6,330,452 B1 | 12/2001 | Fattouche et al. .............. 455/456 |
| 6,339,731 B1 | 1/2002 | Morris et al. |
| 6,353,743 B1 | 3/2002 | Karmel ........................... 455/456 |
| 6,353,745 B1 | 3/2002 | Wehrend et al. ................ 455/466 |
| 6,363,249 B1 | 3/2002 | Nordeman et al. ............. 455/418 |
| 6,363,254 B1 | 3/2002 | Jones et al. ..................... 455/456 |
| 6,363,324 B1 | 3/2002 | Hildebrant ..................... 701/213 |
| 6,366,791 B1 | 4/2002 | Lin et al. |
| 6,369,719 B1 | 4/2002 | Tracy et al. ............... 340/870.02 |
| 6,370,135 B1 | 4/2002 | Gardner ......................... 370/352 |
| 6,377,210 B1 | 4/2002 | Moore ...................... 342/357.13 |
| 6,389,289 B1 | 5/2002 | Voce et al. ...................... 455/456 |
| 6,393,295 B1 | 5/2002 | Butler et al. .................... 455/458 |
| 6,397,056 B1 | 5/2002 | Bugnon et al. ................. 455/411 |
| 6,405,033 B1 | 6/2002 | Kennedy, III et al. ......... 455/414 |
| 6,424,828 B1 | 7/2002 | Collins et al. .................. 455/412 |
| 6,424,841 B1 | 7/2002 | Gustafsson ..................... 455/466 |
| 6,452,483 B2 * | 9/2002 | Chen et al. .................. 340/425.5 |
| 6,457,038 B1 | 9/2002 | Defosse .......................... 709/200 |
| 6,476,763 B2 | 11/2002 | Allen, Jr. ..................... 342/357.1 |
| 6,484,035 B2 | 11/2002 | Allen, Jr. ........................ 455/456 |
| 6,487,602 B1 | 11/2002 | Thakker ......................... 709/230 |
| 6,493,556 B1 | 12/2002 | Stinson .......................... 455/445 |
| 6,493,558 B1 | 12/2002 | Bernhart et al. ................ 455/466 |
| 6,515,997 B1 | 2/2003 | Feltner et al. .................. 370/401 |
| 6,516,197 B2 | 2/2003 | Havinas et al. |
| 6,553,336 B1 | 4/2003 | Johnson et al. |
| 6,560,456 B1 | 5/2003 | Lohtia et al. ................... 455/445 |
| 6,567,501 B1 | 5/2003 | Pernu et al. |
| 6,570,532 B2 | 5/2003 | Mise et al. ................... 342/357.1 |
| 6,608,553 B2 | 8/2003 | Isobe |
| 6,618,671 B2 | 9/2003 | Dooley et al. .................. 701/213 |
| 6,621,422 B2 | 9/2003 | Rubenstein |
| 6,622,016 B1 | 9/2003 | Sladek et al. ................... 455/414 |
| 6,625,461 B1 | 9/2003 | Bertacchi ....................... 455/466 |
| 6,643,511 B1 | 11/2003 | Rune et al. |
| 6,665,532 B1 | 12/2003 | Boland et al. |
| 6,683,881 B1 | 1/2004 | Mijares et al. |
| 6,710,738 B2 | 3/2004 | Allen, Jr. ..................... 342/357.1 |
| 6,714,793 B1 | 3/2004 | Carey et al. .................... 455/466 |
| 6,717,511 B2 * | 4/2004 | Parker et al. .............. 340/426.12 |
| 6,718,177 B1 | 4/2004 | Comer et al. ................... 455/458 |
| 6,718,237 B1 | 4/2004 | Murray et al. .................... 701/24 |
| 6,738,647 B1 | 5/2004 | Link, II ........................... 455/564 |
| 6,741,853 B1 | 5/2004 | Jiang et al. ..................... 455/418 |
| 6,741,863 B1 | 5/2004 | Chiang et al. |
| 6,745,041 B2 | 6/2004 | Allison et al. .................. 455/466 |
| 6,760,580 B2 | 7/2004 | Robinson et al. ............ 455/412.2 |
| 6,771,949 B1 | 8/2004 | Corliss ........................... 455/413 |
| 6,782,276 B1 | 8/2004 | Lam et al. ...................... 455/560 |
| 6,792,295 B1 * | 9/2004 | Hanevich et al. ............ 455/569.1 |
| 6,826,397 B1 | 11/2004 | Vasa |
| 6,856,808 B1 | 2/2005 | Comer et al. ................... 455/466 |
| 6,861,947 B2 | 3/2005 | Albert |
| 6,865,191 B1 | 3/2005 | Bengtsson et al. ............. 370/475 |
| 6,882,843 B1 | 4/2005 | Comer ............................ 455/445 |
| 6,959,192 B1 | 10/2005 | Cannon et al. |
| 6,980,887 B2 | 12/2005 | Varga et al. |
| 6,982,656 B1 | 1/2006 | Coppinger et al. |
| 7,005,997 B1 | 2/2006 | Wiewiura |
| 7,010,306 B1 | 3/2006 | Tanibayashi et al. |
| 2001/0003093 A1 | 6/2001 | Lundin ........................... 455/456 |
| 2001/0040503 A1 * | 11/2001 | Bishop ........................... 340/426 |
| 2001/0042121 A1 | 11/2001 | Defosse et al. ................. 709/224 |
| 2001/0047244 A1 | 11/2001 | Harrison et al. ................ 701/213 |
| 2001/0047410 A1 | 11/2001 | Defosse .......................... 709/224 |
| 2001/0054083 A1 | 12/2001 | Defosse .......................... 709/217 |
| 2002/0016829 A1 | 2/2002 | Defosse .......................... 709/217 |
| 2002/0027501 A1 * | 3/2002 | Yamanaka et al. ............. 340/426 |
| 2002/0086636 A1 | 7/2002 | Tracy et al. ..................... 455/3.01 |
| 2002/0110230 A1 | 8/2002 | Leuca et al. ................ 379/201.01 |
| 2002/0120728 A1 | 8/2002 | Braatz et al. |
| 2002/0142759 A1 | 10/2002 | Newell et al. |
| 2002/0155844 A1 | 10/2002 | Rankin et al. .................. 455/456 |
| 2002/0160771 A1 | 10/2002 | Massie et al. .................. 455/426 |
| 2002/0164988 A1 | 11/2002 | Vishwanathan et al. ....... 455/445 |
| 2002/0194387 A1 | 12/2002 | Defosse .......................... 709/251 |

| | | | |
|---|---|---|---|
| 2002/0196924 A1 | 12/2002 | Dahari ............... 379/220.01 |
| 2003/0003930 A1 | 1/2003 | Allison et al. ............ 455/466 |
| 2003/0009313 A1 | 1/2003 | May et al. ............... 702/188 |
| 2003/0021273 A1 | 1/2003 | Fouquet et al. ........... 370/392 |
| 2003/0022656 A1 | 1/2003 | Hinnant, Jr. et al. ........ 455/410 |
| 2003/0054830 A1 | 3/2003 | Williams et al. ........... 455/456 |
| 2003/0097474 A1 | 5/2003 | Defosse et al. ............ 709/246 |
| 2003/0101257 A1 | 5/2003 | Godwin .................. 709/223 |
| 2003/0101262 A1 | 5/2003 | Godwin .................. 709/224 |
| 2003/0119489 A1 | 6/2003 | Mohammed |
| 2003/0119498 A1 | 6/2003 | Haas et al. ............... 455/426 |
| 2003/0129969 A1 | 7/2003 | Rucinski ................. 455/412 |
| 2003/0141990 A1 | 7/2003 | Coon |
| 2003/0158650 A1 | 8/2003 | Abe et al. |
| 2003/0182053 A1 | 9/2003 | Swope et al. |
| 2003/0204391 A1 | 10/2003 | May et al. ................... 704/8 |
| 2004/0029598 A1 | 2/2004 | Guggisberg ............... 455/466 |
| 2004/0110493 A1 | 6/2004 | Alvarez et al. ........... 455/414.1 |
| 2004/0142707 A1 | 7/2004 | Midkiff et al. ............ 455/466 |
| 2004/0180678 A1 | 9/2004 | Smith et al. .............. 455/466 |
| 2004/0203640 A1 | 10/2004 | Molander et al. ......... 455/414.1 |
| 2005/0037784 A1 | 2/2005 | Cleary ................... 455/466 |
| 2005/0102074 A1 | 5/2005 | Kolls |
| 2005/0190080 A1 | 9/2005 | Flick |
| 2005/0197106 A1 | 9/2005 | Bristow et al. |
| 2006/0190097 A1* | 8/2006 | Rubenstein ................ 700/17 |

FOREIGN PATENT DOCUMENTS

| | | |
|---|---|---|
| EP | 0 123 562 B1 | 7/1990 |
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |
| WO | WO 94/05095 A1 | 3/1994 |
| WO | WO 95/24791 A1 | 9/1995 |
| WO | WO 95/25407 A1 | 9/1995 |
| WO | WO 95/26088 A1 | 9/1995 |
| WO | WO 96/03007 A1 | 2/1996 |
| WO | WO 96/10895 A1 | 4/1996 |
| WO | WO 96/37079 A1 | 11/1996 |
| WO | WO 96/38989 A1 | 12/1996 |
| WO | WO 97/36435 A1 | 10/1997 |
| WO | WO 97/38540 A1 | 10/1997 |
| WO | WO 97/45991 A2 | 12/1997 |
| WO | WO 98/06227 A2 | 2/1998 |
| WO | WO 98/19438 A1 | 5/1998 |
| WO | WO 98/19447 A1 | 5/1998 |
| WO | WO 98/27780 A2 | 6/1998 |
| WO | WO 99/26428 A1 | 5/1999 |
| WO | WO 99/60769 A1 | 11/1999 |
| WO | WO 00/03532 A2 | 1/2000 |
| WO | WO 00/17021 A1 | 3/2000 |
| WO | WO 00/28347 A1 | 5/2000 |
| WO | WO 00/36812 A1 | 6/2000 |
| WO | WO 01/63825 A2 | 8/2001 |
| WO | WO 01/63960 A1 | 8/2001 |
| WO | WO 01/72068 A1 | 9/2001 |
| WO | WO 01/80583 A2 | 10/2001 |
| WO | WO 02/35866 A2 | 5/2002 |
| WO | WO 03/019925 A2 | 3/2003 |
| WO | WO 2005/074430 A2 | 8/2005 |
| WO | WO 2006/014419 A1 | 2/2006 |

OTHER PUBLICATIONS

European Telecommunication Standards Institute; *European Digital Cellular Telecommunications System (Phase 2); Technical Realization of Short Message Service Call Broadcast (SMSCB) (GSM 03.41)*; European Telecommunication Standard; Oct. 1993; Draft pr ETS 300 537; pp. 1-24.

Isochron Data Corporation; *Connect With Your Vending Machines—and Watch Your Profits Soar*; www.isochron.com/solutions_VC.htm; (2002); pp. 1-2.

Lee, William C. Y.; *Mobile Cellular Telecommunications Systems*; ISBN 0-07-037030-3; 1989; pp. 74-80.

Mouly et al.; *The GSM System for Mobile Communications*; ISBN 2-9507190-0-7; © 1992; pp. 56-59.

\* cited by examiner

METHOD AND SYSTEM FOR INTERACTING WITH A VEHICLE OVER A MOBILE RADIOTELEPHONE NETWORK

RELATED APPLICATIONS

This application is a divisional of commonly assigned U.S. Nonprovisional patent application Ser. No. 11/040,636, now U.S. Pat. No. 7,323,970, entitled, "Method and System for Remote Interaction With a Vehicle Via Wireless Communication," filed on Jan. 21, 2005, which claims the benefit of priority to U.S. Provisional Patent Application Ser. No. 60/537,843, entitled "Method and System for Vehicle Recovery and Location Identification" and filed on Jan. 21, 2004. The contents of U.S. Nonprovisional patent application Ser. No. 11/040,636, now U.S. Pat. No. 7,323,970, and U.S. Provisional Patent Application Ser. No. 60/537,843 are hereby incorporated herein by reference.

This application is related to commonly assigned U.S. Nonprovisional patent application Ser. No. 11/040,683, entitled "Method and System for Wireless Telemetry," the contents of which are hereby incorporated by reference.

TECHNICAL FIELD

The present invention relates to communicating over a wireless network with a vehicle and more specifically to monitoring and controlling aspects of a vehicle's operation from a remote site using the overhead control channels of a cellular mobile radiotelephone network.

BACKGROUND OF THE INVENTION

The communications industry shows a growing interest in using wireless communication technology to transmit data to and from remotely located devices, equipment, or machines. A cellular mobile radiotelephone ("CMR") system or network can transmit data between a user and a remote device such as a vehicle, vending machine, utility meter, security alarm system, community antenna television ("CATV") pay-per-view ("PPV") terminal, etc. The user can obtain telemetry data from sensors or other data acquisition apparatus coupled to the device to remotely acquire information about the device's operations, operating status, or operating environment. The user can also send messages to the device via the CMR system, for exampling requesting specific information or controlling some aspect of the device's operation.

As an alternative to consuming the voice-carrying bandwidth of the CMR system, two-way communications between remote equipment and a central facility or other site can transmit on the CMR system's secondary channels or overhead control channels. That is, the control channels of a CMR system, such as an advanced mobile phone system ("AMPS") cellular system, can support data communications with devices with minimal impact on person-to-person voice communications. In its role for voice communications, an overhead control channel transmits data that controls communication actions of mobile and portable radiotelephones operating on the CMR system. An overhead control channel, which typically supports digital communication, can be a paging channel or an access channel, for example. The cellular system uses the control channels to communicate information for handling incoming and outgoing call initiations between the cellular system and a cellular customer. Since these control channels generally have greater message handling capability than the cellular system needs for handling voice traffic, they can convey telemetry data without impairing voice communications.

In this manner, bidirectional data communication with a telemetry system, such as a monitor, controller, sensor, or similar device coupled to a data source, proceeds on the overhead control channel. Such a telemetry system may comprise a CMR transceiver that sends and receives data on the overhead control channel. The term "telemetry system," as used herein, refers to a system that acquires, senses, or otherwise obtains information from a remote machine, apparatus, device, or other source and transmits the information to a receiving station or site for recording, analysis, viewing, or other purpose. An individual or a computer can request and obtain position, movement, or geographic data from a telemetry system attached to a vehicle by communicating on the overhead control channels of the CMR system, for example. To name a few more of the numerous potential applications, the overhead control channels can convey messages that comprise security alarm reports, copy counts for photocopiers, utility meter readings, pipeline corrosion monitoring results, vending machine sales, railroad crossing gate information, pollution data, geo-positions of containers, and control signals for electricity, solenoids, or fluid flow.

The communication of telemetry data and device commands to and from a CMR transceiver of a telemetry system can overlay upon the control channel infrastructure that the CMR system uses for handling roaming cellular telephones. Such telemetry communication over an overhead control channel can emulate or mimic a CMR system's verification of a cellular telephone operating outside of its home system, known as roaming. Upon power up, a roaming cellular telephone recognizes that it is outside its home system and sends its Mobile Identification Number ("MIN") and Electronic Serial Number ("ESN") to the cellular system over an overhead control channel. The cellular system recognizes the roaming number and routes the MIN and ESN to the roaming cellular telephone's home system for validation via an intercellular network, known as the intersystem signaling or Electronic Industries Association/Telecommunications Industry Association ("EIA/TIA") Interim Standard 41 ("IS-41") network, that interlinks multiple cellular systems throughout the United States and uses signaling system 7 ("SS7") protocol.

The assigned MIN address of each transceiver causes the CMR system to route transmissions having that MIN address (and accompanying ESN digits) to a communication gateway that handles telemetry communications via the IS-41 network. While the MIN identifies the transceiver/telemetry system, the ESN data field carries telemetry data, for example in the form of a 32-bit message. The communication gateway adds a timestamp to each communication that it handles. The IS-41 network adds a coarse location of the message's point of origin, known as a mobile switching center identification ("MSCID").

A typical AMPS cellular telephone system may have 42 overhead control channels that are assigned among competing cellular carriers in each market. Each overhead control channel has a forward overhead control channel ("FOCC") and a reverse overhead control channel ("RECC"). The FOCC conveys information from the cellular base station to the cellular telephone. Conversely, the RECC conveys information from the cellular telephone to the base station. The cellular system initiates each cellular telephone call using the overhead control channels and then directs the cellular telephone(s) associated with the call to a voice channel. Upon establishing the service on a voice channel, the overhead control channel clears, thereby becoming free or available.

The FOCC broadcasts information concerning the system identification ("SID") of the cellular system on a frequent basis for receipt by cellular telephones in the broadcast domain. When a cellular telephone powers up or is turned on, it compares the SID of its home system, which it stores in non-volatile memory, to the broadcast SID. If the comparison indicates that the cellular telephone is roaming, the cellular telephone checks the FOCC message stream for registration instructions from the local cellular system operator. The instructions may command each roaming cellular telephone to register its identity over the RECC to the cellular system on a time basis, such as daily, or an event basis at each call.

When the roaming cellular telephone registers with the non-home or roaming cellular system, it sends its MIN and ESN via the RECC to the mobile switching center ("MSC"). The IS-41 provides connectivity between each of the MSCs in the United States and facilitates identifying roamers.

For example, suppose a cellular user having a home base in Miami is roaming in an Atlanta cellular system. Recognizing that the first six digits of the roaming cellular telephone's MIN do not correspond to an Atlanta cellular telephone number, the Atlanta MSC determines that the cellular telephone is not one of its Atlanta cellular customers. The Atlanta MSC compares the first six MIN digits to a database and determines that the cellular telephone's home MSC is Miami-based. Once identified, the Atlanta MSC routes a request for validation to the cellular telephone's home MSC in Miami. In response to the request, the home MSC in Miami checks its local database to validate the MIN and ESN, determine if the customer's bill is current, and identify any custom calling features that the customer is entitled to receive. The Miami MSC sends a registration notification or validation response comprising the requested information back to the Atlanta MSC. Through this process, the validated roaming cellular telephone customer receives the same level of cellular service in the Atlanta MSC as in the home MSC in Miami. Meanwhile, the Atlanta MSC receives assurance that the roaming cellular telephone customer is not fraudulent.

Messages containing telemetry data have the same outward format as the validation messages of the Miami-to-Atlanta roaming example. Thus, the CMR system's roaming registration process handles each telemetry message as if it was an actual validation message from a roaming cellular telephone. However, rather than directing the telemetry messages to an MSC of a cellular service provider, the communication gateway captures or intercepts telemetry messages on the RECC to obtain the telemetry data carried thereon. Information added to the database of the roaming MSC controls the dedicated MINs that are assigned to the communication gateway. The CMR transceiver, comprising a telemetry radio, emulates the roaming cellular telephone. In a telemetry scenario, the MIN is the 10 digit equipment identification ("ID") and the ESN comprises the data payload.

In order to appear transparent to the cellular system, the communication gateway emulates a home MSC. The communication gateway sends the proper validation response, indicating that the MIN and the ESN are valid, back to the roaming MSC. After a preset period of time, the communication gateway sends a registration-cancel message for each telemetry message. This action avoids filling up the visitor location register ("VLR") of the roaming MSC with unnecessary entries. That is, deleting the VLR entries prevents the registration from remaining in the roaming MSC's VLR for an extended period of time. In contrast, standard registrations associated with voice traffic remain in the VLR until a specified time for re-registration occurs, which could be as long as 24 hours, or until the home MSC informs the roaming MSC that the roaming cellular telephone has moved to another MSC system.

For communication to the telemetry system via the FOCC, the communication gateway accepts outgoing messages via an Internet protocol ("IP") message transmitted on frame relay, Internet, or a landline phone call. The communication gateway, in turn, sends a message to the visiting MSC via the SS7/IS-41 network. The MSC's translations database has a configuration that accepts the MINs associated with telemetry communication in the MSC's market area.

Since an outbound or forward message does not have an ESN field, an alternate coding system provides remote control of the telemetry transceiver and its host equipment. In one conventional technique, aggregating multiple outbound messages creates a small data packet. That is, a plurality of outbound messages, transmitted serially on a singe FOCC, each carry a portion of a command or instruction. The telemetry transceiver receives the serially transmitted messages, each containing a message fragment, and merges these fragments into a unified message. This technique is often inefficient and limited in terms of its speed of message delivery.

In another conventional technique for communicating messages to a telemetry system, each potential message has a corresponding unique MIN. The telemetry system recognizes receipt of the unique MIN as delivery of a specific instruction. For example, a vending machine operator may send out a specific MIN on an FOCC to request sales data from a vending machine having a telemetry system. In this conventional technique, each unique MIN corresponds to exactly one identifiable message. The number of messaging MINs assigned to each telemetry system has a one-to-one correspondence to the number of messages that the telemetry system can interpret. CMR systems typically do not have an unlimited number of MINs, and assignment of each MIN incurs an associated cost. Thus, one disadvantage of this technique is its consumption of MINs.

Another conventional scheme for communicating with a telemetry system uses a single overhead control channel for bidirectional communication. The telemetry system receives an instruction on the FOCC of an overhead control channel and returns a response to the instruction on the RECC of the same overhead control channel. One problem with this scheme is that the RECC typically does not become immediately available for sending a reply following transmission of the instruction on the FOCC. Depending on the speed of the MSC, a CMR system may need up to 65 seconds to clear the overhead control channel prior to communicating the reply on the RECC. Because the MSC and the CMR system perform multiple steps to provide forward and reverse communication, the aggregate time for sending an instruction message to a telemetry system and receiving a response message from the telemetry system can be two times 65 seconds, or 130 seconds. During this delay time, the MSC builds a VLR entry and then deletes or "tears down" the entry in response to instructions from the communication gateway. As discussed above, deleting VLR entries associated with telemetry messages preserves the available capacity of the VLR database. One shortcoming of this conventional scheme is that the communication latency or time delay can pose problems for telemetry applications. For example, the 130-second delay can be unacceptable in certain time-critical circumstances.

An application of wireless telemetry that often has little tolerance for such delays is remote monitoring or control of a vehicle. If a vehicle owner needs to find his or her vehicle, the owner may lack the patience or the time to wait 130 seconds or some other significant period of time to receive the vehicle's location over a conventional overhead control channel.

Power consumption or battery life often poses another problem for many conventional telemetry systems mounted in vehicles for mobile operations. That is, telemetry devices based on conventional technology may not offer a sufficient level of energy efficiency. If all of the subsystems associated with the telemetry system are powered up and operational and the vehicle's alternator is not recharging the vehicle's battery, the total power consumption may pose an unacceptable battery drain. On the other hand, if all of the vehicle's telemetry capabilities are turned off or disconnected from the battery, all telemetry functionality may be lost. Conventional telemetry systems often fail to operate in a manner that adequately preserves battery life while providing an acceptable level of functionality or readiness. For example, a car dealer may want all of the telemetry system's capabilities to remain immediately available for on-the-spot demonstrations to potential customers. However, to maintain the desired level of readiness, a conventional telemetry system may drain the vehicle's battery in an unacceptably short period of time.

Another problem with some conventional telemetry systems that monitor vehicles is that they may fail to provide a sufficient level of functional capability. Such a telemetry system may monitor a vehicle's operation and provide notification to a remote owner upon an occurrence of a designated event, such as a theft attempt. However, the telemetry system may fail to consider the circumstances surrounding the event or other events that preceded or followed that event. In other words, conventional technology for vehicle telemetry may not provide an adequate level of processing or analysis of sensor data. Without adequate processing of sensor data, a user of the telemetry system may be overwhelmed with extraneous data or false alarms. The data of interest to the user may be buried in the extraneous data and not readily apparent. Thus, telemetry systems based on conventional technology may not adequately highlight operating conditions or events of potential concern to the vehicle's owner.

To address these representative deficiencies in the art, what is needed is an improved capability for monitoring and controlling a vehicle via wireless telemetry. A further need exists for a capability for providing telemetry functionality on an as-needed basis while managing power consumption. Yet another need exists for processing telemetry data to identify conditions or events that warrant sending a notification or alert to a remote party.

SUMMARY OF THE INVENTION

The present invention supports controlling various aspects of a vehicle from a remote location via a wireless link that comprises an overhead control channel of a CMR system or network. In one aspect of the present invention, the wireless link between the remote location and the vehicle can overlay or use the CMR system's call-handling infrastructure or overhead control channels with minimal or no impact on the CMR system's voice-carrying capacity.

A telemetry system at the vehicle end of the link can comprise or couple to a controller and/or a sensing system. In its controlling capacity, the telemetry system can take actions, such as manipulating the vehicle's door locks, allowing or preventing starting of the vehicle, pulsing lights or a horn, or opening and shutting a switch connected to another system at the vehicle. A user can enter a message, such as a command, a prompt, or a request for information, into a remote station for transmission over the wireless link to the telemetry system. The telemetry system can respond to receipt of the message and control some aspect of the vehicle's operation or acquire requested information from monitors or sensing devices coupled to the vehicle or its operating environment.

Further, a data processing system may comprise the remote station. The data processing system may receive a voice command, interpret the voice command, and send a signal to the vehicle requesting the command or action be performed at the vehicle. The vehicle then receives the signal and performs the action. The action or command may comprise unlocking doors, pulsing lights, or pulsing a horn. The action or command may also comprise disabling the vehicle.

The discussion of wireless communications and interactions with a vehicle presented in this summary is for illustrative purposes only. Various aspects of the present invention may be more clearly understood and appreciated from a review of the following detailed description of the disclosed embodiments and by reference to the drawings and claims.

Figure 1:
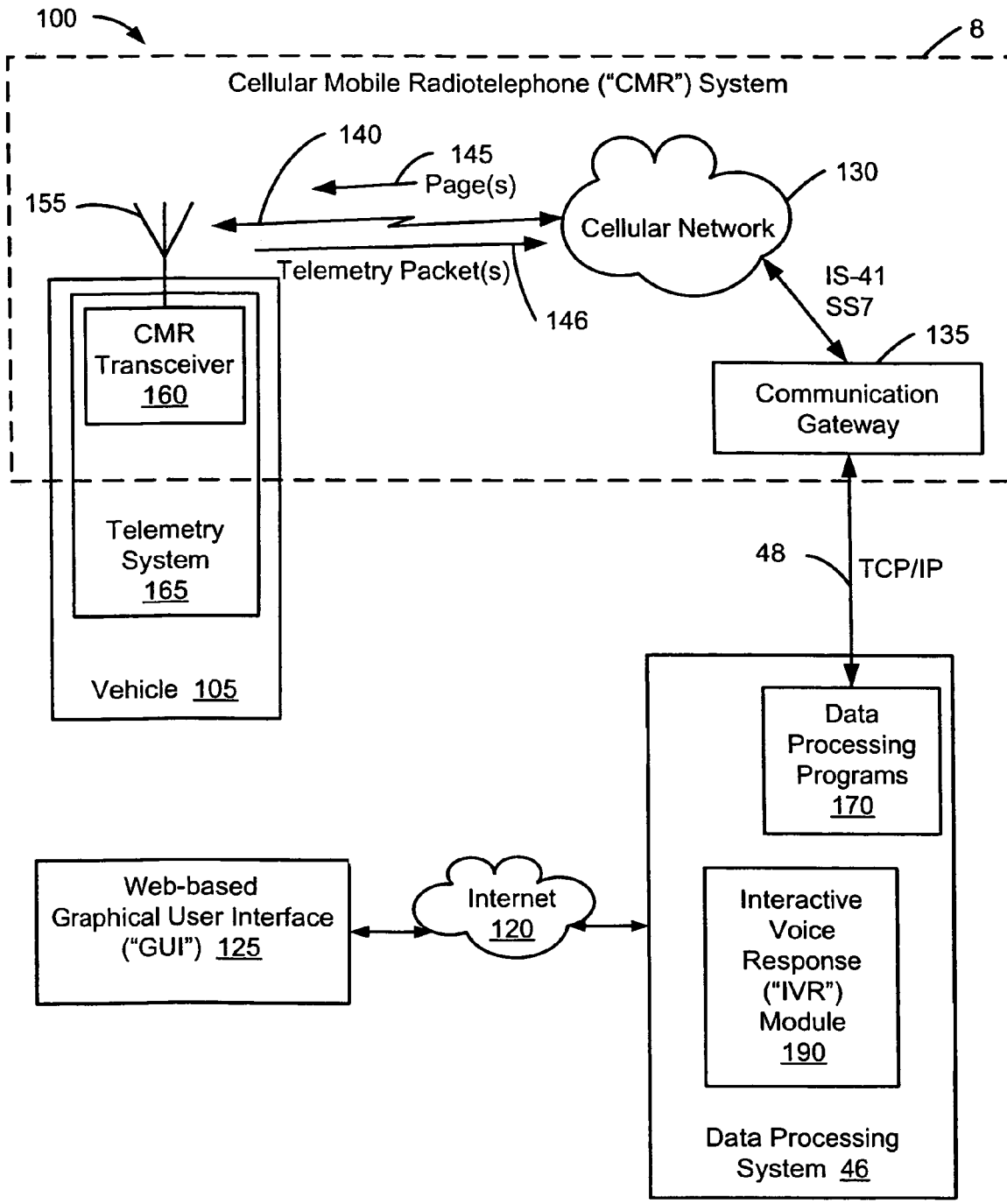
FIG. 1 is an exemplary functional block diagram illustrating a cellular-based system for wireless communication with a telemetry system coupled to a vehicle according to an embodiment of the present invention.

Many aspects of the invention can be better understood with reference to the above-described drawings. The components in the drawings are not necessarily to scale, emphasis instead being placed upon clearly illustrating the principles of exemplary embodiments of the present invention. Moreover, in the drawings, reference numerals designate corresponding parts throughout the several views.

DETAILED DESCRIPTION OF EXEMPLARY EMBODIMENTS

Figure 2:
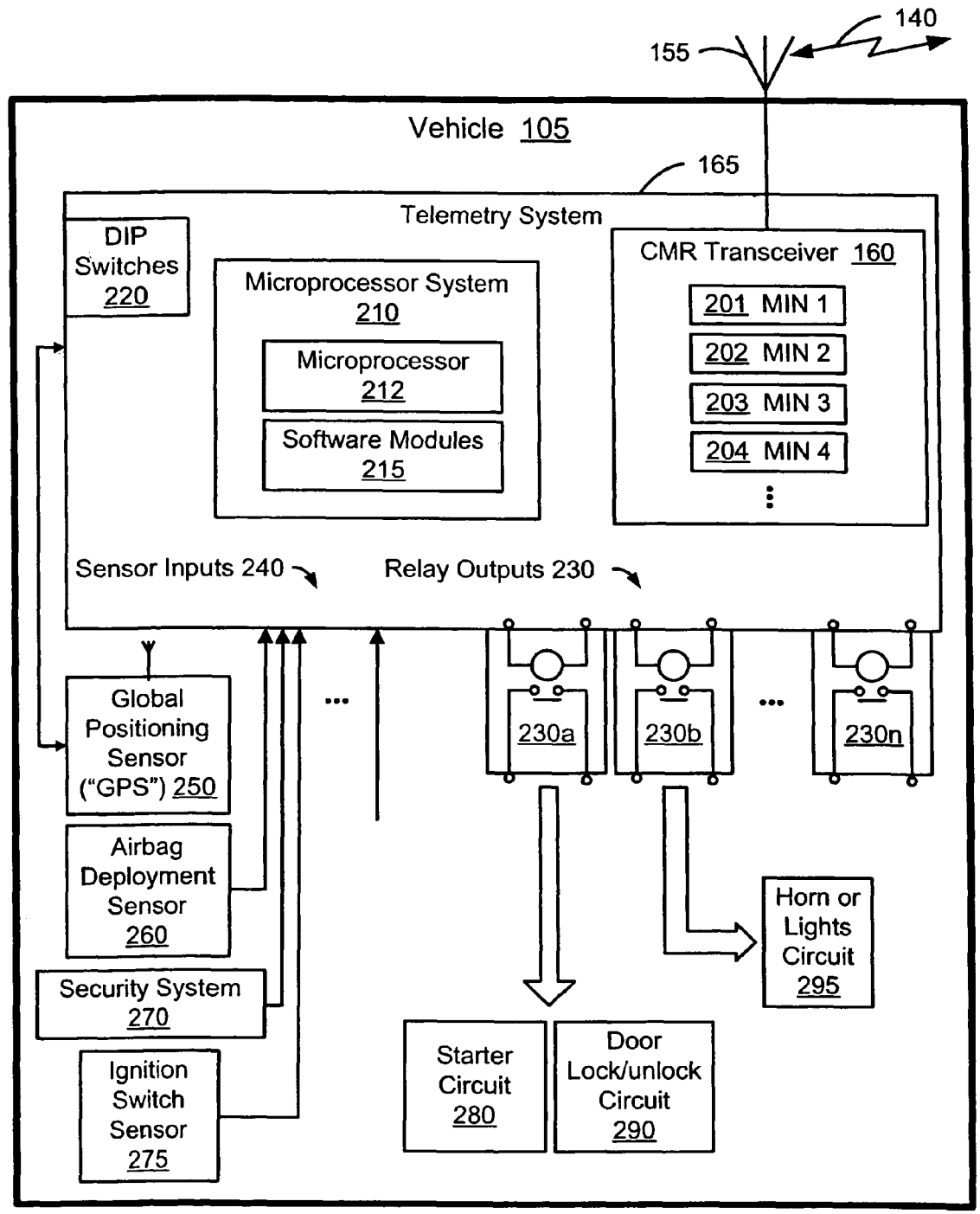
FIG. 2 is an exemplary functional block diagram illustrating a telemetry system coupled to a vehicle according to an embodiment of the present invention.

Exemplary embodiments of the present invention can communicate data, such as bidirectional telemetry messages comprising sensor data or commands, using a plurality of overhead control channels of a wireless communication network. A method and system for communicating wireless communication will now be described more fully hereinafter with reference to FIGS. 1-8, in which embodiments of the present invention are shown. FIGS. 1 and 2 provide block diagram illustrations of an exemplary implementation of a telemetry system coupled to vehicle. FIG. 3 illustrates an exemplary cellular communication system. FIG. 4 illustrates an exemplary communication link based on cellular control channels. FIGS. 5-8 illustrate flowcharts for exemplary processes involving wireless communication in a vehicle telemetry application. FIG. 9 illustrates an exemplary microprocessor system comprising software modules. FIGS. 10-13 illustrate flowcharts for exemplary processes for conserving power consumption of a telemetry system. FIGS. 14-17 illustrate flowcharts for exemplary application-oriented processes for a telemetry system.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others supported by exemplary embodiments of the present invention.

Turning now to FIG. 1, this figure illustrates a functional block diagram of a cellular-based system 100 for wireless communication with one or more vehicles 105 according to an exemplary embodiment of the present invention. In the case of multiple vehicles 105, only one of which FIG. 1 illustrates, each vehicle 105 can be a member of a fleet that is dispersed across a geographic area, such as a city, portion of a city, region, state, or larger area. A business entity, such as a trucking company, can operate such a fleet and manage various operational aspects via wireless communication. On the other hand, an owner of a specific vehicle 105 can send commands to and receive operational data from that vehicle 105 via the cellular-based system 100. The vehicle 105 can be a car, truck, train, tractor-trailer truck, delivery van, boat, ship, airplane, etc.

Each vehicle 105 has a telemetry system 165 that senses and controls various aspects of the vehicle 105 or the vehicle's operating environment. The vehicle's owner can remotely disable the vehicle 105 or determine its geographic location from the web-based graphical user interface ("GUI") 125, for example.

A CMR transceiver 160 and its associated antenna 155, typically mounted to the vehicle 105, communicate data over a bidirectional wireless link 140 in a CMR system 8. The CMR transceiver 160 comprises circuitry (not shown) for processing incoming and outgoing wireless signals through the CMR system 8.

The CMR system 8 includes a cellular network 130 that supports wireless communication between a communication gateway 135 and the CMR transceiver 160. Communications 145 in the CMR system 8 from the communication gateway 135 to the CMR transceiver 160 transmit in the cellular network's paging channels or FOCCs. Communications 146 from the transceiver module 160 to the communication gateway 135 transmit in the cellular network's RECCs.

As discussed above, communicating data to and from the vehicle 105 in overhead control channels preserves the CMR system's communication bandwidth for other communication functions, such as voice traffic. Thus as described in further detail below with reference to FIGS. 3A and 3B, the data processing system 46 depicted in FIG. 1 can support multiple communication applications in tandem with vehicular communication. A single CMR system 8 can carry voice communications while carrying data communications associated with vehicles 105 and a variety of other equipment (not shown in FIG. 1). Stated another way, the depicted communication system 100 provides economical two-way communications between remote equipment and a central facility using an underutilized portion of an AMPS cellular telephone system, the overhead control channels.

In one exemplary embodiment of the present invention, a system other than an AMPS cellular telephone system conveys data from the vehicle 105 to the data processing system 46 (and visa versa). Such a non-AMPS system can be either a cellular or a non-cellular system based on various transmission protocols. In one exemplary embodiment of the present invention, communication between the vehicle 105 and the data processing system 46 comprises digital transmission or short message service ("SMS") transport.

The communication system 100 can comprise Digital AMPS ("DAMPS"), Code Division Multiple Access ("CDMA") or Interim Standard 95 ("IS-95"), Time Division Multiple Access ("TDMA") or Interim Standard 136 ("IS-136"), the Global System for Mobile communications ("GSM"), Enhanced Data Rates for Global Evolution ("EDGE"), General Packet Radio Service ("GPRS"), or various two-way paging protocols, to name a few alternatives. The system's wireless transport can support a data capacity of 8,000 bits per second or more, for example. In one exemplary embodiment of the present invention, the communication system 100 is based on the communication platform marketed by Numerex Corp. of Atlanta, Ga. under the registered trademark "CELLEMETRY" and can have an uplink payload or packet size of 32 bits. In one exemplary embodiment of the present invention, the communication system 100 comprises a satellite data link, such as provided by the system that Vistar Datacomm markets under the name "GlobalWave®", and can have an uplink payload size of 88 bits. In one exemplary embodiment of the present invention, the communication system 100 is linked to the communication service that Aeris-.net of San Jose, Calif. markets under the name "MicroBurst®".

The CMR transceiver 160 sends information acquired from the telemetry system 165 or other data sources at the vehicle 105 as telemetry packets 146 through the cellular network's control channels to the communication gateway 135. In one exemplary embodiment of the present invention, each telemetry packet 146 comprises a 32-bit word or has a 32-bit word payload. However, each telemetry packet can have a larger payload such as a payload in a range of 32 to 300 bytes. In one exemplary embodiment of the present invention, each telemetry packet comprises 88 bits.

The CMR transceiver 160, which may also be referred to as a transceiver module or as a transmitter-receiver pair, receives data communicated in the form of incoming pages 145 transmitted over the cellular network 130 on the FOCC. Pages 145 received by the transceiver module 160 can include commands, programming, prompts, instructions, requests for telemetry data, and configuration data, to name a few examples. A page 145 can comprise a request to the telemetry system 165 to report the vehicle's location or an instruction to unlock the vehicle 105, for example.

Communication between the communication gateway 135 and the cellular network 130 can conform to any one of a variety of communication protocols such as SS7 and IS-41. SS7 is a communications protocol historically used to transfer public switched telephone network ("PSTN") data traffic onto a separate wireline or wireless network rather than the originating network for the call. As discussed herein in further detail, IS-41 is a standard for communications between cellular systems.

A data processing system 46, typically collocated with the communication gateway 135, communicates with this gateway 135 via transmission control protocol and Internet protocol ("TCP/IP") over a hardwire data link 48. TCP/IP is a communication method that combines TCP and IP functions. While IP handles data delivery, TCP tracks packets, which are units of data, divided for efficient routing through a communication network, such as the Internet 120. More specifically, TCP provides a transport function that matches the message sizes on either end of a communication link and thereby ensures that messages received at a destination are the correct messages intended for that destination. The IP function includes a computer address on a network. Each computer in a TCP/IP network has a specified address that may be permanently assigned or reassigned at each startup. Since TCP/IP messages contain an address of a destination network as well as an address of a destination station on the destination network, TCP/IP messages readily transmit across or between multiple networks, such as the Internet 120 and the cellular network 130 of the cellular based system 100 that FIG. 1 depicts.

The data processing system 46 comprises data processing programs 170 that process incoming data from the communication gateway 135 and handle various aspects of outgoing communication. The data processing system 46 can also comprise one or more databases (not shown) that store or archive processed or raw data passing through the communication gateway 135.

Certain of the data processing programs 170 may be specific to the vehicle application while other data processing programs 170 support data services with other equipment connected to the CMR radio telephone system 8, such as electrical utility monitors or vending machines (not shown). That is, these programs 170 may process incoming and outgoing messages from multiple applications that transmit data through the CMR system 8 via the communication gateway 135.

In one exemplary embodiment, the data processing system 46 comprises an interactive voice response ("IVR") module 190 that can include software programs. The term "interactive voice response module" or "IVR module," as used herein, refers to a computer-based system that processes a voice message or spoken word to determine that the message has a specific meaning selected from multiple possible meanings.

An owner of the vehicle 105 or other authorized individual can interact with the IVR module 190 by placing a wireline or wireless telephone call to a telephone number dedicated to the data processing system 46. A PSTN, which FIG. 1 does not explicitly illustrate, can carry the incoming call to the data processing system 46. The IVR module 190 answers the incoming call and interacts with the owner. For example, the IVR module 190 can ask the owner to identify a specific service request, such as identifying the vehicle's location, disabling the vehicle 105 or the vehicle's starter, or unlocking the vehicle's doors. The IVR module 190 can interpret the owner's spoken request and respond accordingly. For example, the IVR module 190 can initiate sending a message via one or more FOCCs to the CMR transceiver 160. The message could comprise an instruction to return the vehicle's location, to disable the vehicle 105, or to unlock the vehicle's doors, for example.

Internet-based connectivity to a web-based graphical user interface ("GUI") 125 provides other forms of remote user interaction with the telemetry system 105. A vehicle owner can enter into the GUI 125 a request for data from the telemetry system 165 or a command that controls some aspect of the vehicle's operations, such as arming a security system or unlocking the vehicle's doors. The GUI 125 can also display data transmitted by the CMR transceiver 160 to the data processing system 46. The Internet 120 that connects the data processing system 46 to the GUI 125 allows a user, such as the vehicle's owner, to interact with the vehicle 105 and its telemetry system 165 from essentially any facility or site that provides Internet connectivity.

The GUI 125 can comprise a personal computer ("PC") though which the user enters data, requests information, performs other input-related interactions, and views displayed data, operational recommendations, and other information. The PC, or another computer, can include various software modules (not shown) that perform high-level data processing in collaboration with the data processing programs 170 of the data processing system 46, for example. Such software modules can output recommendations to the user for example.

While the exemplary system architecture depicted in FIG. 1 supports remotely situating the web-based GUI 125 with respect to the data processing system 46, these system components 125, 46 can be located in a common facility, building, or complex or in a single equipment enclosure. In one exemplary embodiment of the present invention, the depicted Internet network 120 is replaced with an intranet that communicates information within a campus and thus offers access to the data processing system 46 and its software functions, as available, to users throughout the campus. In one exemplary embodiment of the present invention, a distributed computing network links the web-based GUI 125 to the data processing system 46.

Turning now to FIG. 2, this figure illustrates a functional block diagram of a vehicle 105 coupled to a telemetry system 165 for bidirectional communication with a remote data processing system 46 according to an exemplary embodiment of the present invention. The telemetry system 165 interfaces with sensing devices 290, 260, 270, 275 and control devices 280, 290, 295 linked to the vehicle's operation or operating environment.

Exemplary sensing devices 250, 260, 270, 275 can measure, monitor, or detect some aspect of the operation or state of the vehicle 105 or the vehicle's operating environment. On the other hand, exemplary control devices 280, 290, 295 can change, alter, or refine some aspect of the operation or state of the vehicle 105 or the vehicle's operating environment. In one exemplary embodiment of the present invention, the telemetry system 165 comprises such sensing and control devices. The telemetry system 165 can also interface with external sensing and control devices. For example, the telemetry system 165 can either comprise or interface with a controller, such as a programmable logic controller ("PLC"). Such an interface can comprise a serial link, parallel bus, current loop, optical link, or other communication link.

The global positioning sensor ("GPS") 250 determines the geographic position, speed, and heading of the vehicle 105 based on signals from a system of satellites orbiting the earth. A serial or parallel link between the GPS 105 and the telemetry system 165 supports device-to-device communication. The telemetry system 165 can prompt the GPS 250 to output navigational data for logging or for transmission to the data processing system 46 via the CMR system's overhead control channels 140. The telemetry system 165 can also control power to the GPS 250, for example turning it off or on based on need or in response to an event. As an alternative to the GPS 250, other forms of navigational devices or position sensors can report navigational information to the telemetry system 165. For example, a speedometer and compass (not shown) can provide speed and directional information to the telemetry system 165.

An embodiment of conveying GPS data over a wireless network is described in U.S. Pat. No. 6,718,237 by Murray and Jansson, entitled "Method for Reducing Capacity Demands for Conveying Geographic Location Information over Capacity Constrained Wireless Systems" and granted on Apr. 6, 2004. The contents of U.S. Pat. No. 6,718,237 are hereby incorporated by reference.

In addition to the dedicated communication link that supports communication with the GPS 250, the telemetry system 165 comprises sensor inputs 240 that support lower data rates. One of the sensor inputs 240 interfaces with an airbag deployment sensor 260 that provides status of the vehicle's airbag. For example, the airbag deployment sensor 260 can output a single pulse or toggle (close or open) a contact or switch upon airbag deployment. The telemetry system 165 can receive notification of the airbag's deployment from the airbag deployment sensor 260 and send a wireless message to a remote owner of the vehicle 105. That message, which transmits over the overhead control channel link 140, can serve as an indication to the vehicle's owner that the vehicle 105 may have been involved in an accident. A change in the status of the airbag deployment sensor 260 may also indicate another condition or event of interest to the owner, for example airbag tampering or unwanted intrusion.

The security system 270 monitors the vehicle 105 for theft, malicious activities, break in, security threats, or similar conditions or events posing the possibility of compromising the vehicle 105. Car manufacturers or dealers often offer such security systems 270 as purchase options. Alternatively, the security system 270 can be an aftermarket device. Upon detecting a threatening condition or intrusion, the security system 270 outputs a signal that the telemetry system 165 receives through one of its sensor inputs 240.

Receiving a threat notification from the security system 270 can trigger the telemetry system 165 to send notification of the threat to the GUI 125 for display to the owner. At the time of such a threat, software modules 215 in the microprocessor system 210 can comprise instructions that apply logical rules to the state of the vehicle 105 as determined by the sensor inputs. Based on such rules, the telemetry system 165 can respond to the threat by sending the vehicle's location to the GUI 125, tracking the vehicle's movements, or disabling the vehicle's starter circuit 280, for example.

The ignition switch sensor 275 identifies an operational status or state of the vehicle 105. That sensor 275 can determine if the ignition is off, indicating that the vehicle 105 and the vehicle's engine are off or not running. A driver normally turns the ignition or ignition switch to the off setting to park or store the vehicle 105. The sensor 275 can also determine if the ignition is on, which is the state for driving the vehicle 105 in which the vehicle's engine runs. The ignition sensor 175 can further identify the ignition's start state. That is, the sensor 175 can determine whether the driver has turned the key to a position for starting the vehicle's engine. Thus, the ignition switch sensor 275 can provide the telemetry system 165 with information regarding whether a driver has attempted to set the vehicle into one of three states, namely on, off, and start.

The telemetry system 165 comprises relays 230 that support outputting signals to various electrical, mechanical, or computer-based systems of the vehicle 105. Software programs, in the form of software modules 215, executing on the microprocessor system 210 can energize each these relays 230 to control a device, circuit, or system connected thereto. Energizing a relay 230 can comprise sending electricity to or removing electricity from a relay's coil to either open or shut the relay 230. That is, the microprocessor system 210 can close a relay 230 that is normally open, in its un-energized or relaxed state. Conversely, a signal from the microprocessor system 210 can open a relay 230 that is normally closed, in its un-energized or relaxed state. As an alternative to an electromechanical relay 230, the telemetry system 165 can interface to other output devices, including solid state systems such as amplifiers, silicon control rectifiers, operational amplifiers, diodes, or other devices that control or manipulate electricity.

According to the telemetry system's configuration or state, the relay 230a can interface to the starter circuit 280 or the door lock/unlock circuit 290. The state of the dual inline pin switches 220, as set during installation of the telemetry system 165, can specify whether the relay 230a controls starting the vehicle 105 or unlocking the vehicle's doors.

In response to a command from the vehicle's owner, transmitted on one or more of the CMR system's overhead control channels, the telemetry system 165 can set or trip the relay 230a to prevent unauthorized starting of the vehicle 105. In one embodiment, the telemetry system 165 energizes the relay during an unauthorized attempt to start the vehicle 105, thereby interruption the starting process.

If assigned to the vehicle's door lock/unlock circuit 290, the relay 230a can send a pulse of electricity to an electromechanical apparatus, such as a solenoid, linked to the vehicle's door locks. The interval of electrical energy can lock or unlock the door lock of the vehicle 105.

The relay 230b interfaces with the vehicle's horn or lights circuit 295. A vehicle owner who can not locate the vehicle 105 in a crowded parking lot can place a cellular telephone call to an operator at the data processing system 46 and request help. In response, the operator can initiate sending a page 145 on an overhead control channel 140 to the telemetry system 165. In response to the page, the telemetry system 165 can engage the relay 230b to pulse the vehicle's horn or lights.

The microprocessor system 210 controls operations of the telemetry system 165 based on sensory information and commands received via the control channel data communication link 140. That system 210 comprises a microprocessor 212 or microcontroller that executes instructions or code of the software modules 215.

The microprocessor system 210 can comprise a variety of digital circuitry elements including flash memory, random access memory ("RAM"), a digital-to-analog converter ("DAC"), an analog-to-digital converter ("ADC"), and timing circuits. Flash memory can facilitate software upgrades or replacements. RAM can support data storage and program execution.

The microprocessor system 210 can further comprise various types of memory such as any one or combination of volatile memory elements (e.g., forms of RAM such as DRAM, EPROM, EEPROM, SRAM, SDRAM, etc.) and nonvolatile memory elements (e.g., ROM, hard drive, tape, CDROM, etc.). Moreover, the microprocessor system's memory may incorporate electronic, magnetic, optical, and/or other types of storage media and can have a distributed architecture, where various components are situated remote from one another, but can be accessed by the microprocessor 212 or other computer of the telemetry system 165.

A "computer-readable medium" can be any means that can store, communicate, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM, EEPROM, or flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The microprocessor system 210 can also comprise logic implemented in hardware with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Further a microcontroller, functioning as the microprocessor 212, can comprise an integration of such digital logical devices.

The CMR transceiver 160 and it control channel data link 140 provide the microprocessor system 210 and the telemetry system 165 with connectivity to remote users and sites, including the web-based GUI 125 and the data processing system 46. That is a wireless transmitter and receiver pair, embodied in the CMR transceiver 160 and its associated antenna 155, implements the transmission and reception of data via the wireless data link 140.

The CMR transceiver 160 has a plurality of MINs 201, 202, 203, 204 for bidirectional communication over the data link 140 through the antenna 155. As discussed in further detail below, the telemetry system 165 uses these MINs 201, 202, 203, 204 for communication in a coordinated manner that enhances the bandwidth or data carrying capacity of the control channel data link 140 and reduces communication latency, dead time, delay, or lag. Thus, the four MINs 201, 202, 203, 204 function as a collaborative group and achieve a communication advantage over four individually operating MINs (not shown).

Figure 3A:
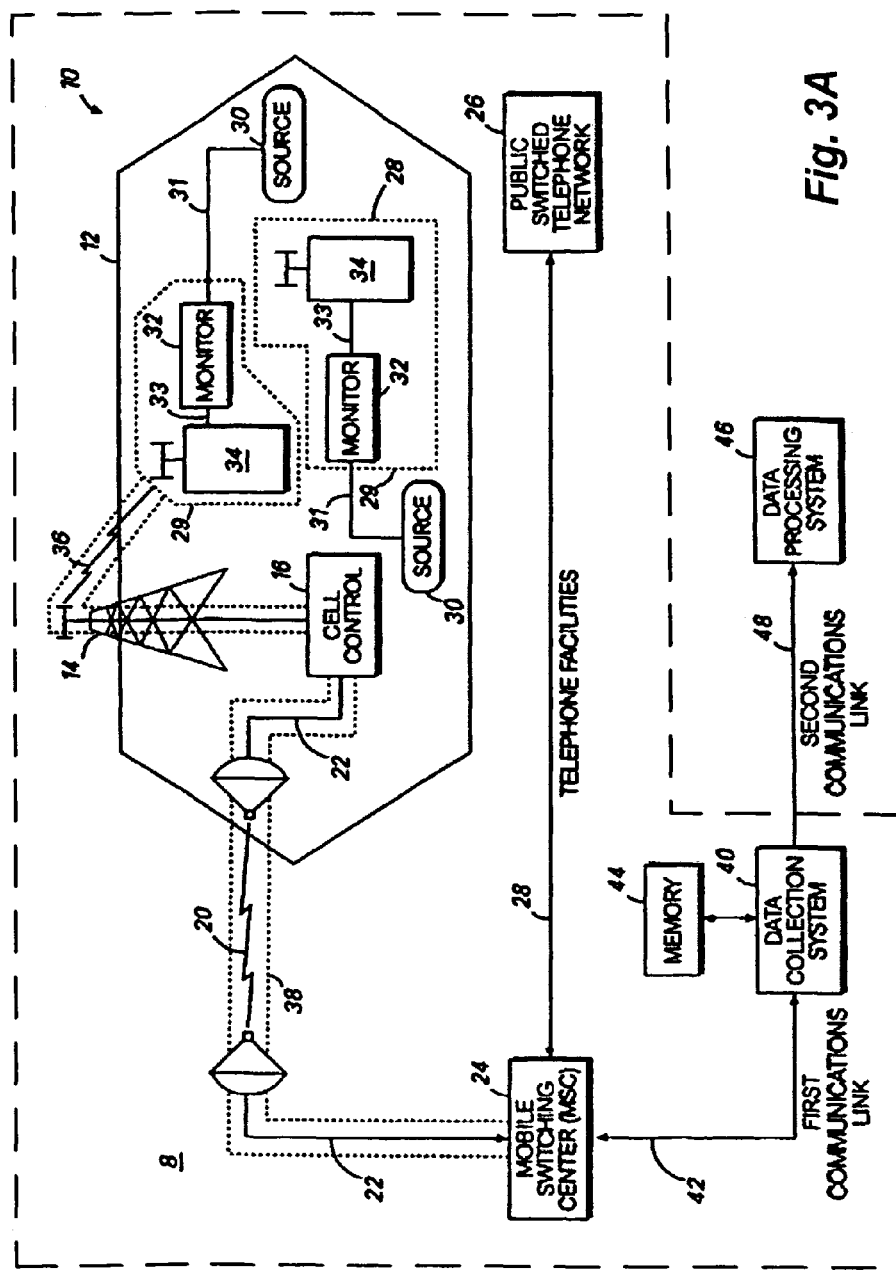
FIG. 3A is an exemplary functional block diagram of a cellular communication system according to an embodiment of the present invention.
Figure 3B:
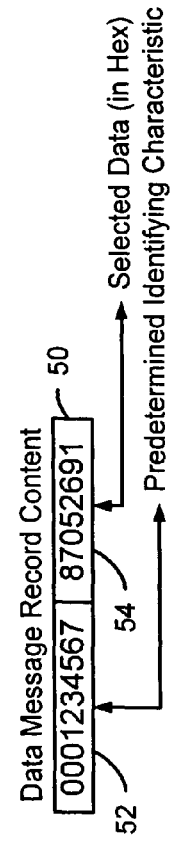
FIG. 3B is a table that shows an exemplary format for a data message communicated in the cellular communication system of FIG. 3A according to an embodiment of the present invention.
Figure 4:
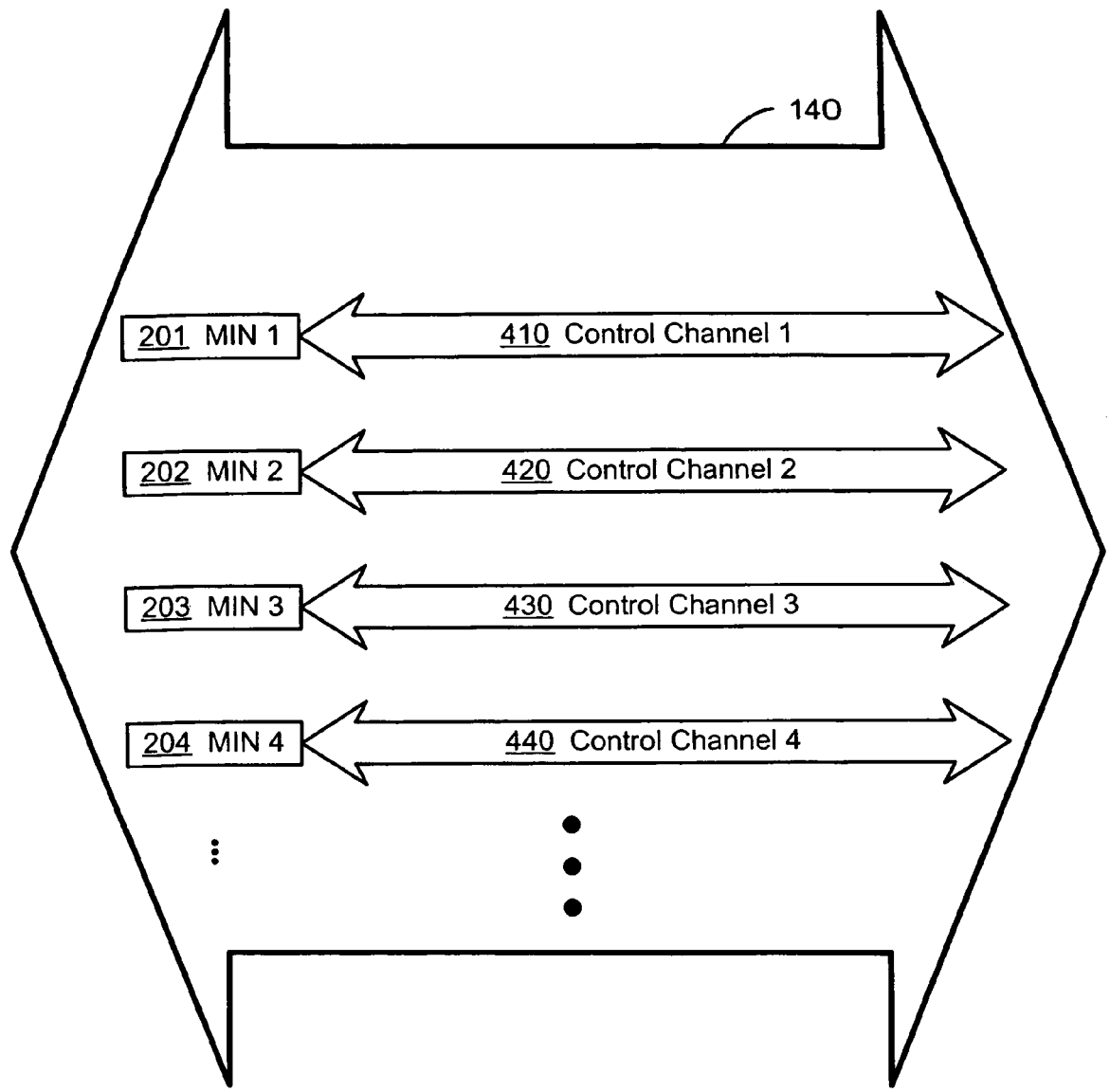
FIG. 4 is a schematic illustration of an exemplary wireless communication link according to an embodiment of the present invention.

Turning now to FIGS. 3A and 3B, an exemplary embodiment of a CMR system will be discussed in the context of general applications that can include voice and data communication, mobile communication, vending machines, vehicles 105, utility monitors, and other equipment. Specifically, FIGS. 3A and 3B respectively illustrate a CMR system 8 and its messaging packet format. The system 8 can provide a wide range of voice and data services in addition to communication with an individual machine, such as a vehicle 105. Also, the system 8 can interface with a network of machines, such as a fleet of vehicles or a system of vending machines dispersed throughout a geographic region. The following discussion of these figures is somewhat generalized rather than directed specifically a single application.

Referring now to FIG. 3A, this figure illustrates a functional block diagram of a data message system 10 in an operating environment of a CMR system 8 in accordance with an exemplary embodiment of the present invention.

The data message system 10 communicates data collected from remote data sources 30, such as a vehicle 105 or a GPS 250 as depicted in FIGS. 1 and 2, and includes a set of data reporting devices 29, at least one MSC 24 of the CMR system 8, and a data collection system 40 connected to the MSC 24. In one exemplary embodiment of the present invention, each reporting device 29 comprises the telemetry system 165 coupled to the vehicle 105 illustrated in FIGS. 1 and 2 and discussed above. Further, the data collection system 40 can be the communication gateway 135 of FIGS. 1 and 2. Each data reporting device 29 monitors operation of the remote data source 30 to obtain selected data, such as the location, speed, or security status of the vehicle 105.

The data reporting device 29 transmits data messages containing selected data to the MSC 24 via a cellular network control channel of the CMR system 8. The MSC 24 receives data messages from data reporting devices 29 operating within coverage areas of the CMR system 8. The MSC 24 sends the data messages to the data collection system 40 via a first communications link for processing of the information offered by the data messages.

By operating within the environment of a CMR system 8, which is well adapted for portable or mobile communications, one exemplary embodiment of the present invention can take advantage of an existing wide area communications network and avoid the expense of communicating with each remote data site via a dedicated telephone facility or two-way radios. A remote data site can be a parking lot, driveway, freeway, city, road, or other site that the vehicle 105 occupies, for example.

The data message system 10 adapts the existing environment of a CMR system 8 to communicate data from one or more remote sites to a central location. However, to conserve the use of voice channels of the CMR system 8 for telephone conversations, the data collection system 40 uses the cellular network control channel of the CMR system 8 for data communications. The data message is formatted to correspond to a call origination signal, which is normally transmitted by a cellular radiotelephone unit when the device originates a cellular telephone call for communication via a CMR system 8. This permits conservation of the valuable frequency spectrum dedicated to the voice channels of the typical CMR system 8.

In view of the foregoing, it will be understood that one exemplary embodiment of the present invention can adapt existing architecture and communications protocols of a typical CMR system 8 to supply an economical approach to the communication of telemetry data collected from numerous remote sites or vehicles 105. It will be further understood that the communication of data messages between an MSC 24 and the cellular communications device can be based upon established techniques and known protocols for CMR system communications. Accordingly, it will be useful to review the primary components and operation of a typical CMR system 8.

A CMR system 8 is generally characterized by dividing a radio coverage area into smaller coverage areas or "cells" 12 using low power transmitters and coverage-restricted receivers. The limited coverage area allows the radio channels used in one cell 12 to be reused in another cell (not shown). As a mobile radiotelephone within one cell 12 moves across the boundary of the cell 12 and into an adjacent cell (not shown), control circuitry associated with each cell 12 detects that the signal strength of the mobile radiotelephone in the just-entered cell 12 is stronger, and communications with the mobile radiotelephone are "handed-off" to the just-entered cell 12.

A CMR system 8 typically uses a pair of radio frequencies for each radio channel and each cell 12. Each cell 12 typically includes at least one signaling channel, also referred to as a cellular network overhead control channel or an access channel, and several voice channels. The overhead control channel is selected or dedicated to receive requests for service from mobiles and portables, to page selected mobiles or portables, and to instruct the mobiles or portables to tune to a predetermined voice channel where a conversation may take place. Accordingly, the overhead control channel is normally responsible for receiving and transmitting data to control the communication actions of the mobile and portable radiotelephones.

The overhead control channel normally comprises a FOCC for communications from the MSC 24 to a radiotelephone unit and a RECC for communications from a radiotelephone unit to the MSC 24. The FOCC supplies a multiplexed data stream of message data words, a busy idle signal, and busy idle bits. The busy idle bits supply a status indication of the RECC to monitoring radiotelephones. If a radiotelephone unit is using the RECC, then the RECC is considered busy and the busy idle bit is set to a binary one value. Alternatively, if the RECC is free or not in use, then the RECC is considered idle and the busy idle bit is set to a binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the overhead control channel during the window of opportunity that a transition from the busy state to the idle state presents. In particular, the busy idle bit supplies an instantaneous view of the signaling activity on the overhead control channel, and the radiotelephone is responsive to this instant snapshot of overhead control channel activity.

The data message and radio channel specifications for U.S. cellular radiotelephone systems are set forth in EIA/TIA Standard 553, implemented in accordance with 47 C.F.R. Section 22, in the Report and Orders pertaining to Federal Communications Commission ("FCC") No. 79-318. Copies of the EIA/TIA-553 may be obtained from the Engineering Department of the Electronic Industries Association at 2001 Pennsylvania Avenue N.W., Washington, D.C., USA 20006.

When a cellular mobile radiotelephone originates a call, it transmits at least one data message to the serving cell 12 of the CMR system 8. This request for a cellular voice channel, commonly referred to as a "call origination" function, is defined by EIA/TIA-553 and can be implemented as a message or signal having certain defined fields. For example, this call origination message can contain data fields for the low-order seven digits of the unit's telephone number, known as the MIN, the unit's station class mark ("SCM"), which identifies functional characteristics of the unit, and the called address, or dialed telephone number. Cellular system operators typically also require additional data words to be transmitted within a call origination message, including the MIN 2, which is the high order three digits or number planning area ("NPA") of the cellular unit's telephone number, and the ESN.

The MIN is assigned to a particular radio telephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like.

The call origination message is provided first to the serving cell 12 of the CMR system 8, and then through a data link to a MSC 24, which is sometimes referred to as a mobile telephone switching center or a "switch." The MSC 24 makes voice connections between mobile radiotelephones and other telecommunications networks. Software executing at the MSC 24 typically determines whether the radiotelephone identified by the message is an authorized user or subscriber by looking up the unit's telephone number, serial number, and other information supplied by the message to see if there is an entry in the MSC's user database (not shown) corresponding to that particular telephone. An optional function of an MSC 24 is to validate that the ESN and MIN received as part of a call origination message are valid. If the MIN is valid and the radiotelephone is identified as a subscriber within the given cellular system, i.e., a "home" unit, the MSC 24 compares the received ESN to a user database entry to detect fraud. If these checks succeed, the cellular call is then allowed to proceed.

When a mobile radiotelephone first powers up or first enters a CMR system 8 when already powered, the unit can identify itself as actively present within the system. The radiotelephone identifies itself or registers through a process known as autonomous registration by supplying a data packet of information similar to that of a call origination message. The autonomous registration signal, also referred to as a registration or an identification signal, typically comprises data fields for at least a mobile telephone number, i.e., the MIN, and an ESN. Unlike the autonomous registration signal, the call origination signal can include a data field containing the digits of the telephone number to be called, and a flag within a data field to distinguish this message from a registration signal.

An original design goal of autonomous registration was improving the efficiency of potential future call deliveries by informing the MSC 24 of the approximate whereabouts of each individual radiotelephone unit and by reducing paging channel load by lessening the need to page all cells 12 to find a particular cellular unit. Thus informed, the MSC 24 can later page or attempt to ring the cellular unit only in the cell 12 or area of the cellular unit's last known location. Additional cells 12 would be paged only if the initial page did not locate the particular radiotelephone. Thus, the autonomous registration function can be implemented as messages periodically and autonomously sent from the mobile radiotelephone to the serving cell 12 at an interval specified in data parameters previously received from the cell 12 by the cellular unit.

A subscriber using or attempting to use his or her mobile radiotelephone in a service area outside the home service area is said to be roaming, and he or she (and the associated mobile radiotelephone unit) is commonly referred to as a roamer. For example, if a subscriber enters the service area of another CMR system service provider and powers on the radiotelephone, the radiotelephone will subsequently receive a message via the overhead control channel of the particular cell 12 in which the telephone then resides. This message will include a request that the subscriber register for operation in the particular cellular system. In response, the radiotelephone unit transmits both the mobile telephone number and the serial number as identifying information back to the cell site 12. The cell 12 forwards this information to a MSC 24, which quickly ascertains whether the radiotelephone unit is a customer of the local cellular service provider or the customer of another cellular system.

If the radiotelephone unit is a customer of another cellular service provider, the MSC 24 will send a message packet to the home system for the particular telephone unit. This message indicates that the particular radio telephone unit has registered in another cellular system and requests information about the validity of the number and account information for the radio telephone unit. The home system responds by transmitting a responsive packet containing the requested information. If valid, the MSC 24 at the foreign cellular system will then add the roamer to its list of registered users and the home cellular system will add the subscriber associated with the radio telephone unit to a list of roamers that are out of the service area and registered in another area.

When this same radiotelephone unit registers with yet another system, the user database at the MSC 24 for the home system will observe that the unit has moved again and will update the database list of where the roaming unit has most recently registered in a user database system. In addition, it will send a message to the first foreign system providing notification that the roaming unit has now moved on and registered in another system, and that the first foreign system should delete the particular unit from its list of registered roamers. In this manner, the user databases at the various MSCs 24 are not cluttered with data identifying previously registered roamers as valid accounts for which service should be provided, when these roamers may have long since left the area of service.

The data message system 10 supports the collection and communication of data to a central data collection site 40 by reporting systems associated with numerous data sources 30. A typical CMR system 8 includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the MSC 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

A typical CMR system 8 comprises at least one mobile telephone switch coupled to an appropriate array of more or less identically equipped cell sites 12. The MSC 24 normally couples telephone conversations involving mobile radiotelephones operating in the cell 12 to the PSTN 26 through telephone facilities 26.

The data collection system 40 includes a set of data reporting devices 29, each comprising at least one monitor 32 for collecting data from remote data sources 30 and a cellular communications device 34 for communicating the collected data via an overhead control channel of the CMR system 8 to the MSC 24. The monitor 32 depicted in FIG. 3A, which is connected to a corresponding remote data source 30 via a signal path 31, obtains and records selected data directed to the operation or performance characteristics of the data source 30.

Referring briefly back to FIGS. 1 and 2, for collecting data in a vehicle application, each data reporting device 29 can comprise a CMR transceiver 160 coupled to one or more vehicle systems, via a telemetry system 165 as described above. The monitor 30 can include a GPS 250, an airbag deployment sensor 260, or a security system 270. The monitor 30 can also comprise a control function that may be integral with or separate from the telemetry system 165.

Referring now to FIG. 3A, the cellular communications device 34, which is connected to the corresponding monitor 32 via a signal path 33, prepares a data packet containing the selected data and transmits the packet as a data message. The communication device 34 can comprise the CMR transceiver 160 illustrated in FIGS. 1 and 2 and discussed above. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The MSC 24 receives the data message via a cellular network overhead control channel 38 formed by the combination of the data link 22 and a cellular communications link 36 between the broadcast antenna 14 and the cellular communications device 34. This combination of communications links is collectively referred to as the overhead control channel. A cellular network control channel for a typical CMR system 8 comprises two radio channels that are commonly described as a FOCC and a RECC, as described above. The FOCC serves communications initiated by the MSC 24 to a radiotelephone unit, while the RECC serves communications from the radiotelephone to the MSC 24. The communications operations between the MSC 24 and the cellular communications device 34 also follow this convention. In particular, the overhead control channel 38 comprises two separate data communications paths, an FOCC for communications initiated by the MSC 24 and an RECC for communications initiated by the cellular communications devices 34 (or mobile radiotelephones operating within the cell 12). Accordingly, the cellular communications device 34 transmits data messages via the RECC, whereas the MSC 24 transmits command signals via the FOCC.

In this manner, the MSC 24 receives data messages from each of the cellular communication devices 34 operating within the coverage areas of an array of cells for the CMR system 8. Although the data messages contain selected data rather than the parameters normally contained in an actual radiotelephone control information, the MSC 24 operates upon the data messages as if they were transmitted by a cellular radiotelephone unit operating within the coverage area of the CMR system 8 because the format of the data messages makes them appear as typical call origination signals generated by a radiotelephone unit.

The MSC 24, in response to a data message, can conduct one or more of the following operations: store the data message for processing at a later date, process the selected data supplied by the data message, or forward the data message to a data collection system 40 via a first communications link 42. The data collection system 40, which is connected to a memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 can send the information of the data message to a data processing system 46 via a second communications link 48. The data processing system 46 is typically remotely located from the data collection system 40 and facilitates convenient processing of the selected data at a central site. The second communications link 48 is typically implemented by a telephone facility, a dedicated data link, or by a wireless communications link.

In addition to providing an efficient communication network for interfacing with a vehicle 105, the data collection system 40 can acquire data from a wide variety of data sources, such as utility meters, CATV PPV terminals, vending machines, equipment operating at isolated sites, industrial machinery, security alarm systems, etc.

For example, in conjunction with collecting data from and sending commands to the vehicle 105, the data collection system 40 can monitor one or more loads of an electrical utility system and communicate energy consumption data to a central site for processing. The utility industry typically determines the effectiveness of an electrical load management system for a selected control scenario by collecting or monitoring energy consumption data for certain customers during load management activities. In particular, the utility compares the maximum energy consumed by the selected customers for certain collection periods to the maximum energy that would be consumed by those customers in the absence of any load management activities. A utility typically uses a load profile recorder located proximate to each customer's electrical load for recording the customer's power consumption during predetermined time intervals. Upon the conclusion of the collection period, the recorded energy consumption data is then forwarded from each load profile recorder to a central data processing site such as the illustrated data processing system 46, for data translation and evaluation.

The CMR system 8 can support the operations of such an electrical utility application in tandem or parallel with the vehicle application and other applications. Select monitors 32 operate as recorders to obtain operational data from the data sources 30, such as sensors coupled to the vehicle 105. The cellular communications device 34 thereafter transmits a data message containing this operational data to the MSC 24. The MSC 24 can then forward the data message to the data collection system 40 for processing of the data or, in turn, the data collection system 40 sends the data message to the data processing system 46 for processing operations. In this manner, an operator of a system or fleet of vehicles 105 can collect operational data from each vehicle 105 in the fleet to support evaluating and optimizing the effectiveness and profitability of its business operations.

In view of the foregoing general information about cellular system operations, and referring still to FIG. 3A, in response to the transmission of a data message by a cellular communications device 34, the MSC 24 typically makes a determination whether the cellular communications device 34 that transmitted the data message is an authorized user or subscriber of the services offered by the cellular system 8 or another system. As shown in FIG. 3B, the data message, formatted as a call origination signal associated with the call origination function, can include certain information that identifies the cellular communications device 34 as a radiotelephone unit which normally operates within a certain remote or "foreign" cellular system. Based upon this information, the MSC 24 decides that the cellular communications device 34 is a roamer because it appears to subscribe to the cellular service offered by another cellular system, which, in this case, is the data collection system 40.

The MSC 24 can maintain a list or user database (not shown) having entries corresponding to the identification information in the data message. At least a portion of the identification information identifies the source of the call origination signal as belonging to a particular cellular system. By checking this user database, the MSC 24 determines whether the cellular communications device 34 is a subscriber or a roamer. A subscriber is typically listed as an entry in the user database, whereas a roamer is generally not initially listed in the user database. Thus, it will be understood that the MSC 24 interprets the data message as a transmission from a roaming mobile radiotelephone operating within the CMR system 8 because the user database fails to contain an entry identifying the cellular source as a home unit.

In one exemplary embodiment of the present invention, the remote cellular system identified by the data message can be dedicated to data collection applications, rather than voice communications, and is represented by the data collection system 40. This data collection system 40 can be the communication gateway 135 depicted in FIG. 1 and described above.

The remote cellular system represents the home location register ("HLR") for the cellular service responsible for transmission of the data message. In recognition that the cellular communications device 34 is actually associated with the remote cellular system, the MSC 24 forwards the data message to the data collection system 40 via the first communications link 42.

The data collection system 40 receives the data message containing selected data collected from the remote data source 30 and, unlike the MSC 24, recognizes that the data message actually contains the desired data collected from a remote data source 30. Accordingly, the data collection system 40 transmits a message to the MSC 24 that instructs the MSC 24 to delete the cellular communication device 34 from its list of registered roamers. It will be understood that the MSC 24 would normally receive this type of message when a roaming radiotelephone has moved to another cellular system and subsequently registered for operation on that other system. Thus, the user database of the MSC 24 is no longer required to maintain the registration information concerning the cellular communications device 34 after transferring the data message to the data collection system 40.

Alternatively, the data collection system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC user database upon expiration of a certain time period without any instruction from the data collection system 40. In this manner, the data collection system 40 is not required to send yet another message to the MSC 24 after the data collection system 40 confirms that the cellular communications device 34 represents a valid user.

The MSC 24 and the data collection system 40 can be compatible with the IS-41 standard that defines a communications protocol for communications between two cellular systems. The IS-41 standard includes provisions that facilitate the handoff of cellular calls between dissimilar cellular systems, not unlike the way that calls are handed-off between cells 12 of a single CMR system 8. In addition, the IS-41 standard permits call deliveries and communications exchange for verifying whether a cellular caller is a valid cellular service subscriber. In this manner, the MSC 24 implements the handoff by forwarding the data message to the data collection system 40 via the first communications link 42, which can be implemented as an IS-41-compatible network. In response, the data collection system 40 sends a user validation message via the link 42 to confirm that the source of the data message, specifically a cellular communications device 34, is a valid cellular source.

In particular, the data collection system 40 recognizes that the received data message contains selected data which a cellular communications device 34 has transmitted. Accordingly, the data collection system 40 processes the received data message and compares the predetermined identifying characteristic in its data message to a list of such characteristics in its user database. This user database can contain an entry of the predetermined identifying characteristic for each of the known cellular communications devices 34 and corresponding data that identifies the associated device as a valid cellular source. Upon obtaining a positive match, the data collection system 40 responds to the received data message by sending to the MSC 24 a validation message. The validation message confirms that the roamer associated with the data message is a valid or authorized user of the remote cellular system. However, the data collection system 40 also advises the MSC 24 to not complete the requested call because there is no need to connect the cellular communications device 34 to a voice channel of the CMR system 8 for completing a voice-based telephone communication. Based on the valid user response, the cellular communications device 34 is thereafter added as a registered cellular source to a user database of registered roamers at the MSC 24. It will be appreciated that the data collection system 40 also can forward to the MSC 24 a message confirming the absence of a valid entry for the cellular communications device 34 in response to a negative match.

This validation message can also include a profile of communications services that are authorized for use by the particular cellular source. For example, this user profile typically defines operational limitations for the cellular source, including access to long distance services, the capability for the source to only originate (and not receive) calls via the cellular system, etc. For example, user profile information can contain an instruction that commands the MSC 24 to delete from its user database the registration entry for a particular cellular communications device after the expiration of a defined time period. This function allows the MSC 24 to clear from its user database entries cellular communications devices 34 that have communicated data messages via the MSC 24 when such devices no longer require continued communications support from the MSC 24. For example, such devices do not require continued support for voice communications because they do not require assignment of a voice channel.

The data collection system 40 can store selected data supplied by the received data message within the memory storage device 44, can process the selected data and store the resultant data, or can forward the selected data to the data processing system 46 for processing. Prior to sending the selected data to the data processing system 46, the data collection system 40 first converts the data message to an acceptable communications protocol for conveying the data message to the data processing system 46. This step may be necessary prior to communication with the data processing system 46 because, unlike the MSC 24 and the data collection system 40, neither the data processing system 46 nor the second communications link 48 may be compatible with the IS-41 standard.

Although the MSC 24 may be programmed to treat the cellular communications devices 34 as roamers associated with a foreign cellular system, the user database of the MSC 24 also can be programmed to contain entries for predetermined identifying characteristics of those cellular communications devices 34 operating within cells 12 of the cellular system 8. Upon receiving a data message via the overhead control channel 38 from such a device 34, an MSC 24 containing such user database entries identifies the transmitting cellular communications device 34 as a home unit rather than as a roamer because the MSC user database contains an entry that corresponds to the predetermined identifying characteristic supplied by the message. Thus, the MSC 24 registers the transmitting cellular communications device 34 as a home unit of the cellular system 8. This provision avoids a need to contact a foreign cellular system, such as the data collection system 40, to inquire whether the cellular source is a valid user or subscriber of cellular services.

However, to initiate transfer of the information in the data message to the data collection system 40, the MSC 24 can be adapted to recognize that data messages should still be forwarded to the data collection system 40. Specifically, based upon a portion of the predetermined identifying characteristic that is uniquely associated with the data collection system 40, the MSC 24 locates an entry in its user database that commands the switch 24 to send all messages containing such a characteristic to the data collection system 40. Accordingly, the MSC 24 thereafter forwards the data message via the first communications link 42 to the data collection system 40.

The data collection system 40 can be implemented by a computer. In one exemplary embodiment of the present invention, the data collection system 40 is the computer of a service circuit node. Certain manufacturers of switches, such as the MSC 24, also offer devices for implementing communications with the data collection system 40, including the Motorola EMX switch and other vendor proprietary switches. Switch manufacturers include: AT&T Network Systems, Whippany, N.J.; Ericsson Radio Systems, Richardson, Tex.; Hughes Network Systems, Germantown, Md.; and Motorola, Schaumburg, Ill.

The cellular system 8 is can be implemented as an AMPS or a DAMPS cellular system. However, it will be appreciated that the cellular system 8 also can be compatible with alternative cellular systems implementing an overhead control channel for mobile to cell communications, including the cellular systems known as: DCS 1800, IS 95-CDMA, JTACS, TACS, ETACS, RC 2000, NMT 450, ESMR, WACS, NMT 900, or other wireless systems.

It will be appreciated that the CMR system 8 includes an array of cells, such as the cell 12, and that a set of reporting systems 29, each formed by the monitor 32 and the cellular communications device 34, are typically located in a cell 12. For each data source 30 within the cell 12, the monitor 32 and the cellular communication device 34 can be located proximate to the data source 30 to minimize the lengths of the signal paths 31 and 33. To facilitate economical installation of the reporting device, the monitor 32 and the cellular communication device 34 can be combined within the same housing and this housing can be installed either adjacent to or as an integral part of the data source 30. For an installation proximate to the data source 30, the signal path 31 and the signal path 33 form hard-wired connections between the connected devices. Nevertheless, it will be appreciated that the signal paths 31 and 33 also can be implemented as either infrared communications links or wireless communications links.

It will be understood that a single cellular communications device 34 can be connected to multiple monitors 32 to permit the transmission of selected data collected from associated data sources 30 located at a central site. For example, a single cellular communications device 34 can be mounted at a central location within or along an office building and multiple monitors 32 can be distributed throughout the building to permit the acquisition of data from the associated data sources 30, such as vending machines or utility meters dispersed within the building facility.

The data collection system 40 can be located proximate to or as an integral part of the MSC 24, in which case the first communication link 42 can form a hard-wired connection between the devices. However, the data collection system 40 also can be positioned at a remote site. For this remote installation, the first communications link 42 can be implemented as a wireless communications system, such as a microwave system, or as a dedicated data line, such as a telephone facility. For the convenience of the party that is sponsoring the collection of a particular type of data, the data processing system 46 is typically located at another remote site that is typically proximate to the sponsoring party.

FIG. 3B is a table that shows the format for the data message that is communicated by the data message system 10. Referring now to FIGS. 3A and 3B, a data record 50 for the data message contains both a data field 54 for the selected data acquired from the remote data source 30 and another data field 52 for a predetermined identifying characteristic which uniquely identifies the cellular communications device 34 that initiates the transmission of the data message. The data fields can be separated by one or more selected characters to delimit the data fields. To take advantage of the existing architecture of a CMR system 8, the format for the data message can be identical to the message format (or data record) of a typical call origination signal that is transmitted by a cellular radiotelephone when it originates a cellular call for communication via a CMR system 8.

By using the data message format associated with a call origination message, the cellular communications device 34 can mimic the initiation of a cellular telephone call by sending a data message that appears to contain a valid mobile telephone number and an ESN. Although it is not intended for the cellular communications device 34 to place a voiced-based cellular telephone call, the cellular communications device 34 imitates a cellular radiotelephone device by generating the call origination-formatted signal, thereby enabling a data communication of selected data to the MSC 24.

As shown in the data record 50 in FIG. 3B, the message format for a call origination signal has been adapted by the data message to permit the identification of the particular transmitting cellular communications device 34 and the communication of the selected data. In particular, the data field 52 for the predetermined identifying characteristic corresponds to at least a portion of a mobile telephone number or MIN assigned to the cellular communications device 34. Thus, the predetermined identifying characteristic is substituted within the data field normally reserved for the MIN in the call origination signal. This predetermined identifying characteristic can belong to a set of unassigned mobile telephone numbers. Alternatively, the predetermined identifying characteristic assigned to each cellular communications device 34 can be a telephone number or a set of 10 digits. The predetermined identifying characteristic facilitates identifying the source of the data by uniquely specifying the cellular communications device 34 associated with the remote data source 30. The predetermined identifying characteristic also supplies information used by the MSC 24 to recognize that the data message containing this predetermined identifying characteristic is associated with the data collection system 40.

Furthermore, the data field 54 in the data message for remote data corresponds to the location within the data record of a call origination signal for the ESN. Those skilled in the art will appreciate that the typical ESN data field is 32 bits long and includes 8 bits for a manufacturer code. For cellular systems that do not review or screen ESNs based upon the manufacturer code segment, it is possible to manipulate the data field normally filled by an ESN to supply a data message having a data field 54 containing 32 bits of selected data. However, if the cellular system uses the manufacturer code segment of the ESN, the selected data within the data field 54 comprises a length defined by the remaining 24 bits of the ESN. In most circumstances, it will not be necessary to manipulate the manufacturer's code segment of the ESN because a data message having 24 bits of selected data (and, as required, 8 bits of the manufacturer code segment for a ESN) should be sufficient to supply relevant data. As an option, a "called address field" (not shown), which normally contains the digits for the called party's telephone number, can be used for the placement of selected data within the data message.

Although adapting certain predefined data fields of a call origination signal is one method for forwarding selected data in a data message to the MSC 24, the message protocol for a registration signal associated with the autonomous registration function also can be used to send desired information from the cellular communications device 34 to the MSC 24 via the overhead control channel 38. The call origination signal is substantially similar to the signal for the autonomous registration function, with the exception that the call origination signal includes the called address field and a flag to distinguish the call origination signal from the autonomous registration function. This flag permits the CMR system 8 to determine whether a call origination function or a registration function should be conducted in response to a reception of these signals.

As an alternative to one type of ESN, an expandable ESN field has been proposed by members of the cellular radiotelephone industry. The CMR system 8 can utilize an expandable ESN data field to increase the data carrying capacity of the call origination signal or autonomous registration signal. One source of motivation behind this proposal is the potential depletion of available distinctive data sequences for the manufacturer's codes and for other data (e.g., identifying characteristics of each radiotelephone). Because of the increasing popularity of radiotelephones, this depletion has recently become a more imminent concern to the cellular radiotelephone industry.

As discussed, the ESN data field can be 32 bits long and can reserve 8 bits for a manufacturer code. An expandable ESN data field permits a CMR system 8 to recognize a triggering mechanism within the call origination signal or autonomous registration signal, which alerts the CMR system 8 to look elsewhere in the call origination or autonomous registration signal for additional data. Such an expandable ESN data field permits a manufacturer's code to fill the entire ESN data field while permitting the inclusion of additional data within the call origination or autonomous registration signal. The additional data would be accessible to a CMR system 8 that is alerted to the existence of the expandable ESN and to the location of the additional data within the call origination signal or autonomous registration signal.

The expandable ESN data field concept can also be utilized by the data message system 10. To enable the use of expandable ESN data fields, the data message, formatted as either a call origination signal or an autonomous registration signal, may contain a predetermined triggering mechanism that indicates the ESN data field contained in the data message is an expandable ESN data field. In response to the triggering mechanism, the data collection system 40 will be alerted that the ESN data field contains more data than that defined by the EIA/TIA Standard 553 protocol. The data collection system 40 will then look to another portion of the call origination signal or autonomous registration signal for the additional data. An expandable ESN data field, therefore, can include an ESN data field as well as one or more additional data fields, such as an ESN2 data field.

The triggering mechanism may be implemented in various ways. A first method is to include an ESN flag bit in the call origination signal or autonomous registration signal data packet. For example, if the ESN flag bit is set to a binary one value, then the data collection system 40 will be alerted to identify the additional data in another portion of the data packet. If, on the other hand, the ESN flag bit is set to a binary zero value, then the data collection system 40 will not look for additional data, and will merely process the data within the standard data packet.

In addition to using each MIN or overhead control channel as a separate data link, a reporting device 29 or a telemetry system 165 can have multiple MINs or overhead control channels. That is, the foregoing discussion of FIGS. 3A and B can apply to having a single MIN or overhead control channel for one or more reporting devices 29 or telemetry systems 165 or to having multiple MINs 210, 202, 203, 204 or overhead control channels 410, 420, 430, 440 dedicated to a single reporting device 29 or telemetry system 165. Thus, the system illustrated in FIGS. 3A and 3B supports the communication link 140 illustrated in FIGS. 1 and 2 and discussed above in reference to those figures.

Turning now to FIG. 4, this figure illustrates a schematic representation of a wireless communication link 140 according to an exemplary embodiment of the present invention. The wireless link 140 comprises four overhead control channels 410, 420, 430, 440 with each one having a respective MIN 210, 202, 203, 204.

The wireless link 140 can operate more effectively or more efficiently than would four individual MINs or four individual overhead control channels functioning in an uncoordinated manner. The system 100 can establish or use relationships between each of the four illustrated MINS 201, 202, 203, 204 or overhead control channels 1, 2, 3, and 4 410, 420, 430, 440 to enhance the data carrying capacity or capability of the data link 140.

In one exemplary embodiment, the data processing system 46 sends commands or pages to the telemetry system 165 on overhead control channels 2, 3, and 4, 420, 430, 440 or MINs 2, 3, and 4, 202, 203, 204 and receives confirmation registration of command receipt on overhead control channel 1 410 or MIN 1 201. Thus, during a period of operation, one MIN 202, 203, 204 or overhead control channel 420, 430, 440 can send forward page messages 145 while another MIN 201 or overhead control channel 410 returns reverse responses or telemetry data 146.

Using one MIN/overhead control channel to communicate in the forward direction and another MIN/overhead control channel to communicate in the reverse direction circumvents the delay that an MSC 24 typically needs to prepare a MIN/overhead control channel for reversing its communication direction. As discussed above, the CMR transceiver 160 and the data processing system typically waits a preset time delay, such as 65 seconds, between receiving a message on a specific MIN/overhead control channel and sending a reply on that same MIN/overhead control channel. Sending on a first MIN/overhead control channel and receiving on a second MIN/overhead control channel avoids this delay. In one exemplary embodiment, the communication link 140 dedicates certain overhead control channels or MINs to each of forward and reverse communication for a selected or intermittent time interval. In another exemplary embodiment, a MIN or overhead control channel is permanently dedicated to each of forward and reverse data transmission.

As another approach to enhancing the functionality of the data link 140, the microprocessor system 210 can interpret or decode a page, message, signal, transmission, or prompt that it receives on a specific MIN/overhead control channel based on information obtained outside of that communication. That is, a recipient of a transmission on an overhead control channel or MIN can associate a specific meaning with the transmission from two or more possible meanings based on information that is available from a source other than that transmission. For example, a transmission can have a first meaning if the recipient is in one state and a second meaning if the recipient is in another state. Another transmission, which may occur on another overhead control channel or MIN, can cause such a state change of the recipient, for example.

As will be discussed in more detail below with reference to FIGS. 5-8, the telemetry system 165 interprets a page received on overhead control channel 4 440 or MIN 4 204 as a command to enable starting of the vehicle 105 if the vehicle 105 is in a disabled state. A page 145 on overhead control channel 3 430 or MIN 3 203 can cause such a disabled state, for example. On the other hand, if the vehicle 105 is in an enabled state at the time of receiving the page 145 on overhead control channel 4 440 or MIN 4 204, the telemetry system 165 interprets a page 145 on overhead control channel 4 440 or MIN 4 204 as a request to transmit the vehicle's location.

Creating relationships between pages 145 on individual overhead control channels 410, 420, 430, 440 or MINs 210, 202, 203, 204 of the data link 140 can enhance communication efficiency. Receipt (or lack of receipt) of a forward or reverse message 145, 146 on one overhead control channel 410, 420, 430, 440 or MIN 210, 202, 203, 204 during a specified time interval can specify the meaning of another message on another overhead control channel 410, 420, 430, 440 or MIN 210, 202, 203, 204. That is, a recipient can interpret a message received on one overhead control channel 410, 420, 430, 440 or MIN 210, 202, 203, 204 as having one of two possible interpretations based on whether the recipient received a message on another overhead control channel 410, 420, 430, 440 or MIN 210, 202, 203, 204.

Processes and components of an exemplary embodiment of the present invention will be further described in reference to the remaining figures, which include illustrations of flowcharts that can be embodied in software programs or modules. The software modules 215 of the microprocessor system 210 and/or the data processing programs 170 of the data processing system 46 can comprise such software programs or modules. To promote readership and understanding, the following discussion of those figures will largely reference each of the overhead control channel-MIN pairs 410, 201, 420, 202, 430, 203, 440, 204 that FIG. 4 illustrates as a MIN 201, 202, 203, 204. That is, those skilled in the art will appreciate that communicating MIN 1 201 or communicating on MIN 1 201, for example, may be viewed as overhead control channel 1 410 carrying a communication.

The present invention can comprise multiple computer programs that embody the functions described herein and that are illustrated in the exemplary functional block diagrams and the appended flowcharts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary displays, functional block diagrams, and flowcharts and associated description in the application text, for example.

Therefore, disclosure of a particular set of program code instructions is not considered necessary for an adequate understanding of how to make and use the invention. The inventive functionality of the computer program aspects of the present invention will be explained in more detail in the following description in conjunction with the remaining figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 5A:
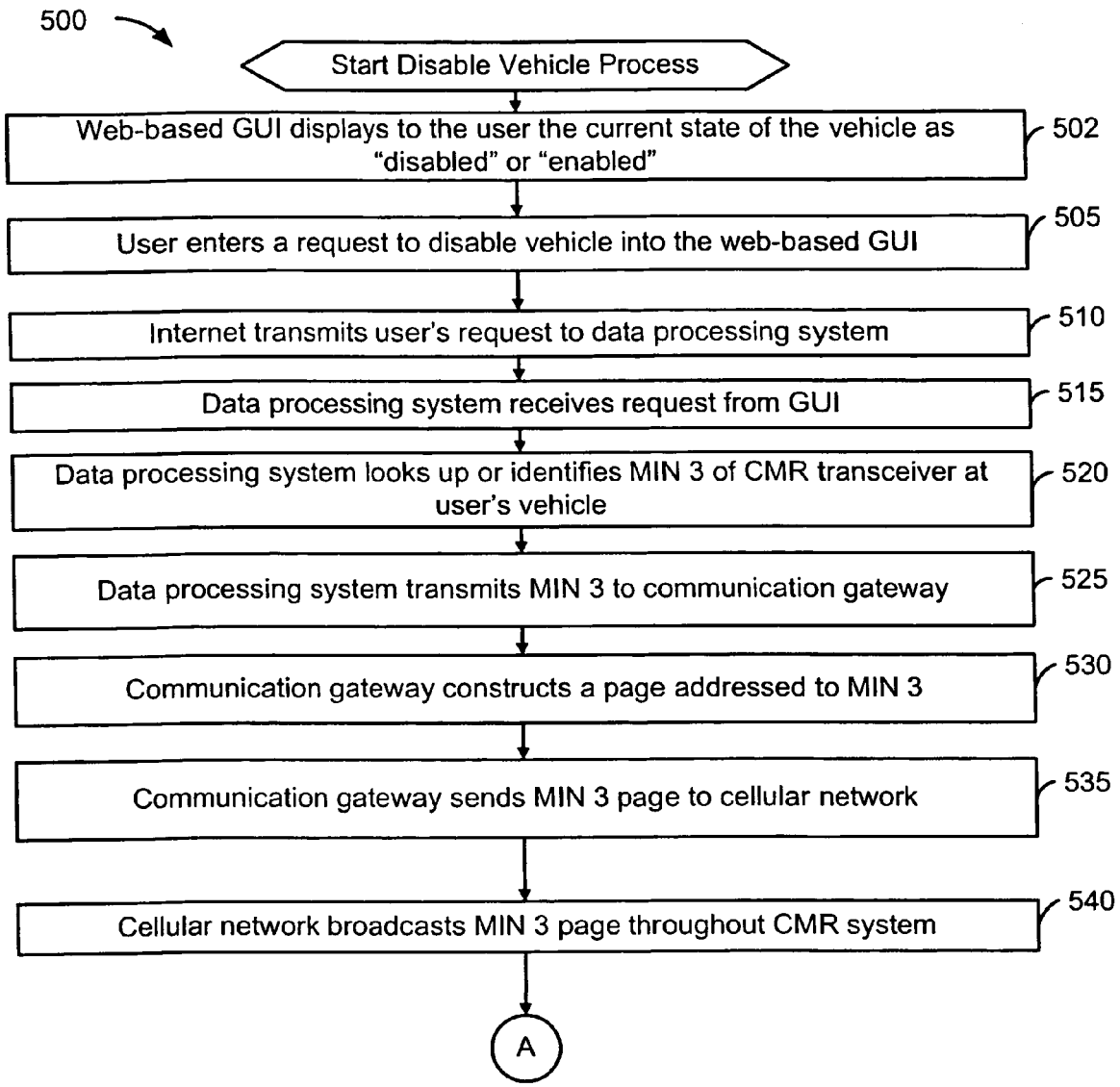
FIGS. 5A and 5B are a flowchart of an exemplary process for remotely disabling a vehicle according to an embodiment of the present invention.
Figure 5B:
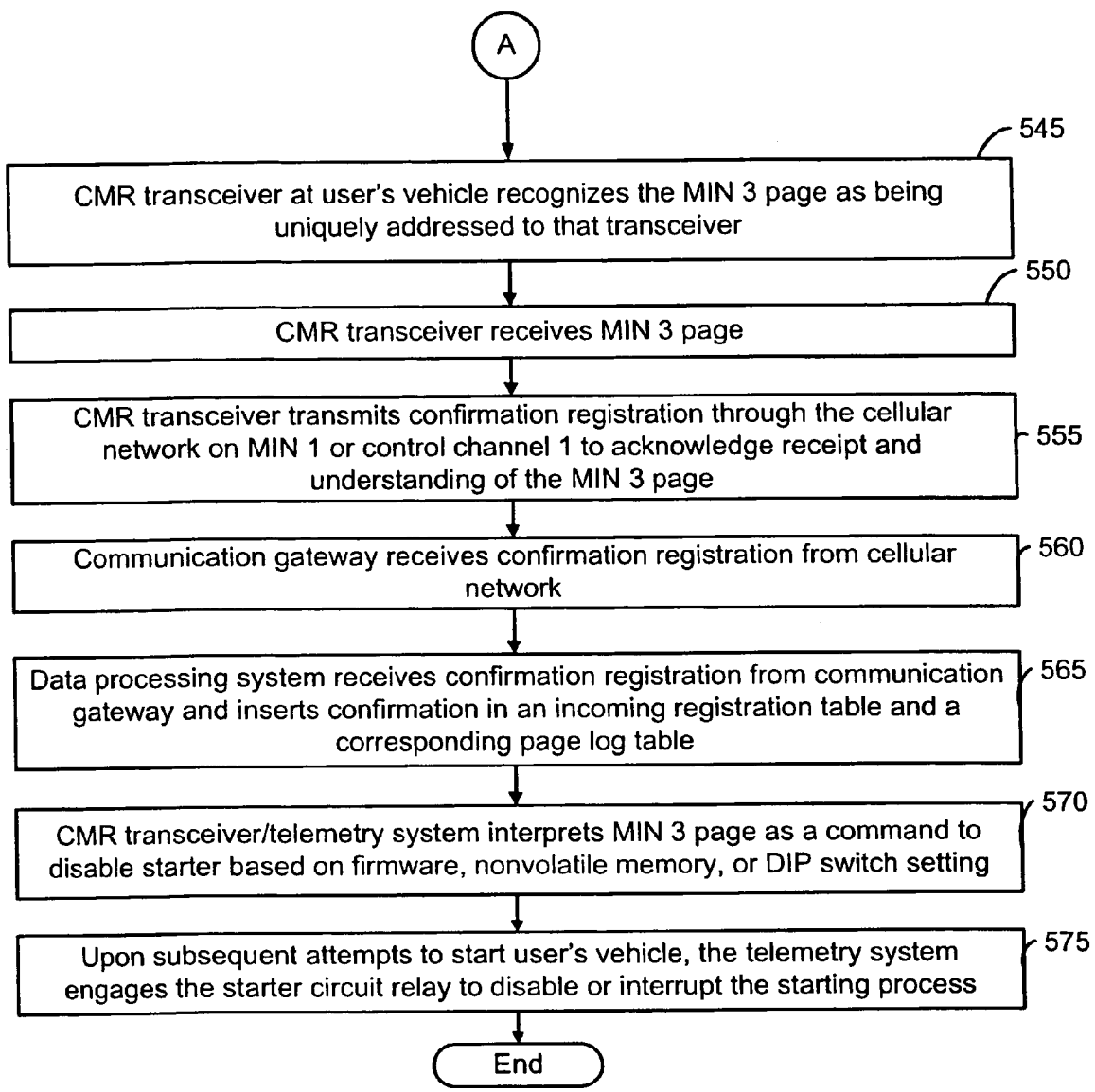

Turning now to FIGS. 5A and 5B, these figures illustrate a flowchart of a process 500, entitled Disable Vehicle, for remotely disabling a vehicle 105 according to an exemplary embodiment of the present invention.

At Step 502, the first step in Process 500, the web-based GUI 125 displays the current state or status of the vehicle 105. Thus the user, who is typically the vehicle's owner, can observe whether starting of the vehicle 502 is enabled or disabled. The data processing system 46 can maintain this information for ready access via the Internet 120. Alternatively, the system 100 can dynamically obtain the vehicle's enabled/disabled status in response to the user logging onto the GUI 125.

At Step 505, the user observes that the GUI 125 indicates that starting of the vehicle 105 is enabled. The user enters a request to disable the vehicle 105 into the GUI 125. The user may press a key or select a designated area on a screen, for example.

At Step 510, the GUI 125 sends the request to the data processing system 46 via the Internet 120 for receipt at Step 515. At Step 520, the data processing system 46 determines the assignment or numerical identity of the MIN 3 203 of the CMR transceiver 160 located at the user's vehicle 105. A database at the data processing system 46 can maintain this information as a table, for example.

At Step 525, the data processing system 46 transmits the MIN 3 203, or its numerical identification, to the communication gateway 135. At Step 530, the communication gateway 135 receives the MIN 3 203 and inserts it into a page 145. That is, the communication gateway 135 constructs a page 145 addressed to the CMR transceiver 160, specifically using MIN 3 203 as the address.

At Step 535, the communication gateway 135 passes the page 145 to the cellular network 130 for broadcast across the CMR system 8 at Step 540. Thus, the communication gateway 540 causes sending of a signal on the FOCC of the overhead control channel 3 430. That is, a wireless signal carrying the numerical designation of MIN 3 203 transmits in the cellular network 130 and is available for receipt by various wireless receivers in the network 130. However, the MIN 3 203 specifically matches the user's vehicle 105 and thus causes that vehicle's CMR transceiver 160 to exclusively receive the page 145. Thus at Step 545, which FIG. 5B illustrates, the CMR transceiver 160 of the user's vehicle 105 recognizes the page 140 comprising MIN 3 203 for receipt at Step 550.

At Step 555, the CMR transceiver 160 transmits a confirmation registration through the cellular network 130 via the RECC of channel 1 410 in response to receiving the MIN 3 203. That is, the CMR transceiver 160 receives a message on MIN 3 203 and acknowledges receipt of that message by sending a reply message on MIN 1 201.

At Step 560, the communication gateway 135 receives the MIN 1 confirmation registration from the cellular network 130. The communication gateway 135 passes that confirmation message to the data processing system 46. At Step 565, the data processing system 46 receives the confirmation message or registration and places it in a incoming registration table and a corresponding page log table. The data processing system 46 maintains a record of messages sent on FOCCs and replies received on RECCs.

At Step 570, the telemetry system 165 interprets the page 145 on MIN 3 203 as a command to disable the vehicle's starter. Specifically, the CMR transceiver 160 passes the MIN 3 data to the microprocessor system 210 for processing by the software modules 215. A lookup table in firmware or nonvolatile memory or a DIP switch setting can specify the interpretation of the MIN 3 203. Thus based on this setting, each time the CMR transceiver 160 receives a page 145 on MIN 3 203, the telemetry system 165 interprets the MIN 3 203 as a command to disable the vehicle 105. That interpretation remains consistent regardless of the state of the telemetry system 165 or of any other pages 145 that may be transmitted on channels 1, 2, or 4 410, 420, 440.

At Step 575, the telemetry system 165 energizes or engages the relay 230 linked to the starter circuit 280 to interrupt starting the vehicle 105 upon an attempt to start the vehicle 105. That is, in response to the incoming MIN 3 203, the relay 230*a* interrupts subsequent attempts to start the vehicle 105, which is thereby disabled. Following Step 575, Process 500 ends.

Figure 6A:
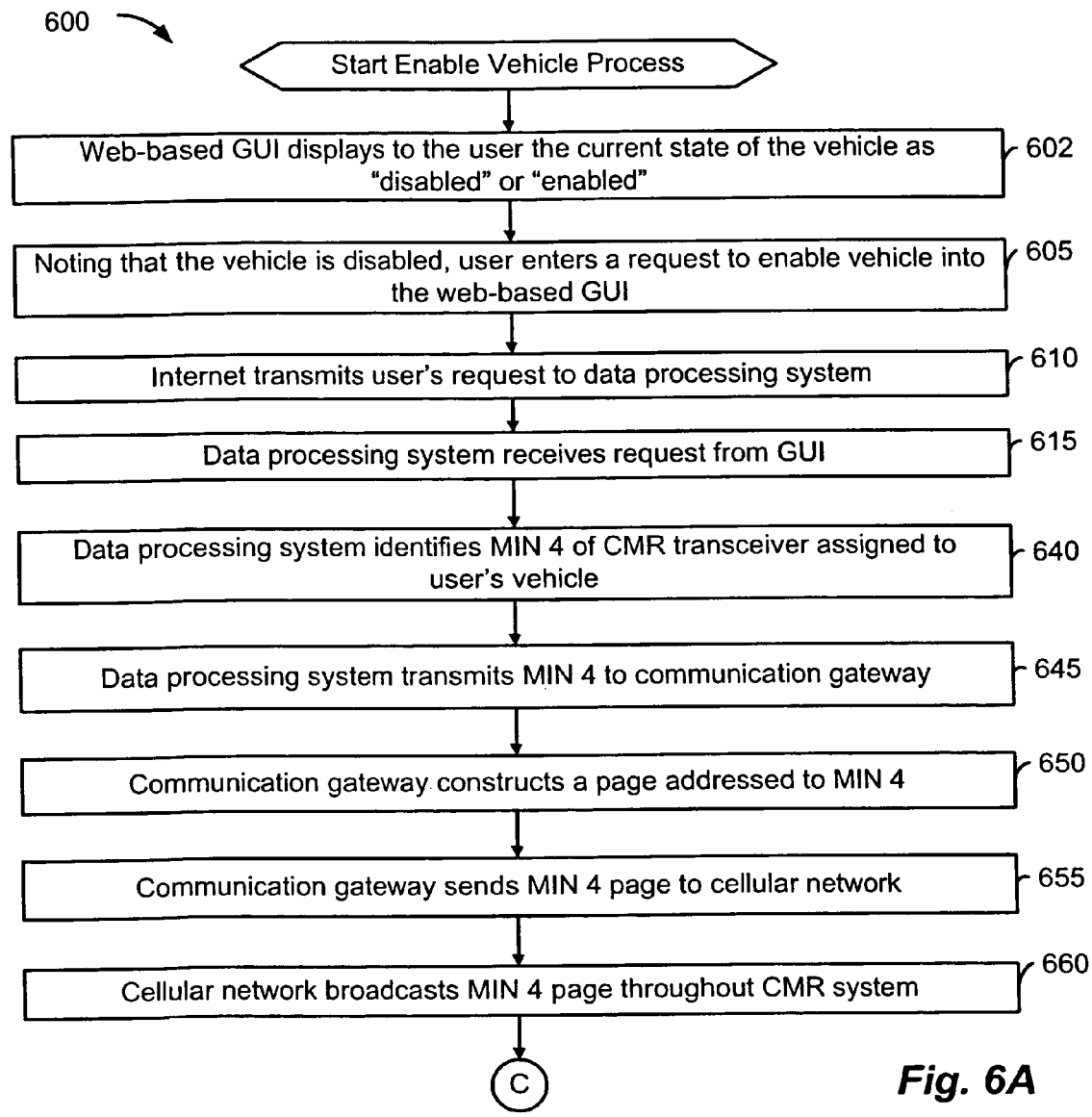
FIGS. 6A and 6B are a flowchart of an exemplary process for enabling a vehicle to start according to an embodiment of the present invention.
Figure 6B:
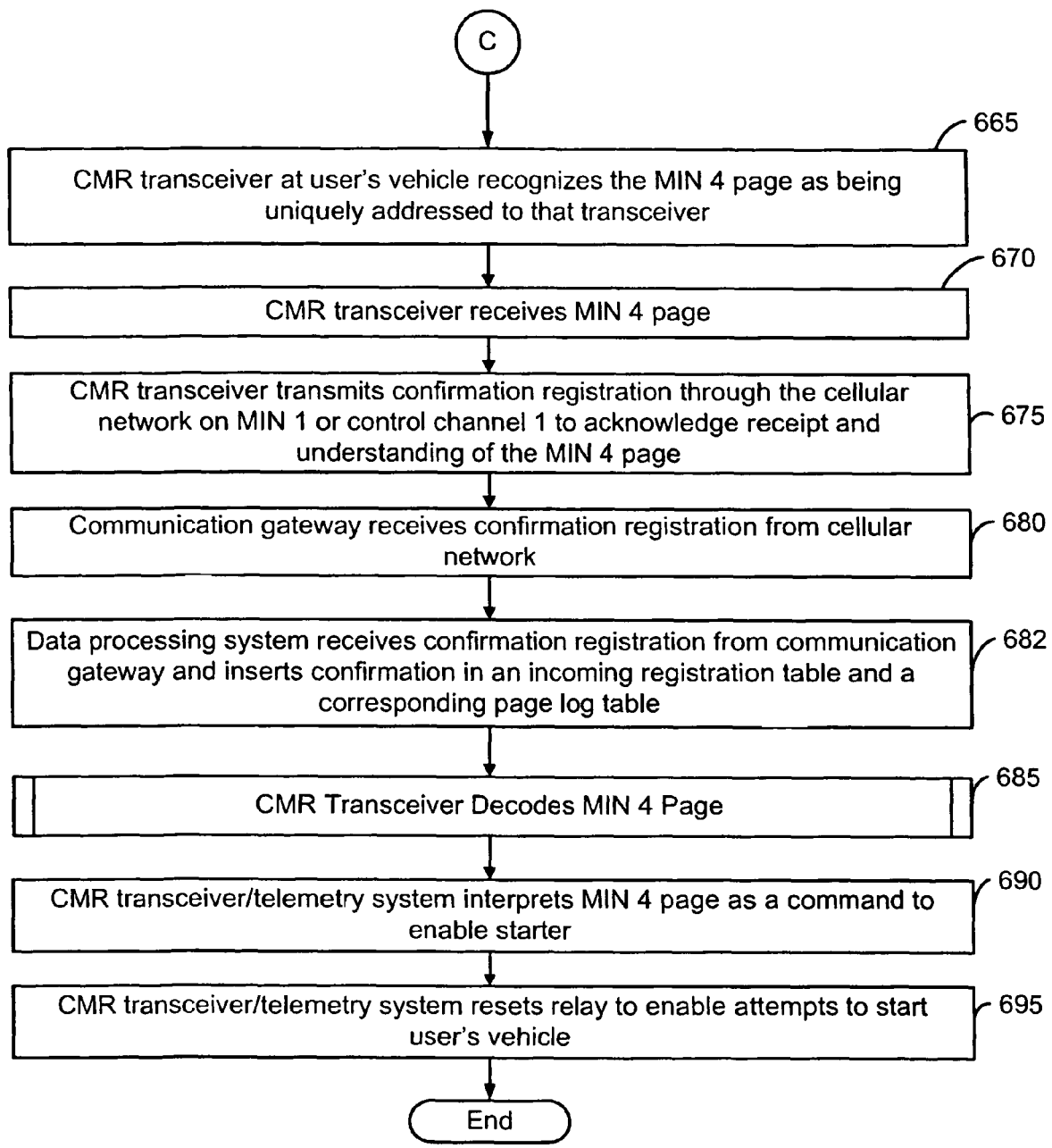

Turning now to FIGS. 6A and 6B, these figures illustrate a flowchart of a process 600, entitled Enable Vehicle, for enabling a vehicle 105 to start according to an exemplary embodiment of the present invention. Process 600 can enable the vehicle 105 after a user has disabled it by executing Process 500, as discussed above and illustrated in FIGS. 5A and 5B.

At Step 602, the first step in Process 600, the GUI 125 displays the current status of the vehicle 105 and specifically whether starting is enabled or disabled. At Step 605, the user notes that the vehicle 105 is in a disabled state and seeks to change it to an enabled state. Thus, the user enters a request or prompt into the GUI 125 to enable starting of the vehicle 105.

At Step 610, the user's request transmits over the Internet 120 to the data processing system 46 for receipt at Step 615. At Step 640, the data processing system 46 determines the specific MIN 4 204 assigned to the CMR transceiver 160 of the user's vehicle 105.

At Step 645, data processing system 46 passes the MIN 4 204 to the communication gateway 135, typically using TCP/IP protocol as discussed above. At Step 650, the communication gateway 135 receives the MIN 4 204, which at this stage can be a number or set of digits. The communication gateway 135 inserts the MIN 4 number or digits into a page 145, thereby addressing that page 145 to the vehicle's CMR transceiver 160.

At Step 655, the communication gateway 135 forwards an instruction to the cellular network 130 to broadcast a page 145 comprising the MIN 4 number or digits. In response, the cellular network 130 broadcasts the page 145 throughout the cellular geographic region at Step 660.

At Step 665, which FIG. 6B illustrates, the CMR transceiver 160 recognizes the page 145 as having the MIN 4 address 204, which designates it for receipt. At Step 670, the specific CMR transceiver 160 of the user's vehicle receives that page 145.

At Step 675, the CMR transceiver 160 acknowledges receipt of the MIN 4 204 by sending a registration signal on MIN 1 201. At Step 680, the communication gateway 135 receives the confirmation registration from the CMR transceiver 160 and forwards it to the data processing system 46.

At Step 682, the data processing system 46 records the confirmation registration and matches it with the corresponding paging record entry to indicate successfully delivery. At Step 685, which FIG. 7 illustrates in flowchart format as discussed below, the CMR transceiver 160 decodes the MIN 4 page 145 to determine or interpret the message that it embodies, conveys, or contains.

As an outcome of the decoding of Step 685, at Step 690, the telemetry system 165 interprets the page 145 of MIN 4 204 as a command to enable starting the vehicle 105. In response to this interpretation, the telemetry system 165 sets the relay 230a so that it does not interrupt the starter circuit 280 when the vehicle's driver attempts to start the vehicle 105. In other words, in response to the MIN 4 204, the telemetry system 165 allows starting of the vehicle 105, without interfering with the starting process. Following Step 695, Process 600 ends.

Figure 7:
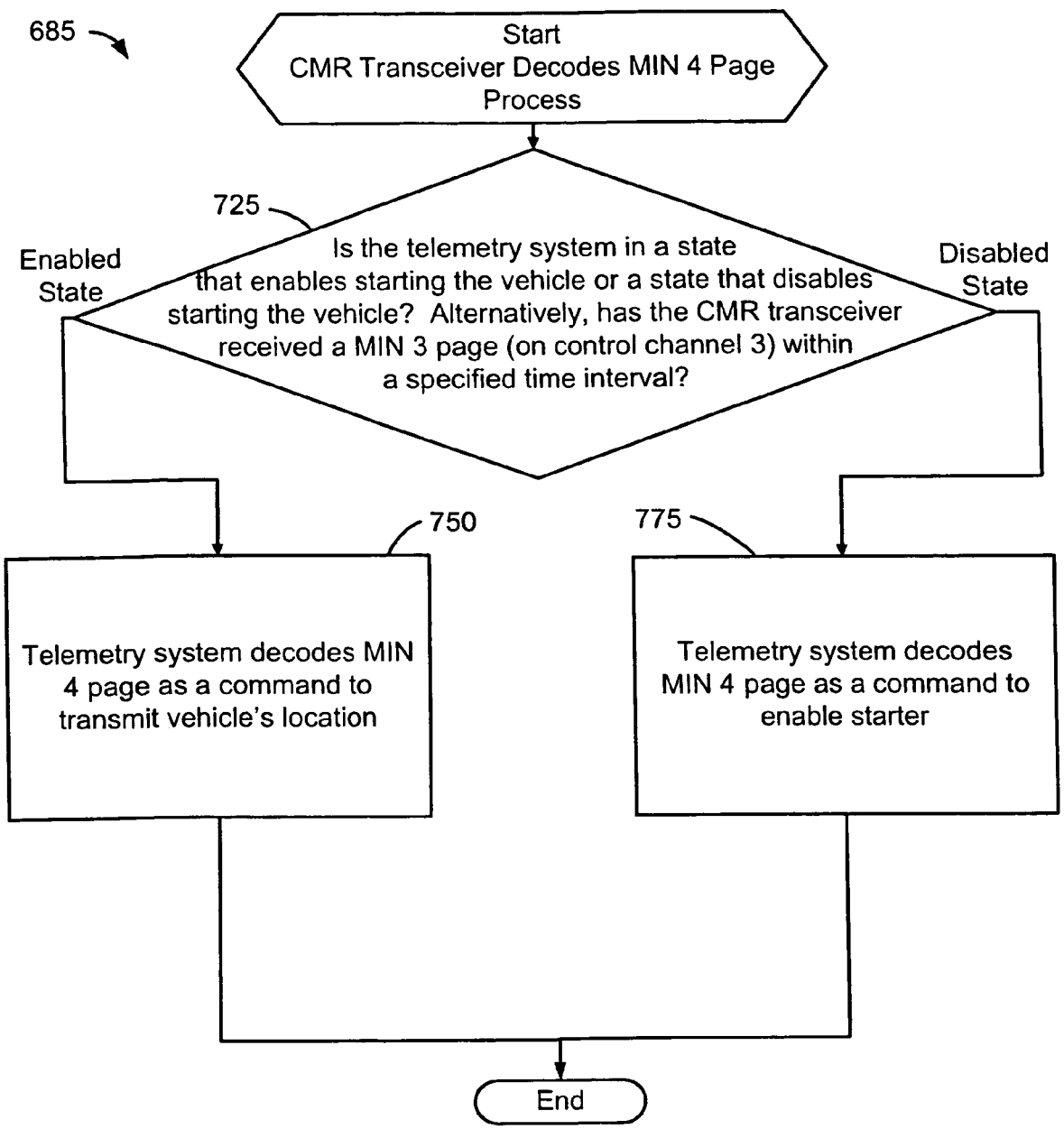
FIG. 7 is a flowchart of an exemplary process for decoding a message transmitted on an overhead control channel according to an embodiment of the present invention.

Turning now to FIG. 7, the Step 685 of Process 600 will be discussed as Process 685. Process 600 calls or invokes Process 685 to determine the meaning of an incoming page on MIN 4 204.

FIG. 7 illustrates a flowchart of Process 685, entitled CMR Transceiver Decodes MIN 4 Page, for decoding a message transmitted on an overhead control channel according to an exemplary embodiment of the present invention. Process 685 generally interprets or determines the meaning of a page 145 on one MIN 201, 202, 203, 204 or overhead control channel 410, 420, 430, 440 based on another page 145 on another MIN 201, 202, 203, 204 or overhead control channel 410, 420, 430, 440.

Decision Step 725 determines whether the telemetry system 165 or vehicle 105 is in a state that enables a driver to start the vehicle 105 or a state that disables or prevents the driver from starting the vehicle 105. In one exemplary embodiment, the telemetry system 165 determines whether the vehicle 105 is enabled or disabled based on whether the CMR transceiver 160 has received a page 145 on MIN 3 203 within a defined or specified period of time, such as one second, one minute, one hour, one day, one week, or a range between any of these times, for example. As discussed above, a MIN 3 page 145 disables attempts to start the vehicle 105. In another exemplary embodiment, a sensor or memory element of the telemetry system 165 identifies the vehicle's state.

If the vehicle 105 or the telemetry system 165 is in a disabled state, at Step 775, logic in the software modules 215 decodes the MIN 4 page 145 as a command to enable the vehicle's starter.

On the other hand, if the vehicle 105 or the telemetry system 165 is in an enabled state, at Step 750, logic in the software modules 215 decodes the MIN 4 page 145 as a command to transmit the vehicle's location as telemetry packets 146 on the wireless data link 140. Following Step 750 or Step 775, Process 685 ends.

In one exemplary embodiment of Process 685, if the recipient of a page 145 is in a specified state, the recipient interprets that page 145 as an instruction to change the specified state. If the recipient of the page 145 is in a state other than that specified state, the recipient interprets the page 145 as a distinct or different instruction.

Process 685 can also be viewed as selecting a meaning of a first transmission on a first overhead control channel 410, 420, 430, 440 from two or more possible meanings, based on a second transmission on a second overhead control channel 410, 420, 430, 440. In one exemplary embodiment, the first transmission occurs prior to the second transmission. In one exemplary embodiment, the second transmission occurs prior to the first transmission. In one exemplary embodiment, the two transmissions occur in an uncoordinated or un-timed manner. A sender can simultaneously send the two transmissions or send them during an overlapping time frame. A recipient can simultaneously receive the two transmissions or receive them during an overlapping time frame.

Figure 8A:
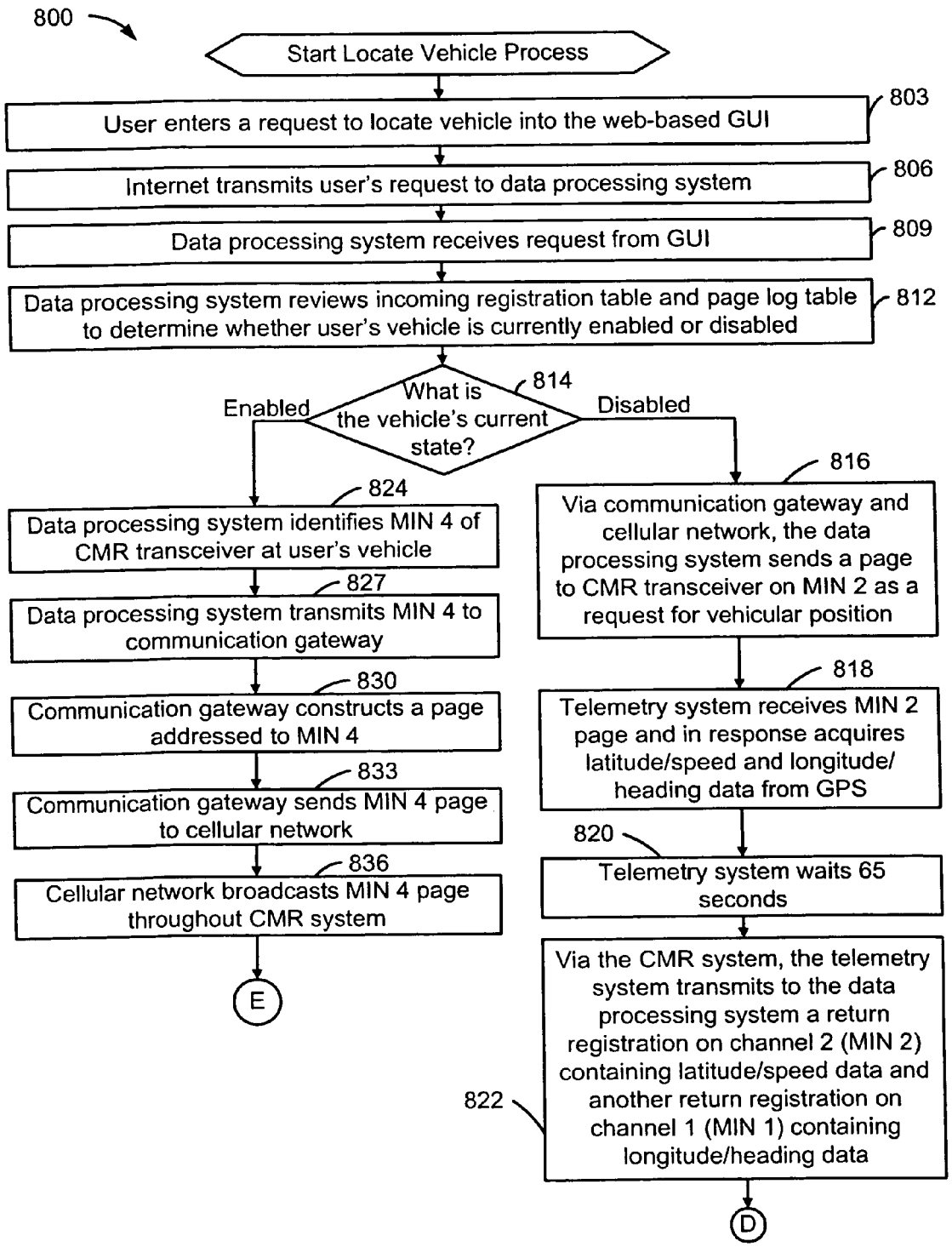
FIGS. 8A, 8B, and 8C are a flowchart of an exemplary process for locating a vehicle via wireless communication according to an embodiment of the present invention.
Figure 8B:
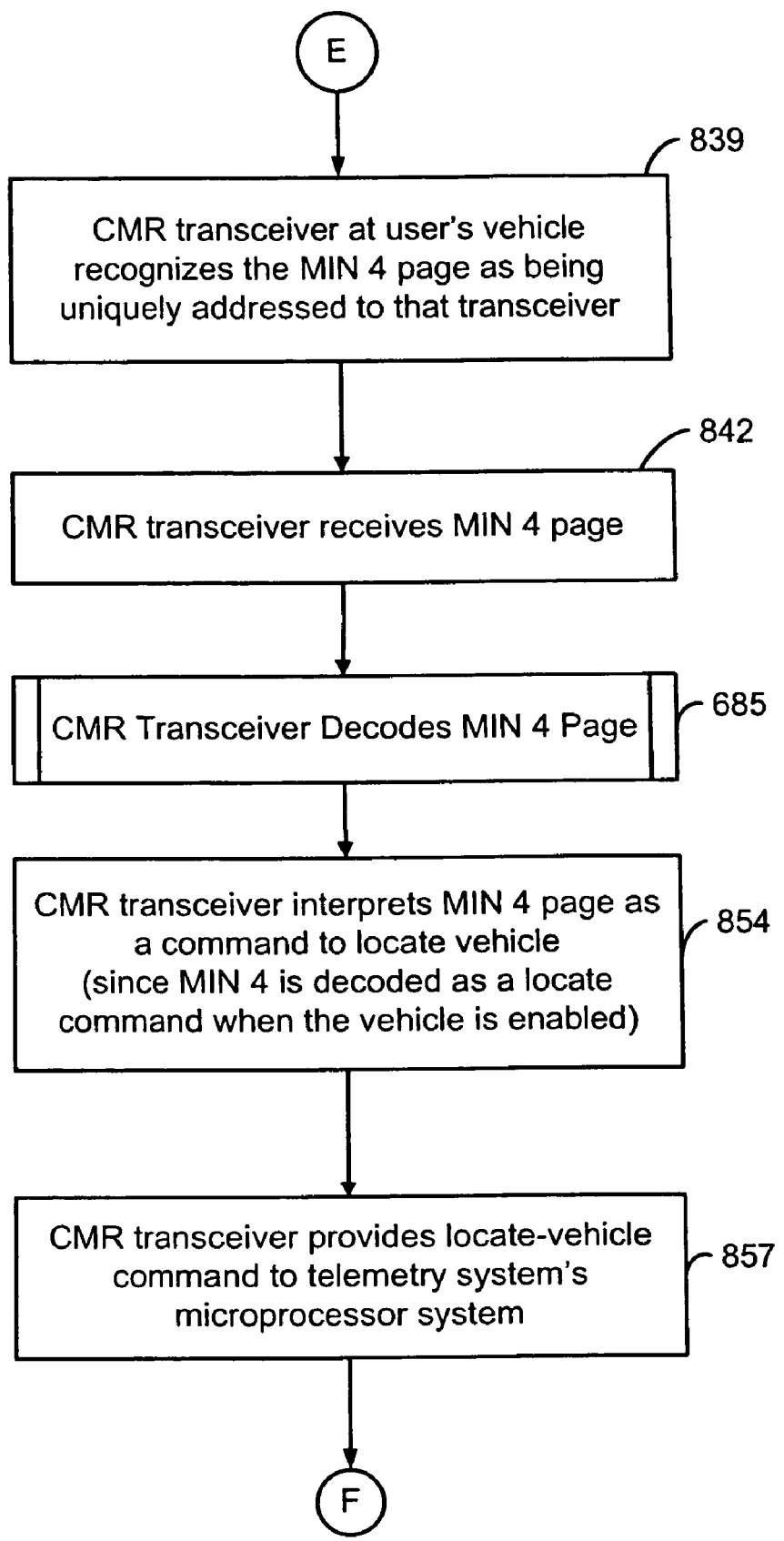
Figure 8C:
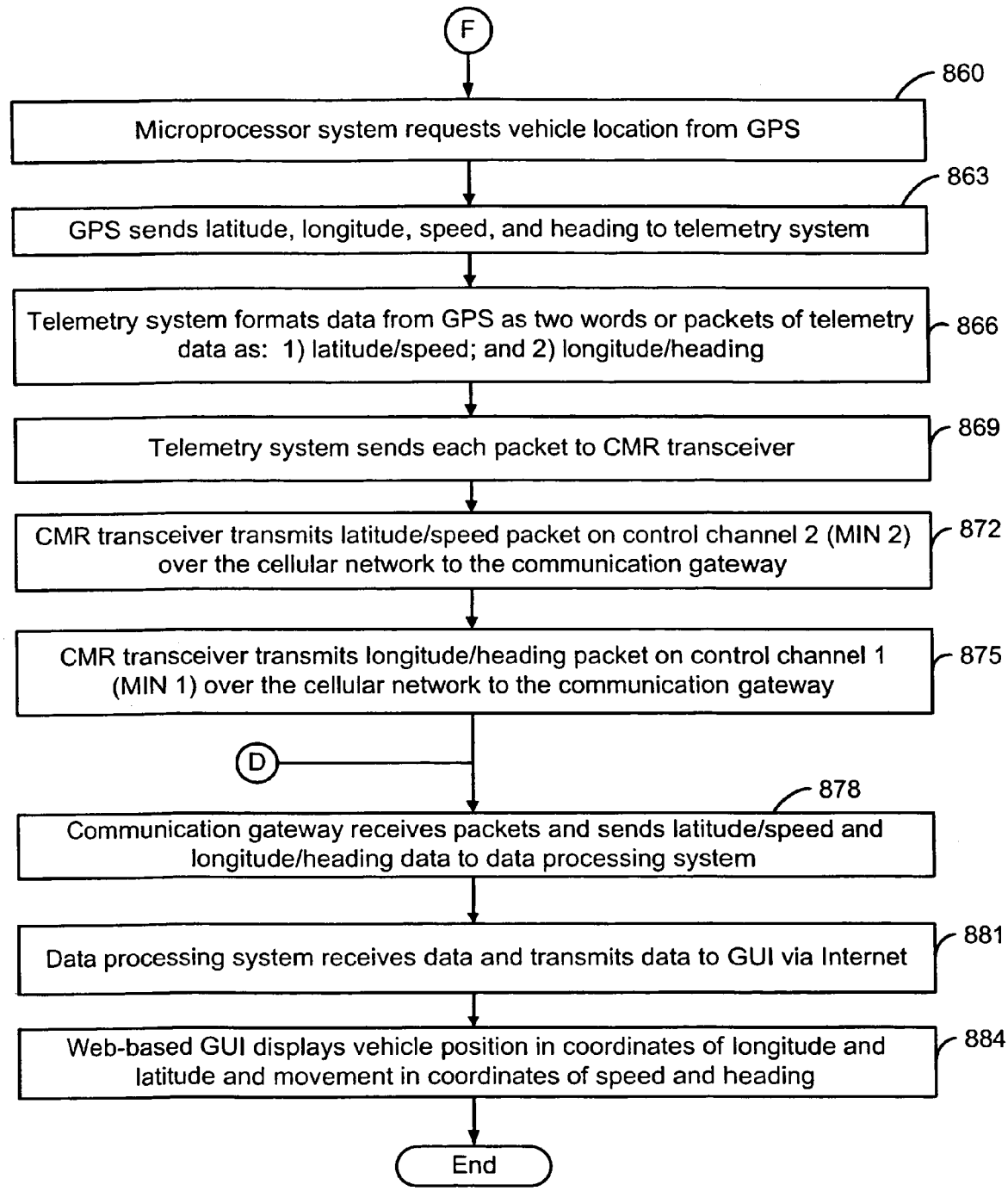
Figure 9:
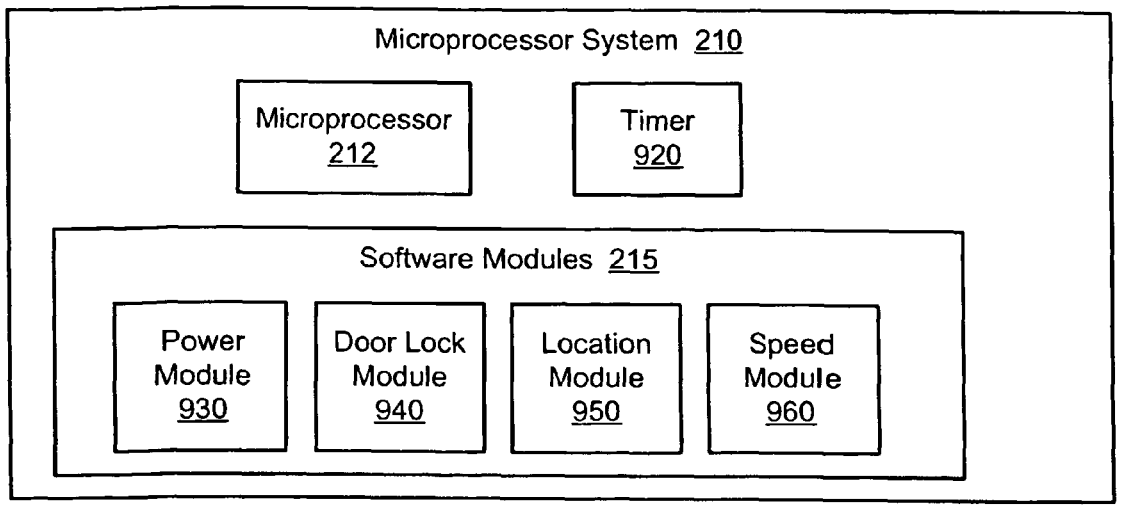
FIG. 9 is a functional block diagram of an exemplary microprocessor system that a telemetry system comprises according to an embodiment of the present invention.

Turning now to FIGS. 8A, 8B, and 8C, these figures illustrate a flowchart of a process 800, entitled Locate Vehicle, for locating a vehicle 105 via wireless communication according to an exemplary embodiment of the present invention. Like Process 600, Process 800 calls Process 685 to determine the meaning of an incoming page 145 on MIN 4 204 or overhead control channel 4 440.

At Step 803, the first step in Process 800, a user enters a request to locate his or her vehicle 105 into the GUI 125. At Step 806 the Internet 120 transmits the request to the data processing system 46 for receipt at Step 809.

At Step 812, the data processing system 46, using one of its data processing programs 170, checks the incoming registration table and page log with reference to CMR transceiver 160 of the user's vehicle 105. Based on the information in one or both of the table and the log, the data processing system 46 determines whether the user's vehicle 105 is enabled or disabled. In one exemplary embodiment, the data processing system 46 determines whether a page 145 was transmitted on MIN 3 203, disabling the vehicle 105, within a threshold time period. The determination can also consider whether a vehicle-enabling event occurred after broadcasting the most recent disable page 145 for that vehicle 105. Such an enabling event could include a page 145 on MIN 4 440 per Step 836, discussed below.

Step 814 branches the flow of Process 800 according to the vehicle's state. If starting of the vehicle is disabled, Steps 816 through 822 follow Step 814, and the user receives the vehicle's location relatively slowly. If starting of the vehicle 105 is enabled, Steps 824 through 875 follow Step 814, and the user receives the vehicle's location with less delay. Steps 878 through 884 execute following either branch.

If the vehicle is disabled, at Step 816, the data processing system 46 prompts the communication gateway 135 and the cellular network 130 to broadcast a page 145 on MIN 2 202 or overhead control channel 2 420 as a request for the vehicle's geographic coordinates or location.

At Step 818, the telemetry system 165 receives the page 145. Based on programming logic in one of its software modules, a DIP switch setting, or a firmware configuration, for example, the telemetry system 165 determines that the page 145 comprises a request for location data. In response, the telemetry system 165 acquires the vehicle's latitude, longitude, and velocity (speed and heading) from the GPS 250.

At Step 820, the telemetry system 165 waits sufficient time, typically 65 seconds, for overhead control channel 2 420 to clear. That is, a sufficient time passes or elapses to allow the MSC 24 and the communication gateway 135 to prepare overhead control channel 2 420 to transition from forward to reverse communication. During this time, the MSC 24 builds a VLR entry and then deletes or "tears down" the entry in response to instructions from the communication gateway 135.

At Step 822, the telemetry system 165 transmits a return registration on overhead control channel 2 420 or MIN 2 202 containing a telemetry packet 146 of the vehicle's latitude and speed. Another return registration on overhead control channel 1 410 or MIN 1 201 contains the vehicle's longitude and heading as a telemetry packet 146. Since the longitude and heading packet 146 returns on overhead control channel 1 410 in response to a command transmitted on overhead control channel 2 420, the telemetry system 165 can transmit that packet immediately or with minimal delay, rather than waiting 65 seconds.

Step 878 follows the execution of Step 822, as the enabled branch merges with the disabled branch between Step 875 and Step 878. At Step 878, the communication gateway 135 receives the telemetry packets 146, comprising longitude, latitude, speed, and heading, and forwards the packets 146 to the data processing system 46.

At Step 878, the data processing system 46 receives the telemetry packets 146, from the communication gateway 135 and extracts the longitude, latitude, speed, and heading data therefrom. At Step 881, the data processing system 46 forwards the extracted data to the GUI 125 via the Internet 120.

At Step 884, the GUI 125 displays the vehicle's location in longitude and latitude and the vehicle's speed and heading to the user that requested this information. As an alternative to displaying raw coordinates, the GUI 125 can illustrate the location on an electronic map. Following Step 884, Process 800 ends.

If the vehicle 105 is enabled rather than disabled, decision Step 814 branches the flow of process 800 to Step 824 rather than to Step 816, as discussed above. The steps of the enabled branch 824-875 avoid using the forward-transmitting channel for reverse-transmitting communication and thereby can respond to a forward-transmitted request for data without significant delay. Thus, the enabled branch provides relatively efficient communication with reduced latency.

At Step 824, the data processing system 46 determines the MIN 4 204 that is assigned to the CMR transceiver 160 of the user's vehicle 105. At Step 827, the data processing system 46 forwards the MIN 4 number or identity to the communication gateway 135. At Step 830, the communication gateway 135 constructs a MIN 4 page 145 and sends that page 145 to the cellular network 130 at Step 833. The cellular network 130 broadcasts MIN 4 204 at Step 836.

At Step 839, which FIG. 8B illustrates, the CMR transceiver 160 at the user's vehicle 105 recognizes that the cellular network 130 has broadcast a page 145 having that transceiver's address (MIN 4 204). The CMR transceiver 160 checks the MIN of each page 145 broadcast on the cellular network 130 to identify each broadcast MIN that matches any of the transceiver's assigned MINs 201, 202, 203, 204. The CMR transceiver 160 receives the MIN 4 page 145 at Step 842.

At Step 685, which FIG. 7 illustrates in flowchart form, the CMR transceiver 160 decodes the MIN 4 page 145. As an output or result of Step 685, at Step 854, the CMR transceiver 160 determines that the page 145 on MIN 4 204 comprises a request, instruction, command, or message to transmit the vehicle's coordinates to the data processing system 46. That is, the CMR transceiver 160 decodes the MIN 4 page 145 as a location command on the basis that the vehicle 105 is enabled.

At Step 857, the CMR transceiver 160 forwards the command to the telemetry system's microprocessor system 210. In response, at Step 860, the microprocessor system 212 requests the vehicle's location from the GPS 250.

The GPS 250 responds at Step 863 and sends the latitude, longitude, speed, and heading to the telemetry system 165. At Step 866, the microprocessor system 210 of the telemetry system 165 formats the data from the GPS 250 to facilitate communication on the overhead control channels 410, 420. A first telemetry packet 146 comprises latitude and speed data, while a second telemetry packet 146 comprises longitude and heading data. At Step 869, the telemetry system 165 sends each telemetry packet 146 to the CMR transceiver 160.

At Step 872, the CMR transceiver 160 transmits the latitude/speed packet 146 on overhead control channel 2 420. That is, CMR transceiver 160 outputs a signal that comprises two data fields, a MIN field that comprises the MIN 2 number 202 and an ESN field that comprises the latitude and speed data. The CMR transceiver 160 can transmit on channel 2 420 in response to the page 145 on overhead control channel 4 440 immediately, promptly, or without significant delay.

At Step 875, the CMR transceiver 160 transmits the longitude/heading packet 146 on overhead control channel 1 410 using MIN 1 201. Similar to the reply on MIN 2 202, the CMR transceiver 160 can transmit on overhead control channel 1 410 without waiting for overhead control channel 4 440 to clear from the forward or page communication.

As discussed above, following Step 875, Process 800 executes Steps 878, 881, and 884 and then ends. By using a first overhead control channel 440 to deliver a page 145 comprising a request for telemetry data and using a second and a third overhead control channel to transmit the requested telemetry data in the form of two packets 146, each with a distinct MIN 201, 202, the system 100 reduces latency. Reducing latency benefits the requestor of the telemetry data.

Turning now to FIG. 9, this figure illustrates a functional block diagram of an exemplary microprocessor system 210 that the telemetry system 165 comprises according to an embodiment of the present invention. In this embodiment, the microprocessor system 210 comprises software modules 215 that can provide application-specific functionality. Thus, the microprocessor system 210 can have software programs that support various applications or features.

FIG. 9 illustrates four exemplary software modules, namely a power module 930, a door lock module 940, a location module 950, and a speed module 960. Each of these modules 930, 940, 950, 960 can comprise rules, logic, and instructions that implement one or more steps of a computer-based process or method.

The power module 930 comprises computer-executable instructions or software for controlling the operations of the telemetry system 165 to conserve battery power. The power module 930 can turn off or remove power from one or more telemetry subsystems when conditions indicate that a subsystem's functionality is not needed. The power module's software can perform one or more steps in Process 1000, Process 1025, Process 1050, or Process 1075 which are respectively illustrated in FIGS. 10, 11, 12, and 13 and discussed below.

Figure 14A:
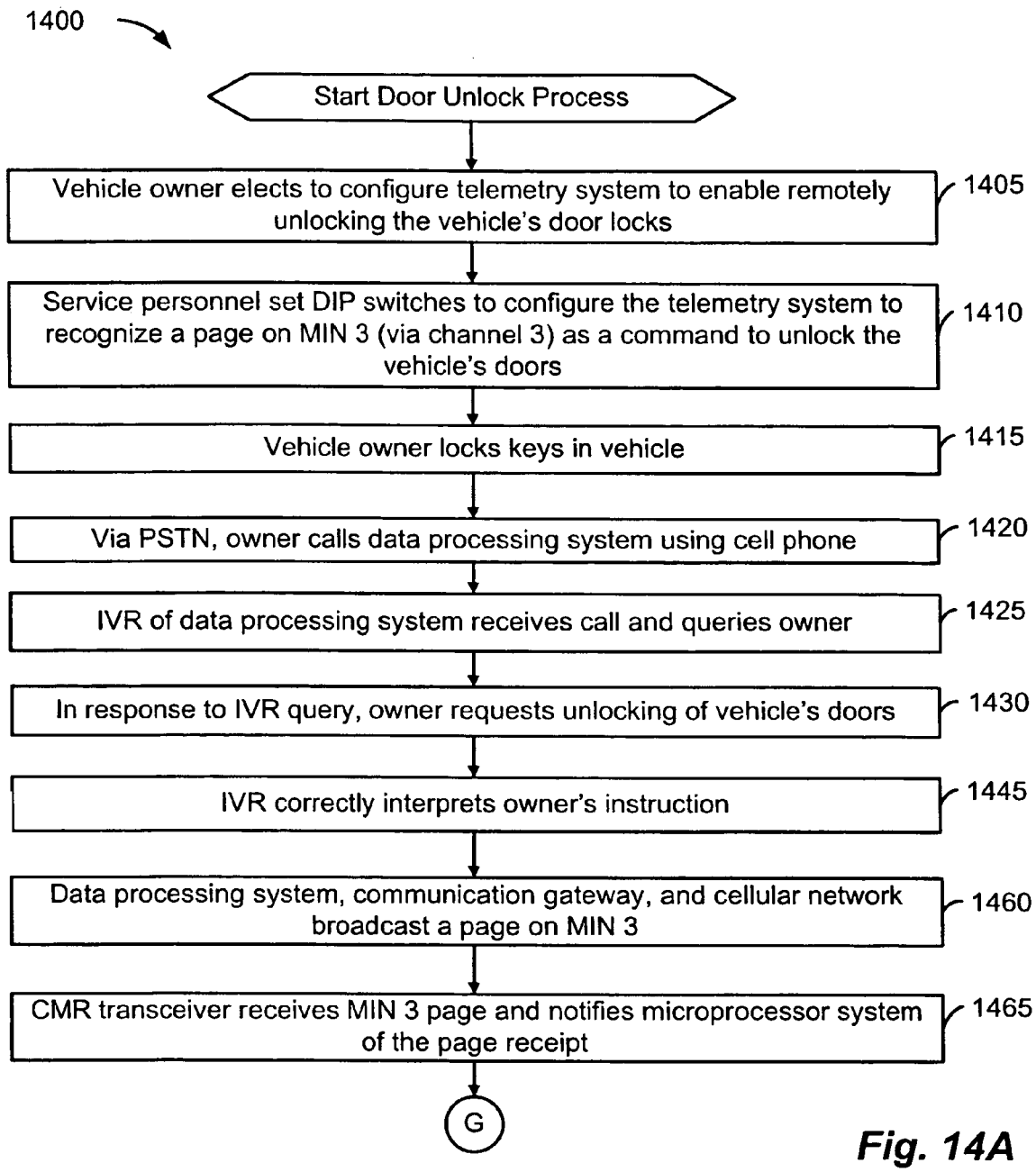
FIGS. 14A and 14B are a flowchart of an exemplary process for unlocking a door of a vehicle from a remote location.
Figure 14B:
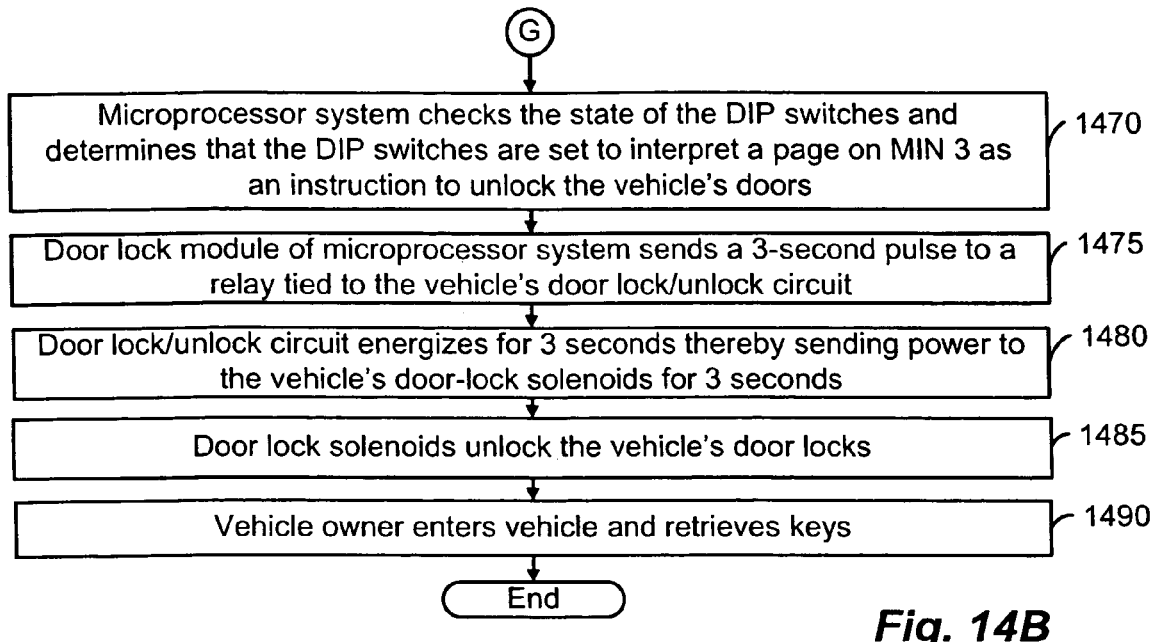

The door lock module 940 comprises software for controlling the vehicle's door locks. That software, which the microprocessor 212 executes, can output a signal, such as a binary number, that triggers the relay 230*a* to lock or unlock a door, for example. The door lock module 940 can implement one or more steps in Process 1400, for which FIGS. 14A and 14B illustrate a representative flowchart as discussed below.

The location module 950 comprises software that identifies conditions under which the telemetry system 165 should transmit the vehicle's location to the data processing system 46. That is, the location module 950 applies criteria to sensor inputs 240, data from the GPS 250, and incoming pages 145. Based on those criteria, the telemetry system 165 sends telemetry packets 146 holding the GPS location of the vehicle 105 over the data link 140. The location module 950 can implement one or more of the steps in Process 1500 or Process 1700, which FIGS. 15 and 17 respectively illustrate as discussed below.

Figure 16:
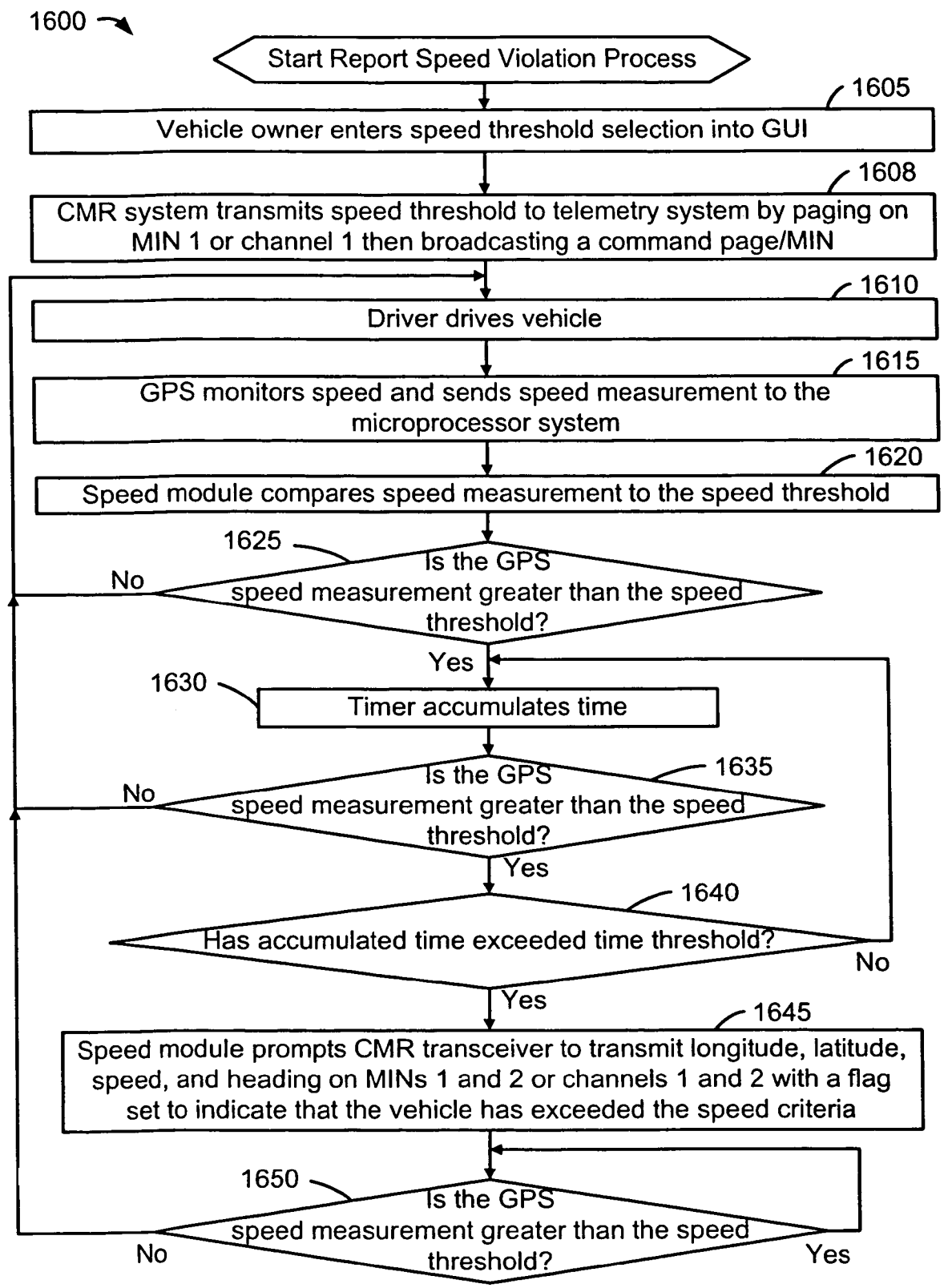
FIG. 16 is a flowchart of an exemplary process for identifying a vehicle's speed limit violations via wireless telemetry according to an embodiment of the present invention.

The speed module 960 analyzes or processes speed data from the GPS 250. Based on the analysis, the speed module 960 can identify conditions for sending the vehicle's speed and location to a remote user. The speed module 950 can comprise computer-executable instructions for performing one or more of the steps in Process 1600, which FIG. 16 illustrates as discussed below.

The timer 920 clocks time between various events that may occur at the telemetry system 165, the vehicle 105, the GPS 250, or the data link 140. The amount of time that elapses between events can be a criterion for one or more of the software modules 215.

Figure 10:
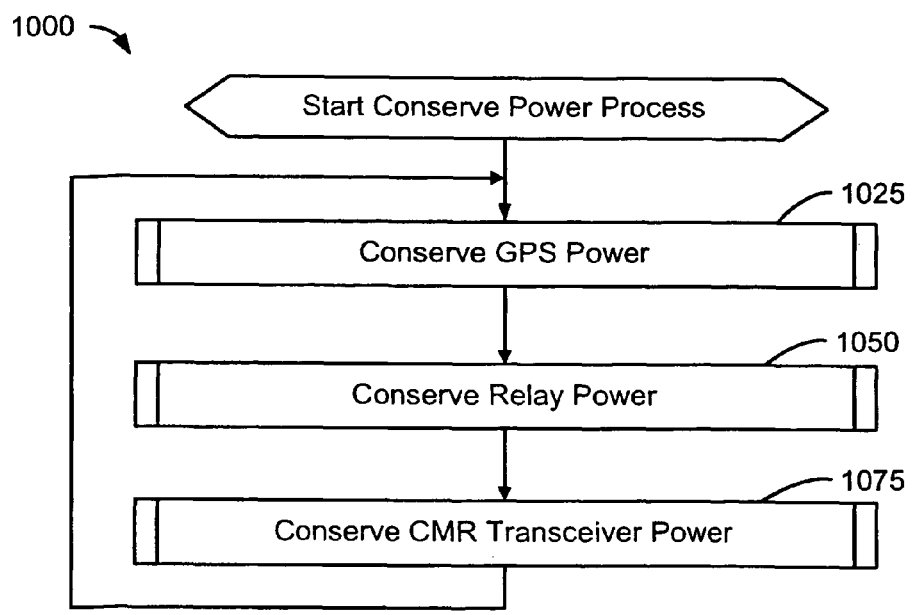
FIG. 10 is a flowchart of an exemplary process for operating a telemetry system in a manner that controls electrical power consumption.

Turning now to FIG. 10, this figure illustrates a flowchart of a process 1000, entitled Conserve Power, for operating the telemetry system 165 in a manner that conserves the electrical power that it consumes. That is, Process 1000 can reduce or minimize the telemetry system's drain on the battery from which it draws power. The telemetry system's battery can be the same battery that supplies power to the vehicle's starter and other major electrical systems or another battery such as an auxiliary, dedicated, or backup battery.

The telemetry system 165 can comprise or function in collaboration with four systems that FIG. 2 illustrates as discussed above. The GPS 250, the CMR transceiver 160, the starter circuit relay 230a, and the microprocessor system 210 collectively draw battery power at a rate that can prematurely drain the battery when each operates at its maximum load. The power module 930 operates each of these four systems 250, 160, 230a, 210 to control electrical consumption and thereby extend the battery's power or life.

Each of the three steps 1025, 1050, 1075 of Process 1000 comprises a subroutine, sub-process, or set of steps as will be discussed in more detail below. Process 1000 iteratively executes Step 1025, 1050, and 1075 to minimize the power that each of the GPS 250, the starter circuit relay 230a, and the CMR transceiver 160 consumes.

Figure 11:
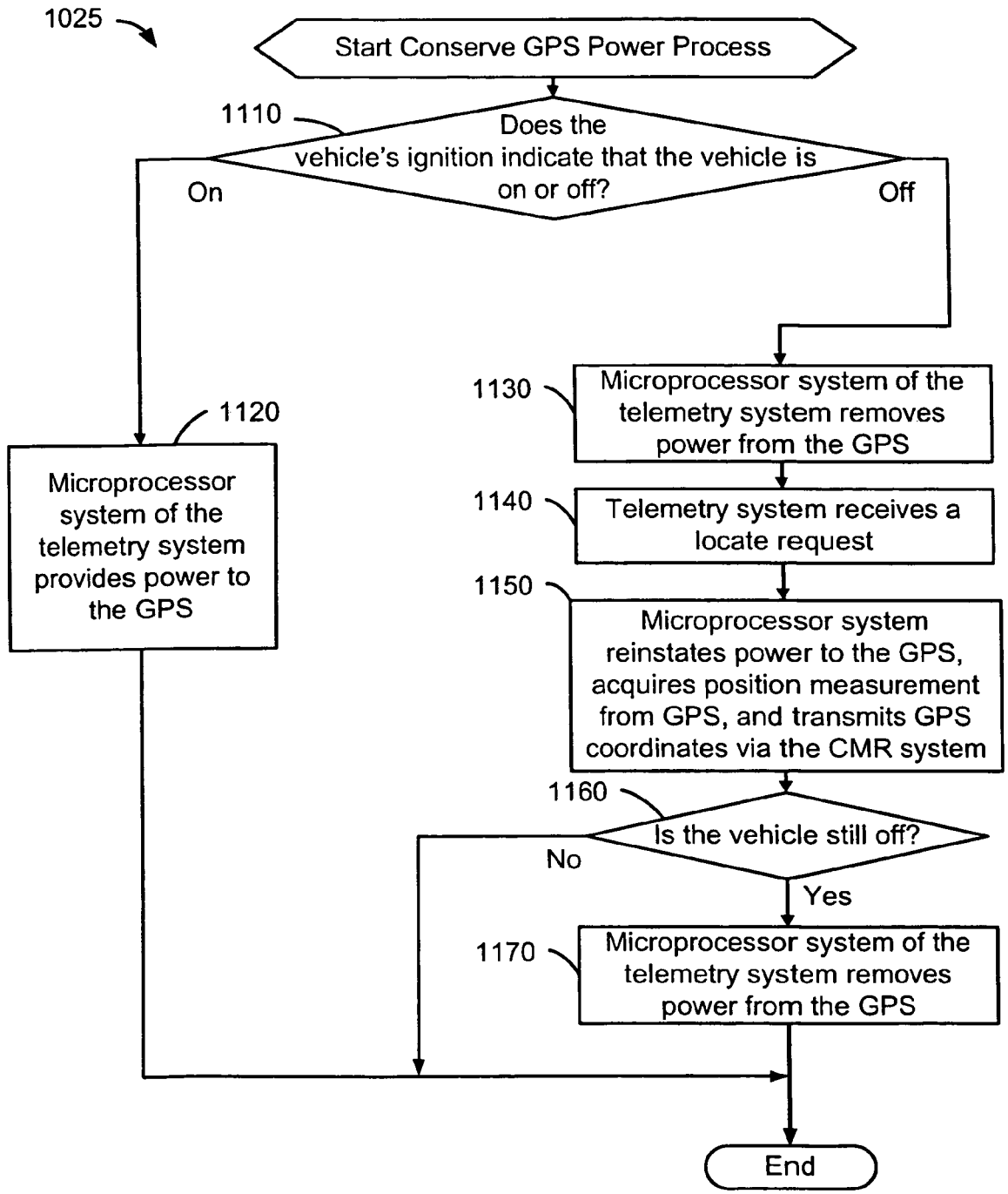
FIG. 11 is a flowchart of an exemplary process for operating a global positioning sensor in a manner that reduces its net power drain.

At Step 1025, the first step in Process 1000, the power module 930 removes power from the GPS 250 when conditions indicate that fresh information regarding the vehicle's location or velocity is not needed. That is, Step 1025 can comprise disconnecting the GPS 250 from the battery or turning the GPS 250 off when certain criteria are met. FIG. 11, discussed below, illustrates an exemplary flowchart for Step 1025 as Process 1025.

At Step 1050, the power module 930 operates the relay 230a that controls the starter circuit 280 in a manner that conserves battery power. If starting of the vehicle 105 is disabled and an attempt to start the vehicle 105 occurs, the execution of Step 1050 interrupts or disengages the starting sequence, thereby preventing the vehicle 1050 from starting.

At Step 1075, the power module 930 removes power from the CMR transceiver 160 when the telemetry system 165 can forego, or successfully operate without, the transceiver's functionality. With the CMR transceiver 160 off, the microprocessor system 210 operates without a wireless communications system connected to the data processing system 46 or a remote user.

Turning now to FIG. 11, this figure illustrates a flowchart of an exemplary process 1025, entitled Conserve GPS Power, for operating the GPS 250 in a manner that reduces its net power drain. As discussed above in reference to FIG. 10, Process 1025 is an exemplary embodiment of Step 1025 in Process 1000.

At inquiry Step 1110, the first step in Process 1025, the ignition switch sensor 275 determines the state or position of the vehicle's ignition switch or key. The power module 930 receives that information from the ignition switch sensor 275 via one of the sensor inputs 240.

As discussed above in reference to FIG. 2, the vehicle's ignition can have a position for starting the vehicle's motor, a position for operating or driving the vehicle 105 after the vehicle's motor is running, and a position for stopping the vehicle's motor and parking or storing the vehicle 105.

If the ignition switch sensor 275 determines that the vehicle's ignition switch is on, Step 1120 follows Step 1110. The power module 930 may also cause Step 1120 to follow Step 1110 when the ignition switch is in the start position.

At Step 1120, the GPS 250 receives battery power and monitors the vehicle's location. The microprocessor system 210 can provide the GPS 250 with power by sending a signal to the GPS 250 that turns it on or keeps it turned on. Alternatively, the telemetry system 165 can comprise an electrically controlled switch that controls electrical power to the GPS 250. Following Step 1120, Process 1025 ends.

If the ignition switch sensor 275 determines that the ignition switch is in the off position, Step 1130 follows Step 1110. Alternatively, the power module 930 may determine that the vehicle's motor is off, or that a driver has parked the vehicle 105 or placed it in temporary storage.

At Step 1130, the microprocessor system 210 or the power module 930 that executes on its microprocessor 212 removes power from the GPS 250 or otherwise terminates the GPS's drain of battery power.

At Step 1140, the CMR transceiver 160 receives a page 145 comprising a request to transmit the vehicle's location to the data processing system 46. The vehicle's owner may enter that request into the web-based GUI 125, for example. Process 800, discussed above with reference to FIGS. 8A, 8B, and 8C, provides an exemplary method for requesting a location fix on the vehicle 105.

At Step 1150, in response to the incoming request, the microprocessor system 210 reinstates power to the GPS 250, acquires from the GPS coordinates that describe the vehicle's position, and transmits those coordinates to the data processing system 46.

At Step 1160, the ignition switch sensor 275 determines whether the vehicle 105 remains off. If the vehicle 105 is on, Process 1025 ends and the microprocessor system 210, specifically its power module 930, allows the GPS 250 to draw power and continue providing GPS data.

On the other hand, if the ignition switch sensor 275 determines that the vehicle 105 remains off, the microprocessor system 210 disconnects the GPS 250 from its power supply or turns it off. Following Step 1170, Process 1025 ends.

Figure 12:
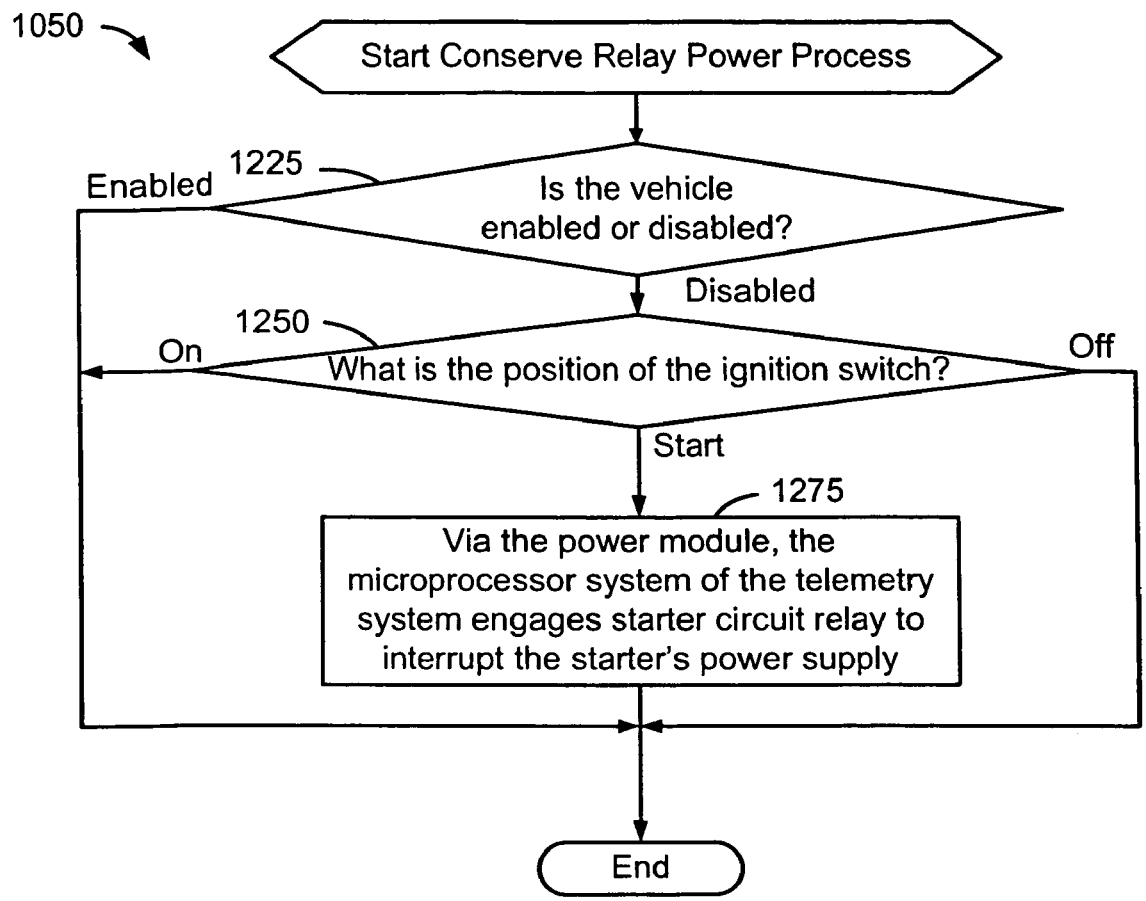
FIG. 12 is a flowchart of an exemplary process for operating a relay in a manner that reduces its power consumption.

Turning now to FIG. 12, this figure illustrates a flowchart of an exemplary process 1050, entitled Conserve Relay Power, for operating a relay 230a in a manner that reduces its power consumption. The relay 230a interfaces with the starter circuit 280 and, when conditions warrant, prevents the vehicle 105 from starting.

At inquiry Step 1225, the first step in Process 1050, the power module 930 determines whether starting of the vehicle 105 has been enabled or disabled by a user command or other event.

Process 500, for which FIGS. 5A and 5B illustrate an exemplary flowchart, provides an exemplary method for communicating a message to the telemetry system 165 comprising an instruction to disable the vehicle 105. Conversely, Process 600, illustrated in flowchart form in FIGS. 6A and 6B, provides an exemplary method for communicating an instruction to enable starting the vehicle 105.

If starting of the vehicle 105 is enabled, Process 1050 ends following Step 1225. In this scenario, the relay 230*a* which interfaces with the starter circuit 280, does not interfere with a driver's attempts to start the vehicle 105. That is, when the driver turns the ignition switch to the start position, the starter circuit 280 delivers current to the starter so the engine can start without interference.

If starting of the vehicle 105 is disabled, at Step 1250, the ignition switch sensor 275 identifies the position of the ignition switch. If the ignition switch is on, indicating that a driver may be driving or operating the vehicle 105, Process 1050 ends. The telemetry system 165 allows the driver to continue operating the vehicle 105 since terminating the vehicle's operation could present a safety issue.

If the ignition switch is off at Step 1250, Process 1050 also ends. In this situation, the telemetry system 165 removes power from the relay's coil so that the relay 230*a* does not drain the battery. Since the ignition switch's position indicates that the driver is not attempting to start the vehicle 105, the power module 930 waits until the driver attempts to start the vehicle 105 prior to intervening.

If the ignition switch is in the start position, Step 1275 follows Step 1250. In this scenario, the driver is actively attempting to start the vehicle 105, typically by turning the ignition key and causing electricity to flow through the starter. This condition can occur when the ignition switch transitions to the start state from the on state or from the off state.

At Step 1275, the power module 930 engages the starter circuit relay 230*a* to interrupt or interfere with the starting sequence. In one exemplary embodiment, electricity begins flowing through the starter or the starter circuit 280 that feeds the starter, and the relay 230*a* stops that electricity flow before it reaches a level that can successfully start the engine. For example, as current rushes into the starter's coils, the amount of current increases in response to the inductive load, and the relay 230*a* stops this current inrush before the starter rotates the engine's mechanisms.

Interrupting the starting process can comprise changing the state of the relay 230*a* after the driver turns the ignition switch to the start position but before the engine starts in response to that change in the switch. In one exemplary embodiment, the starter circuit relay 230*a* is in series with the electrical feed to the starter or the starter circuit 280. The starter circuit relay 230*a* is normally closed. In other words, when that relay 230*a* does not receive voltage on its coil, its contacts are closed, and when it receives voltage on its coil, its contacts open. When the ignition switch sensor 275 senses that the driver has turned the vehicle's ignition key to the start position, the telemetry system 165 delivers voltage to the starter circuit relay 230*a* thereby causing it to open and preventing the starter circuit 280 from supplying sufficient electricity to the starter to start the vehicle.

Following Step 1275, Process 1050 ends.

Figure 13:
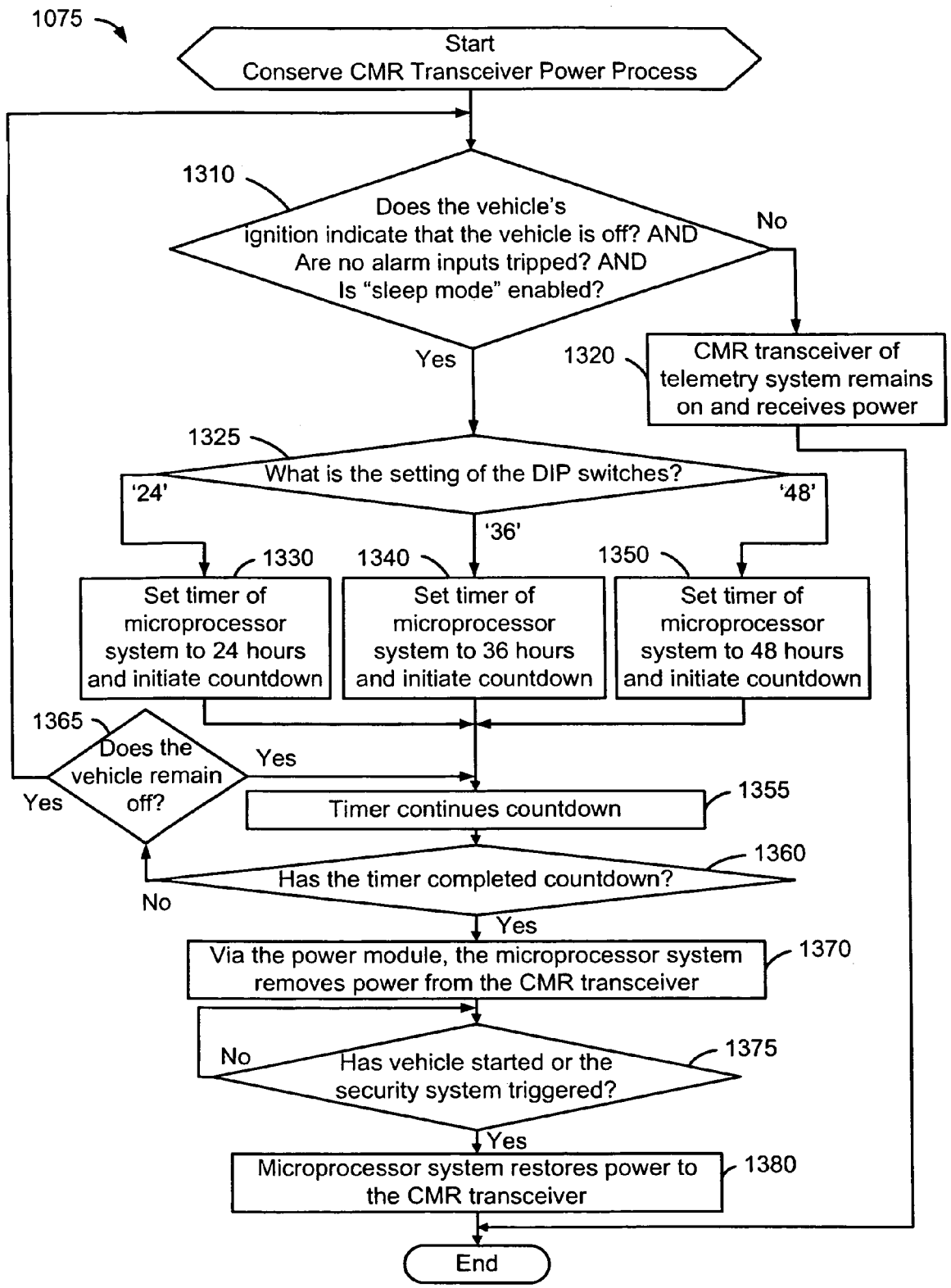
FIG. 13 is a flowchart of an exemplary process for controlling power consumption by a CMR transceiver according to an embodiment of the present invention.

Turning now to FIG. 13, this figure illustrates a flowchart of an exemplary process 1075, entitled Conserve CMR Transceiver Power for controlling power consumption by the CMR transceiver 160 according to an embodiment of the present invention. Via Process 1075, the power module 930 can turn the CMR transceiver 160 off or on according to the operating conditions and events. Turning the CMR transceiver 160 off can comprise placing it in a "sleep mode," while the microprocessor system 210 continues to operate and consume power. One of the DIP switches 220 can be set to enable or disable the sleep mode that conserves power.

At inquiry Step 1310, the first step in Process 1075, the power module 930 determines if all of three conditions are present at the vehicle 105. If the ignition switch sensor 275 determines that the ignition switch is in the start position, AND the security system 270 has not provided a signal to the sensor inputs 240 indicating that a security threat has occurred, AND the telemetry system 165 is configured to enable sleep mode; Steps 1325 through 1380 follow Step 1310.

On the other hand, if all three of these conditions are not met, Step 1320 follows Step 1310. At Step 1320, the microprocessor system 210 continues to provide power to the CMR transceiver 160 or allow the CMR transceiver 160 to draw battery power. Thus, the CMR transceiver 160 stays on and the data link 140 remains intact and operational.

At inquiry Step 1325, which follows Step 1310 when the three conditions are met, the power module 930 identifies the positions of the DIP switches 220. A technician can set the DIP switches 220 to configure the power conservation that the telemetry system 165 applies to the operation of the CMR transceiver 160. The flowchart for Process 1075 illustrates the logical result of three exemplary DIP switch settings.

If the DIP switches 220 have the '24' setting, the timer 920 initiates a 24-hour countdown at Step 1330. If the DIP switches 220 have the '36' setting, the timer 920 initiates a 36-hour countdown at Step 1340. If the DIP switches 220 are set to '48,' the timer initiates a 48-hour countdown at Step 1350. A 12-hour setting (not shown) can also provide a 12-hour countdown.

At Step 1355, which follows the execution of Step 1330, Step 1340, or Step 1350, the timer 920 continues the 24-, 26-, or 48-hour countdown, as appropriate. At inquiry Step 1360, the power module 930 determines whether the countdown has completed. In other words, Step 1360 determines whether 24, 36, or 48 hours have elapsed since the ignition switch was placed in the off position.

If the timer 920 has not completed the countdown, at Step 1365, the power module 930 determines whether the vehicle 105 remains off based on sensor input 240 from the ignition switch sensor 275. If the vehicle 105 is now on, the execution of Process 1075 loops back to Step 1310. If the vehicle 105 remains off, Process 1075 iterates Steps 1355 and 1360 until the timer 920 completes its countdown.

When the timer 920 completes the countdown, Step 1370 follows Step 1360. At Step 1370, the microprocessor system 210, under direction of the power module 930, disconnects the CMR transceiver 160 from its power source or turns it off. In this condition, the CMR transceiver 160 consumes little or no electrical power.

Inquiry Step 1375 iterates until the security system 270 triggers or identifies a security event or threat, such as a broken window, or the ignition switch sensor 275 detects that the vehicle 105 has started or has been turned on. When the security system 270 provides the telemetry system 165 with a sensor input 240 indicating that a security threat has occurred or the ignition switch has transitioned to start or on, the microprocessor system 210 restores power to the CMR transceiver 160 at Step 1380. With the CMR transceiver 160 powered up, the telemetry system 165 establishes communication with the data processing system 46. Following Step 1380, Process 1075 ends.

Turning now to FIGS. 14A and 14B, these figures illustrate a flowchart of an exemplary process 1400, entitled Door Unlock, for remotely unlocking the door of a vehicle 105. Process 1400 provides a method through which an owner of the vehicle 105 can unlock the vehicle's doors using wireless communication.

At Step 1405, the first step in Process 1400, the vehicle's owner elects to configure the telemetry system 165 to provide a remote unlocking capability. The owner may purchase the telemetry system 165 with that capability as a feature, for example.

At Step 1410, service personnel install the telemetry system 165 and set the DIP switches 220 to indicate availability of the door unlock capability. The DIP switch setting informs the microprocessor system 210 that a page 145 on MIN 3 203 via overhead control channel 3 430 represents a command to unlock the vehicle's door. In this configuration, the relay 230a can be tied to the vehicle's door lock/unlock circuit 290 rather than the starter circuit 280. Alternatively, one of the relays 230 can interface with the starter circuit 280, while another relay 230 interfaces with the door lock/unlock circuit 290.

At Step 1415, the vehicle's owner inadvertently locks his or her keys in the vehicle 105 and seeks entry. At Step 1420, the owner calls the data processing system 46 via a cell phone, land line, or other communication apparatus. The call typically transmits at least partially on a PSTN.

At Step 1425, the IVR module 190 of the data processing system 46 takes the owner's call and queries the owner using voice interchange. The IVR module 190 may request the caller's identification and a statement of the requested service.

In response to the IVR module's query or question, at Step 1430 the owner requests unlocking of the vehicle's doors by speaking one or more words. The IVR module 190 correctly interprets the owner's request at Step 1445 and passes the request to the data processing programs 170 for processing and action.

At Step 1460, the data processing system 46 responds to the owner's spoken request and initiates delivery of a page 145 on MIN 3 203 or overhead control channel 3 430 to the telemetry system 165. The telemetry system's CMR transceiver 160 receives that page 145 and notifies the microprocessor system 210 of its receipt.

At Step 1470, which FIG. 14B illustrates, the microprocessor system 210 checks the DIP switches 220 to interpret the page 145. Alternatively, the page 145 can be decoded based on information in a lookup table or other information resident in a memory device at the vehicle. The microprocessor system 210 determines that the page 145 on MIN 3 203 comprises an instruction to unlock the vehicle's doors.

At Step 1475, the door lock module 940 initiates a 3-second pulse to the relay 230a, which is coupled to the door lock/unlock circuit 290, for 3 seconds or another time interval. In response, at Step 1480, the door lock/unlock circuit 290 sends a pulse, burst, or interval of electricity to the vehicle's door-lock solenoids for approximately 3 seconds.

The door lock solenoid responds to the electricity at Step 1485 and unlocks the vehicle's door locks. At Step 1490, the vehicle owner enters the vehicle 105 and retrieves the keys. Following Step 1490, Process 1400 ends.

Figure 15:
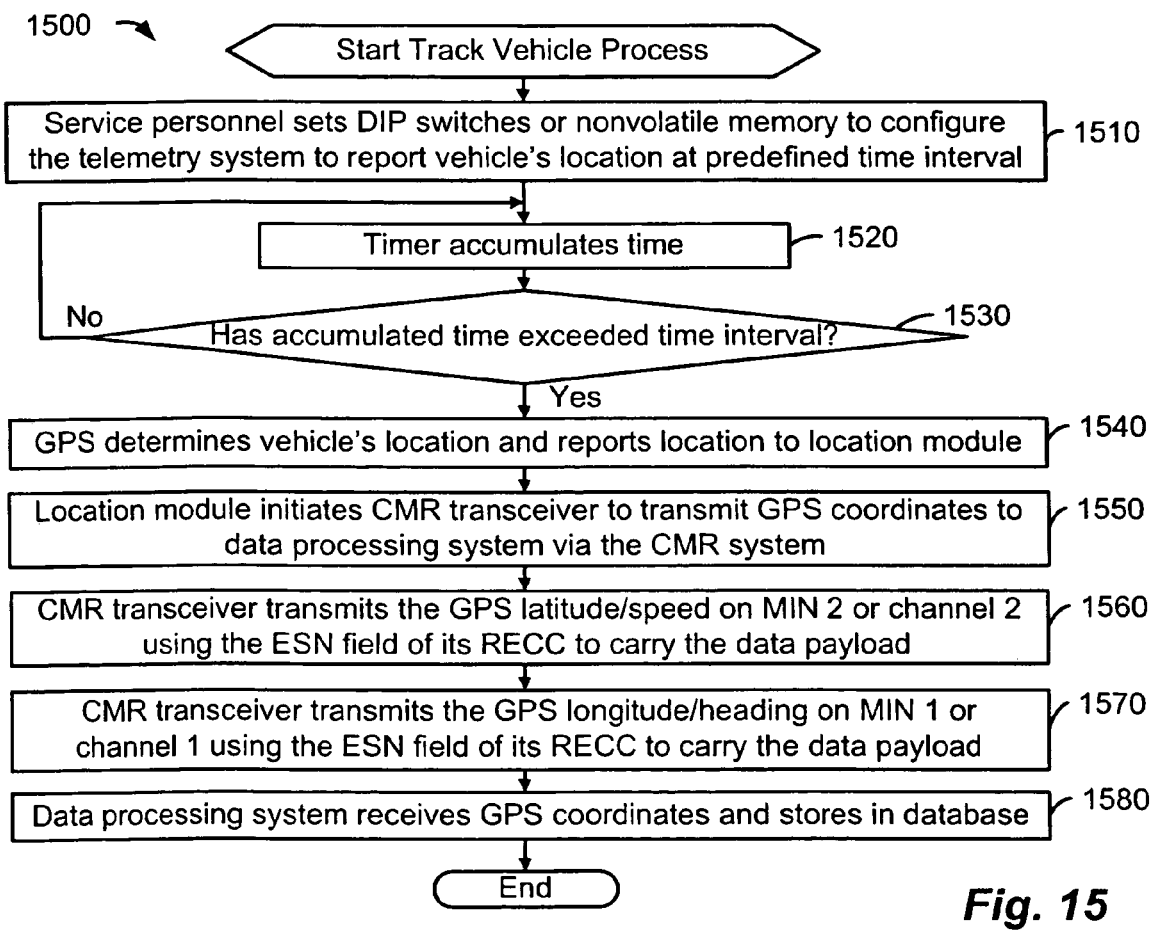
FIG. 15 is a flowchart of an exemplary process for tracking the position of a vehicle via wireless telemetry according to an embodiment of the present invention.

Turning now to FIG. 15, this figure illustrates a flowchart of an exemplary process 1500, entitled Track Vehicle, for tracking the position of a vehicle 105 via wireless telemetry according to an embodiment of the present invention. Following the exemplary steps of Process 1500, the telemetry system 165 can report the location of the vehicle 105 at designated times, such as hourly.

At Step 1510, the first step in Process 1500, a technician or other person sets the DIP switches 220 or a memory to configure the telemetry system 165 to report the location of the vehicle 105 at a predefined time interval. The time interval may be every 15 minutes, half hour, hour, or day, for example.

At Step 1520, the timer 920 accumulates time towards that time interval. At Step 1530, the location module 950 determines whether the accumulated time has exceeded the time interval. If the accumulated time is less than the time interval, Process 1500 iterates Steps 1520 and 1530 until the accumulated time exceeds the time interval.

When the accumulated time exceeds the selected time interval, Step 1540 follows Step 1530. At Step 1540, the GPS 250 identifies the vehicle's location and reports that location to the location module 950. At Step 1550, the location module 950 prompts the CMR transceiver 160 to transmit the GPS location to the data processing system 46 over the CMR system 8.

At Step 1560, the CMR transceiver 160 transmits the GPS latitude and speed on MIN 2 202 or overhead control channel 2 420 in the form of a telemetry packet 146. The ESN field of overhead control channel 2 420 carries the data payload. At Step 1570, the CMR transceiver 160 transmits the GPS longitude and heading on overhead control channel 1 410 using its ESN field.

At Step 1580, the data processing system 46 receives the GPS coordinates and stores them in a database. A user, such as an operator of a fleet of vehicles 105, can access the database via the web-based GUI 125 to track each vehicle 105 in the fleet. Following Step 1580, Process 1500 ends.

Turning now to FIG. 16, this figure illustrates a flowchart of an exemplary process 1600, entitled Report Speed Violation, for identifying a vehicle's speed limit violations via wireless telemetry according to an embodiment of the present invention.

At Step 1605, the first step in Process 1600, the owner of the vehicle 105 enters a speed threshold, limit, or constraint into the GUI 125. The speed threshold can comprise the maximum permissible speed for driving the vehicle 105. For example, a head of a household may dictate that a teenager can drive the vehicle 105, but only if the vehicle's speed does not exceed the speed threshold. Via the following steps of Process 1600, the speed module 960 monitors the driver's speed and sends the owner notification when the speed exceeds the speed threshold for a specified time duration.

At Step 1608, the CMR system 8 transmits the selected speed threshold to the vehicle's telemetry system 165. A page on MIN 1 201 or overhead control channel 1 410 alerts the telemetry system 165 to expect and receive a command page 145 that is broadcast via a command MIN or command channel (other than MIN 1 201 or control channel 1 410). The command MIN is common to multiple telemetry systems 165 throughout the system 100. Via this command page 145, the telemetry system 165 receives the speed threshold, and the speed module 960 stores the speed threshold in memory. The command MIN can also comprise an instruction to cancel speed monitoring of the vehicle 105.

At Step 1610, a driver drives the vehicle 105. The driver may be a different person, such as the teenager, than the person that owns the vehicle 105. At Step 1615, the GPS 250 monitors the vehicle's speed and regularly reports speed measurements to the microprocessor system 210.

At Step 1620, the speed module 960 compares each speed measurement to the speed threshold 1620. Based on that comparison, at Step 1625, the speed module determines if a speed measurement has exceeded the speed threshold. If the speed measurement has not exceeded the speed threshold, Step 1625 causes Process 1600 to iterate Steps 1610-1625. The driver continues driving, and the telemetry system 165 continues monitoring the driver's driving practices.

If the driver has driven the vehicle 105 faster than the speed threshold, then at Step 1630 the timer 920 begins to count or accumulate time. At inquiry Step 1635, the speed module 960 determines whether the vehicle's speed continues to exceed the speed threshold. If the vehicle's speed has fallen below the threshold, the execution of Process 1600 returns to Step 1610.

If the vehicle's speed continues to exceed the speed threshold, then inquiry Step 1640 follows Step 1635. At Step 1640, the speed module 960 determines if the accumulated time has exceeded a time threshold. The time threshold can be fixed or selectable and can have a value in a range between 15 seconds and 10 minutes, for example. If the accumulated time has not exceeded the time threshold, then Process 1600 executes Step 1630 followed by Step 1635.

If the accumulated time has exceeded the time threshold, then Step 1645 follows Step 1640. At Step 1645, the speed module 960 prompts the CMR transceiver 160 to transmit the vehicle's longitude, latitude, heading, and speed via overhead control channels 1 and 2 410, 420 with an accompanying flag that indicates that the driver has committed an infraction or a violation of the permissible conditions for operating the vehicle 105. The vehicle owner can access the resulting speed violation report from the GUI 125, for example Following such a violation, Process 1600 iterates Step 1650 until the vehicle's speed drops below the speed threshold by a significant amount, such as 10 miles per hour or 10 percent. When the speed falls below the speed threshold, the execution of Process 1600 returns to Step 1610. This iteration effectively resets the speed reporting sequence so that when the driver commits another speed violation, the vehicle's owner can receive another notification via Step 1645.

Figure 17:
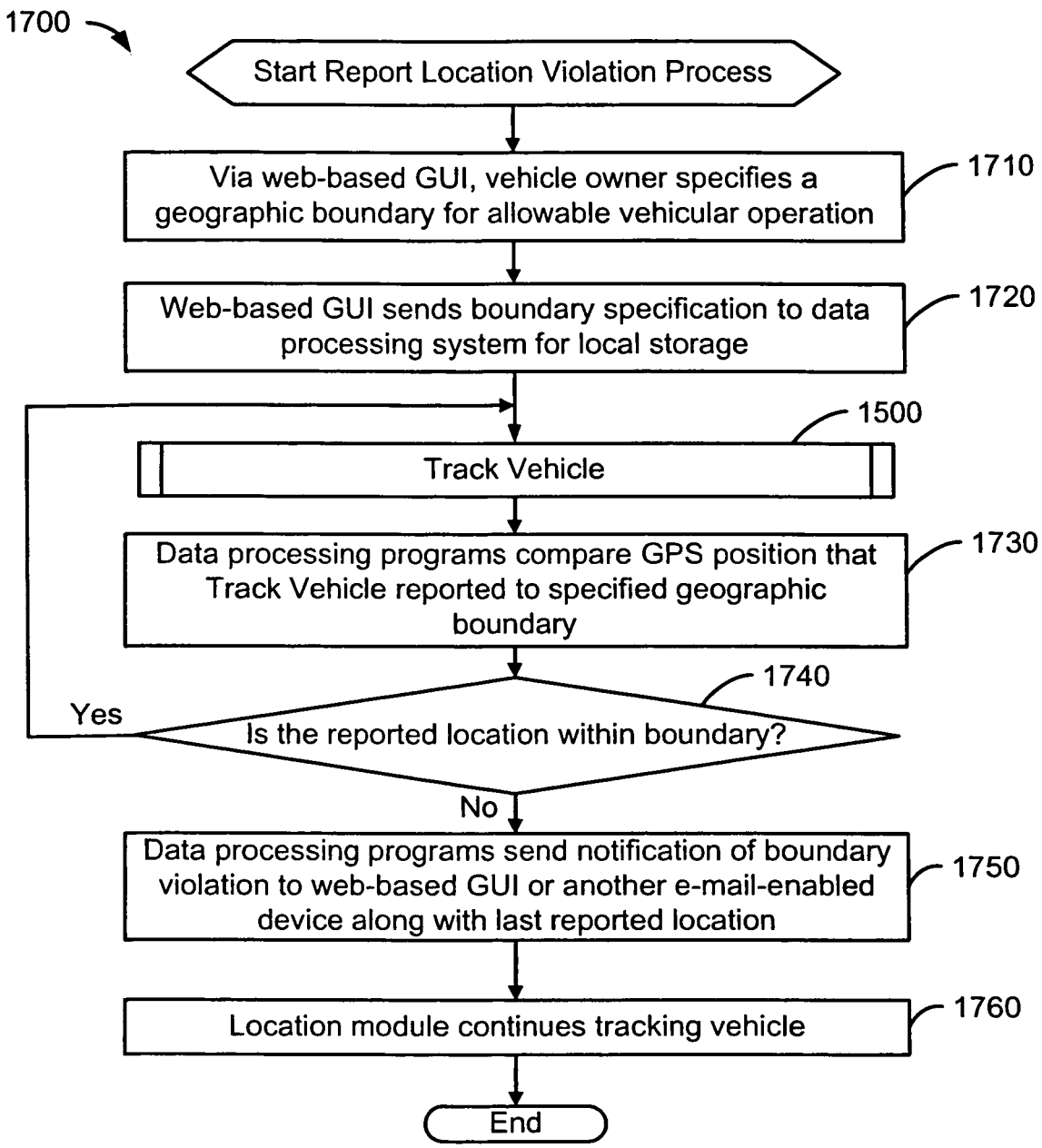
FIG. 17 is a flowchart of an exemplary process for reporting instances of a vehicle moving outside an operating boundary according to an embodiment of the present invention.

Turning now to FIG. 17, this figure illustrates a flowchart of an exemplary process 1700, entitled Report Location Violation, for reporting instances of a vehicle 105 moving outside an operating boundary according to an embodiment of the present invention.

At Step 1710, the first step in Process 1700, the vehicle's owner specifies a geographic boundary for operating the vehicle 105. Driving the vehicle 105 within the boundary is allowable, while driving the vehicle 105 outside the boundary is not allowed. The owner can enter the boundary into web-based GUI 125, for example.

At Step 1720, the GUI 125 sends the boundary specification or constraint to the data processing system 46. The data processing system 46 typically stores the data in a local database or other memory system.

At Step 1500, which FIG. 15 illustrates in flowchart form as Process 1500 as discussed above, the telemetry system 165 tracks the vehicle's location. As an output or result of Step 1500, the data processing system 46 receives GPS location coordinates as the vehicle 105 moves geographically.

At Step 1730, the data processing programs 170 compare the received GPS location coordinates to the specified geographic boundary. If the driver is operating the vehicle 105 within the boundary, Step 1740 causes Process 1700 to iterate Steps 1500, 1730, and 1740 until the vehicle 105 moves outside the boundary. If the vehicle 105 strays beyond the boundary, then Step 1750 follows Step 1740.

At Step 1750, the data processing programs 170 send notification of the boundary violation to the web-based GUI 125 or another device capable of receiving e-mail, for example. The notification can comprise the vehicle's location at the time of crossing the boundary. Alternatively, the notification can comprise a report of the vehicle's path before and after crossing the boundary.

At Step 1760, the location module 950 continues tracking the vehicle's location and reporting its coordinates to the data processing system 46 for the owner's access. Following Step 1760, Process 1700 ends.

From the foregoing, it will be appreciated that the present invention overcomes the limitations of the prior art. From the description of the embodiments, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A method of remote interaction with a vehicle comprising the steps of:
   receiving a voice command;
   processing the received voice command with an interactive voice response system;
   responsive to the processing step, interpreting the voice command as a prompt to perform an action at the vehicle;
   sending a signal to the vehicle on a control channel of a cellular network in response to the prompt;
   at the vehicle, monitoring a control channel of a cellular network;
   detecting the sent signal on the control channel; and
   performing the action in response to detecting the sent signal.

2. The method of claim 1, wherein the action comprises unlocking a door of the vehicle.

3. The method of claim 2, wherein unlocking the door comprises sending an electrical pulse to an actuator mechanically coupled to a lock of the door.

4. The method of claim 1, wherein the action comprises pulsing a horn on the vehicle.

5. The method of claim 4, wherein pulsing a horn on the vehicle comprises sending an electrical pulse to an actuator mechanically coupled to the horn.

6. The method of claim 1, wherein the action comprises pulsing a light on the vehicle.

7. The method of claim 6, wherein pulsing a light on the vehicle comprises sending an electrical pulse to an actuator mechanically coupled to the light.

8. The method of claim 6, wherein disabling the vehicle comprises tripping a relay connected to a starter on the vehicle.

9. The method of claim 1, wherein the action comprises disabling the vehicle.

10. A method for remotely interacting with a vehicle, the method comprising:
    receiving at a data processing center a voice command, the voice command comprising an action to be performed at the vehicle;
    in response to receiving the voice command at the data processing center, broadcasting a page over a cellular network;
    receiving the page at a transceiver located at the vehicle;
    forwarding the page from the transceiver to a microprocessor located at the vehicle; and
    in response to receiving the page at the microprocessor, performing the command at the vehicle.

11. The method of claim 10, wherein the command comprises unlocking a door on the vehicle.

12. The method of claim 10, wherein the command comprises pulsing a horn on the vehicle.

13. The method of claim 10, wherein the command comprises pulsing a light on the vehicle.

14. The method of claim 10, wherein the command comprises disabling the vehicle.

15. The method of claim 14, wherein disabling the vehicle comprises tripping a relay connected to a starter on the vehicle.

16. The method of claim 10, wherein the microprocessor further performs the step of checking a state of DIP switches located at the vehicle to determine the action to be performed at the vehicle.

17. A system for remotely interacting with a vehicle, the system comprising:
    a processing system located remote from the vehicle, wherein the processing system:
    receives a voice command;
    interprets the voice command using voice recognition software; and
    broadcasts a page over a cellular network, the page including an action to be performed at the vehicle pursuant to the voice command;
    a transceiver located at the vehicle, wherein the transceiver receives the page from the processing system; and
    a microprocessor located at the vehicle, wherein the microprocessor receives the page from the transceiver and performs the action at the vehicle.

18. The system of claim 17, wherein the action comprises unlocking a door on the vehicle.

19. The system of claim 17, wherein the action comprises pulsing a horn on the vehicle.

20. The system of claim 17, wherein the action comprises pulsing a light on the vehicle.

* * * * *